(12) United States Patent
Choi et al.

(10) Patent No.: US 7,006,482 B1
(45) Date of Patent: Feb. 28, 2006

(54) APPARATUS AND METHOD FOR GATING DATA ON A CONTROL CHANNEL IN A CDMA COMMUNICATION SYSTEM

(75) Inventors: Ho-Kyu Choi, Seoul (KR); Chang-Soo Park, Seoul (KR); Sung-Oh Hwang, Yongin-shi (KR); Hyun-Woo Lee, Suwon-shi (KR); Jae-Min Ahn, Seoul (KR); Youn-Sun Kim, Seoul (KR); Hi-Chan Moon, Seoul (KR); Seong-ill Park, Kunpo-shi (KR)

(73) Assignee: Samsung Electronics Co., Ltd., (KR)

( * ) Notice: Subject to any disclaimer, the term of this patent is extended or adjusted under 35 U.S.C. 154(b) by 798 days.

(21) Appl. No.: 09/677,342

(22) Filed: Oct. 2, 2000

(30) Foreign Application Priority Data

| Oct. 2, 1999 | (KR) | 1999-43128 |
| Oct. 14, 1999 | (KR) | 1999-44627 |
| Oct. 15, 1999 | (KR) | 1999-45450 |
| Nov. 26, 1999 | (KR) | 1999-53187 |
| May 23, 2000 | (KR) | 2000-28775 |

(51) Int. Cl.
  *H04B 7/216* (2006.01)
(52) U.S. Cl. .................. 370/342; 370/336; 455/450
(58) Field of Classification Search ........ 370/320–322, 370/335–337, 342, 441; 455/450
  See application file for complete search history.

(56) References Cited

U.S. PATENT DOCUMENTS

| 4,905,302 A | 2/1990 | Childress et al. ........... 455/515 |
| 5,659,569 A * | 8/1997 | Padovani et al. ........... 370/479 |
| 6,160,803 A * | 12/2000 | Yuen et al. .................. 370/342 |
| 6,334,047 B1 * | 12/2001 | Andersson et al. ........... 455/69 |
| 6,587,447 B1 * | 7/2003 | Wang et al. ................. 370/335 |

FOREIGN PATENT DOCUMENTS

JP  11-055219  2/1999

* cited by examiner

*Primary Examiner*—John Pezzlo
*Assistant Examiner*—Saba Tsegaye
(74) *Attorney, Agent, or Firm*—Dilworth & Barrese LLP

(57) ABSTRACT

A method for transmitting control data on a downlink and/or uplink channel in a base station and/or mobile station in a mobile communication system. In one embodiment, the base station determines whether there is downlink channel data to transmit to a mobile station. If there is no data to be transmitted over the downlink channel for a predetermined time period, the base station drives a random gating position selector to determine a random gating slot position, gates on the control data at the determined slot position, and gates off the control data at other slot positions. The random position selector determines the gating slot position by calculating a value x by multiplying a system frame number (SFN) of a received signal by a specific integer; selecting n bits starting from a position which is at an x-chip distance from the start point of a scrambling code, which has a period equal to one frame, before a plurality of gating durations used in generating a downlink signal; and determining a gating slot position of a corresponding gating slot group by performing a modulo operation on the selected n bits, where the module operation is by the number of slots in a gating slot group.

31 Claims, 48 Drawing Sheets

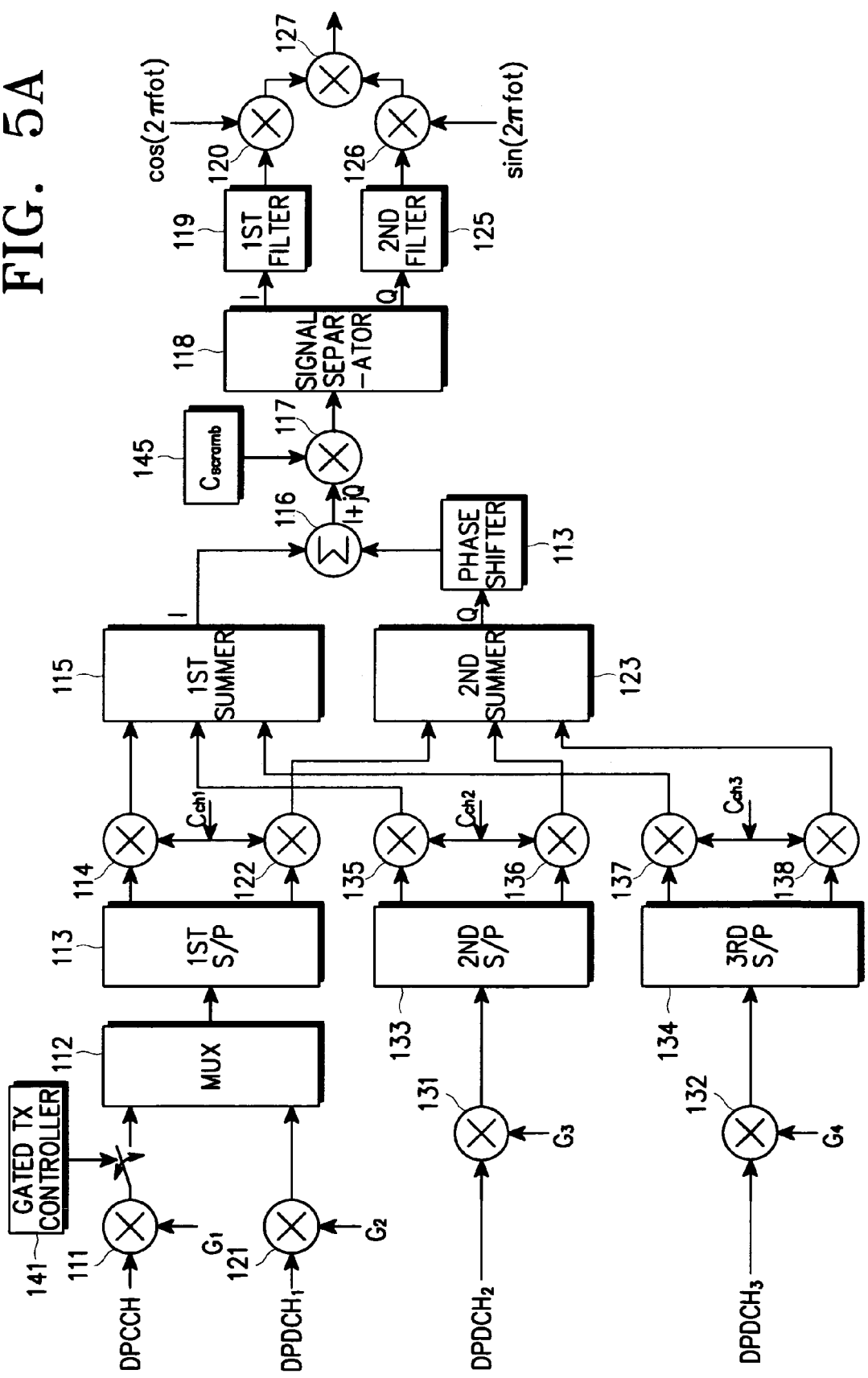

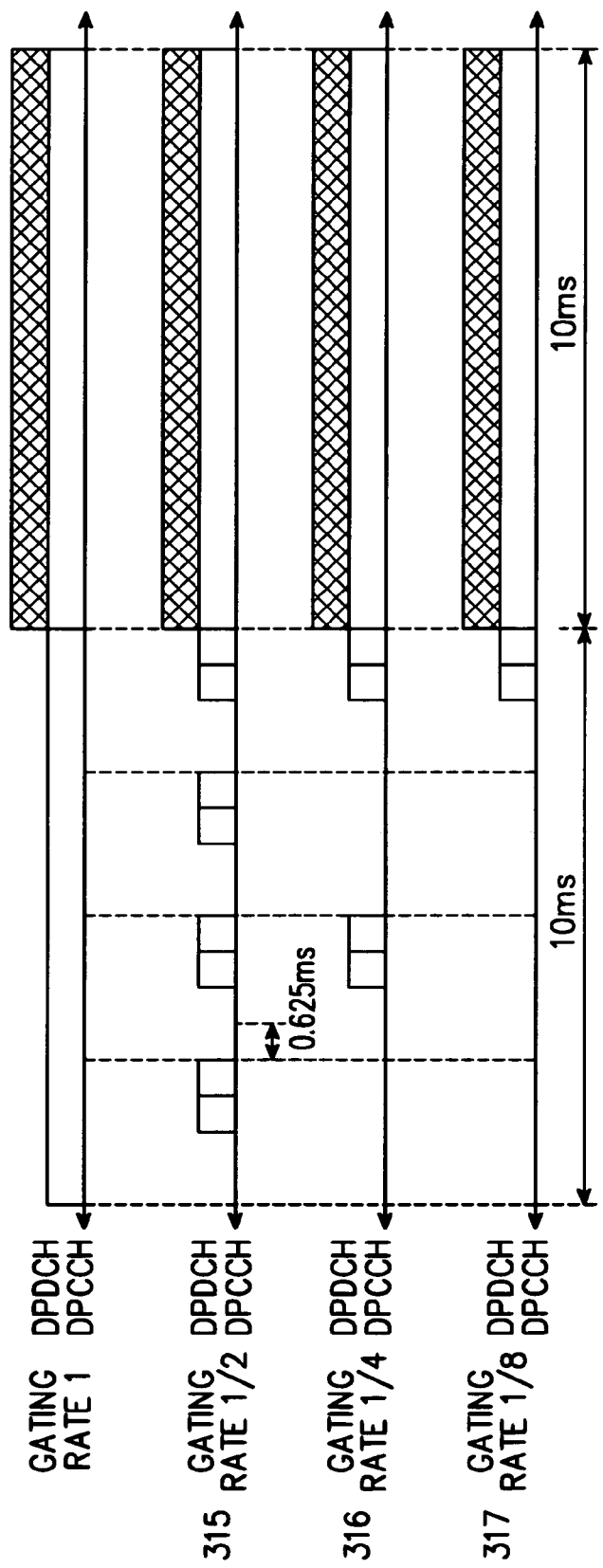

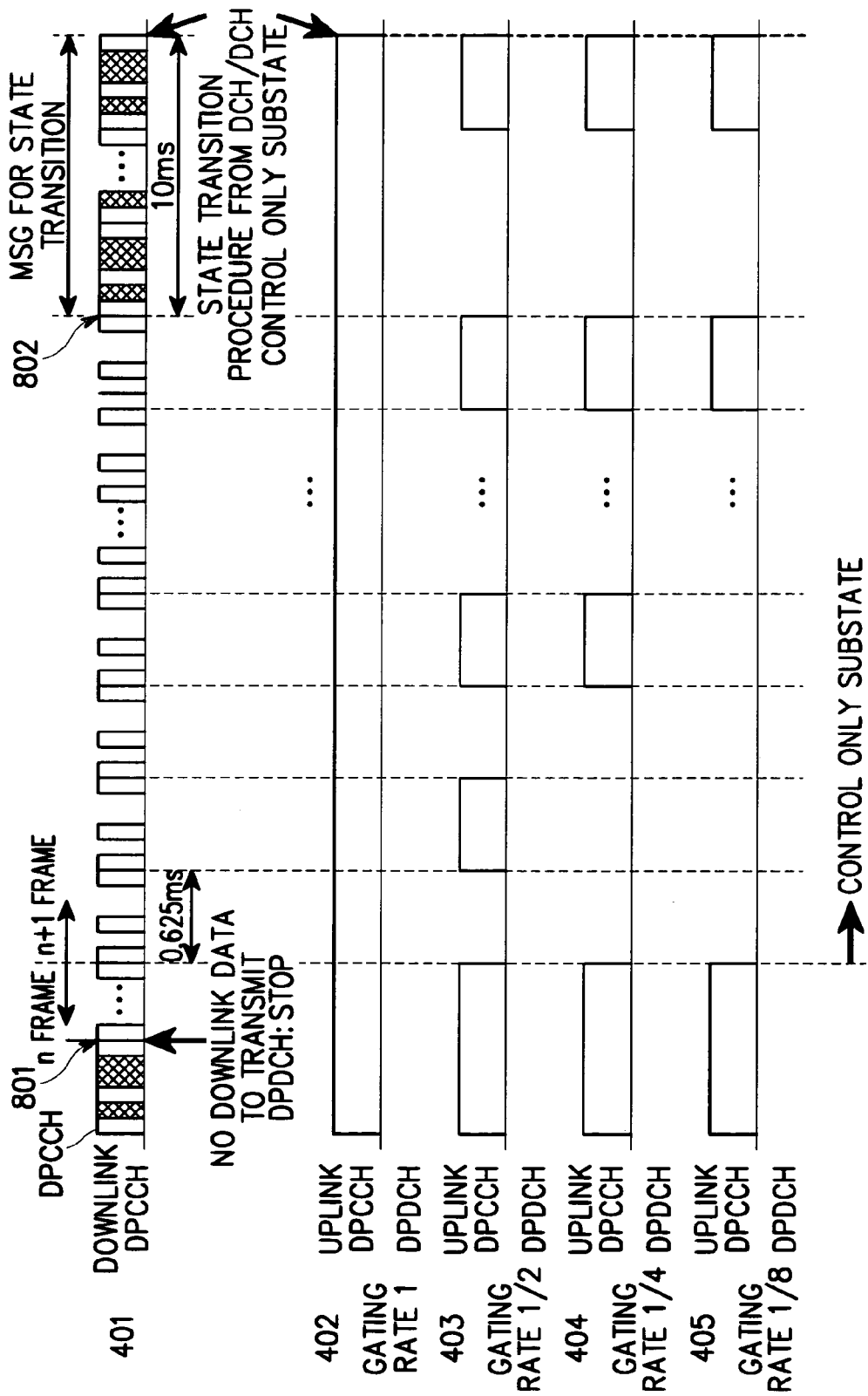

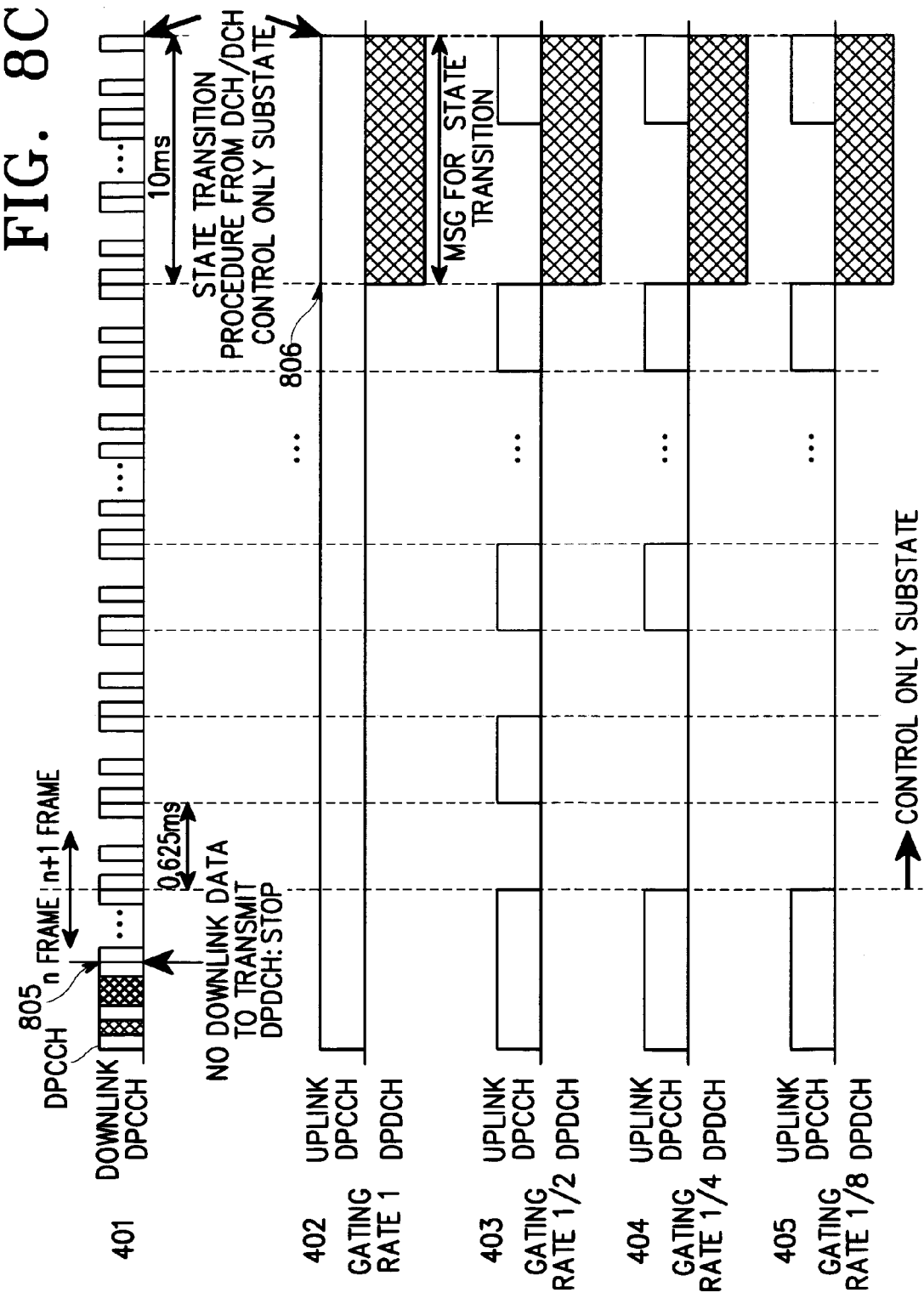

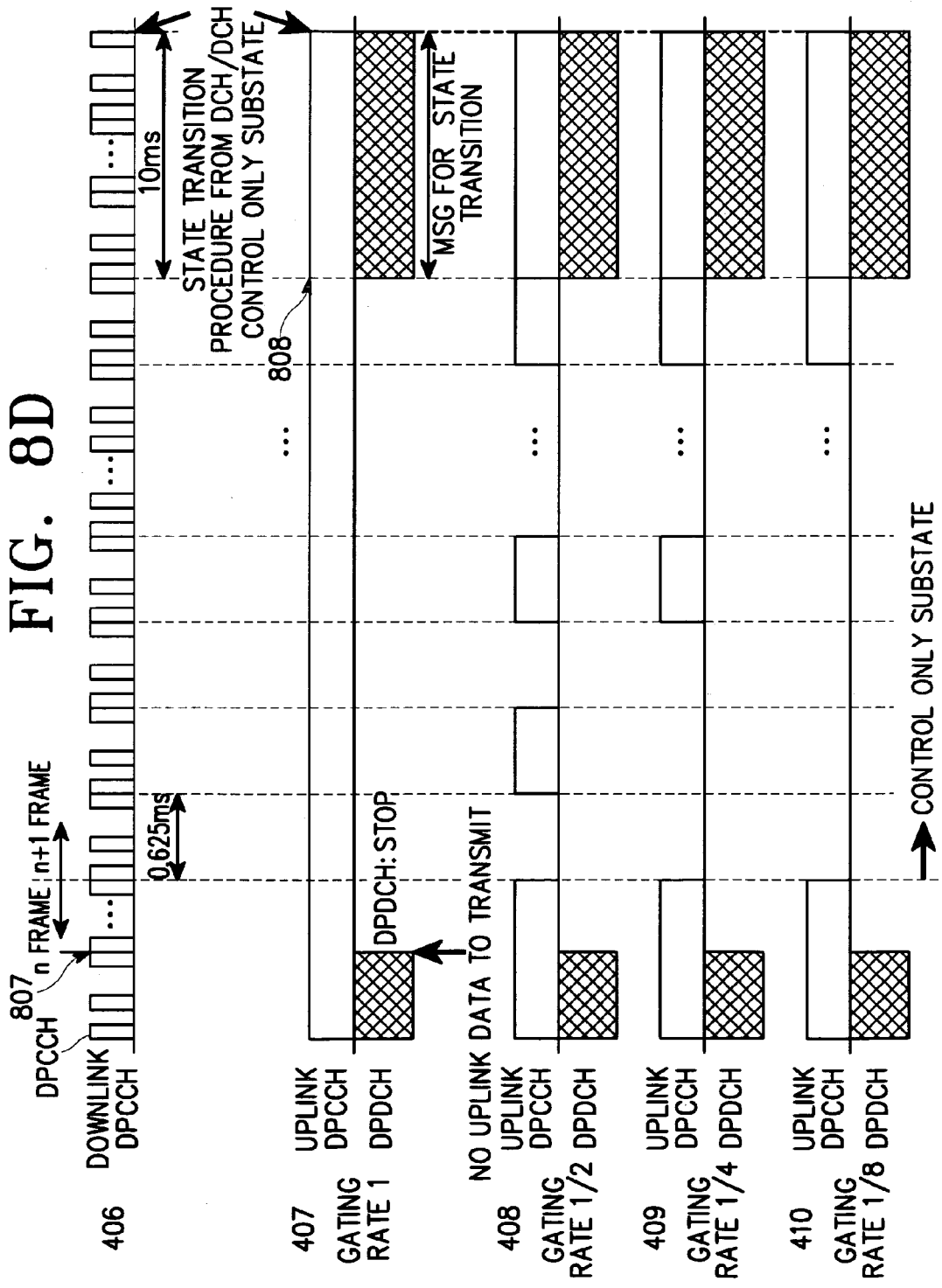

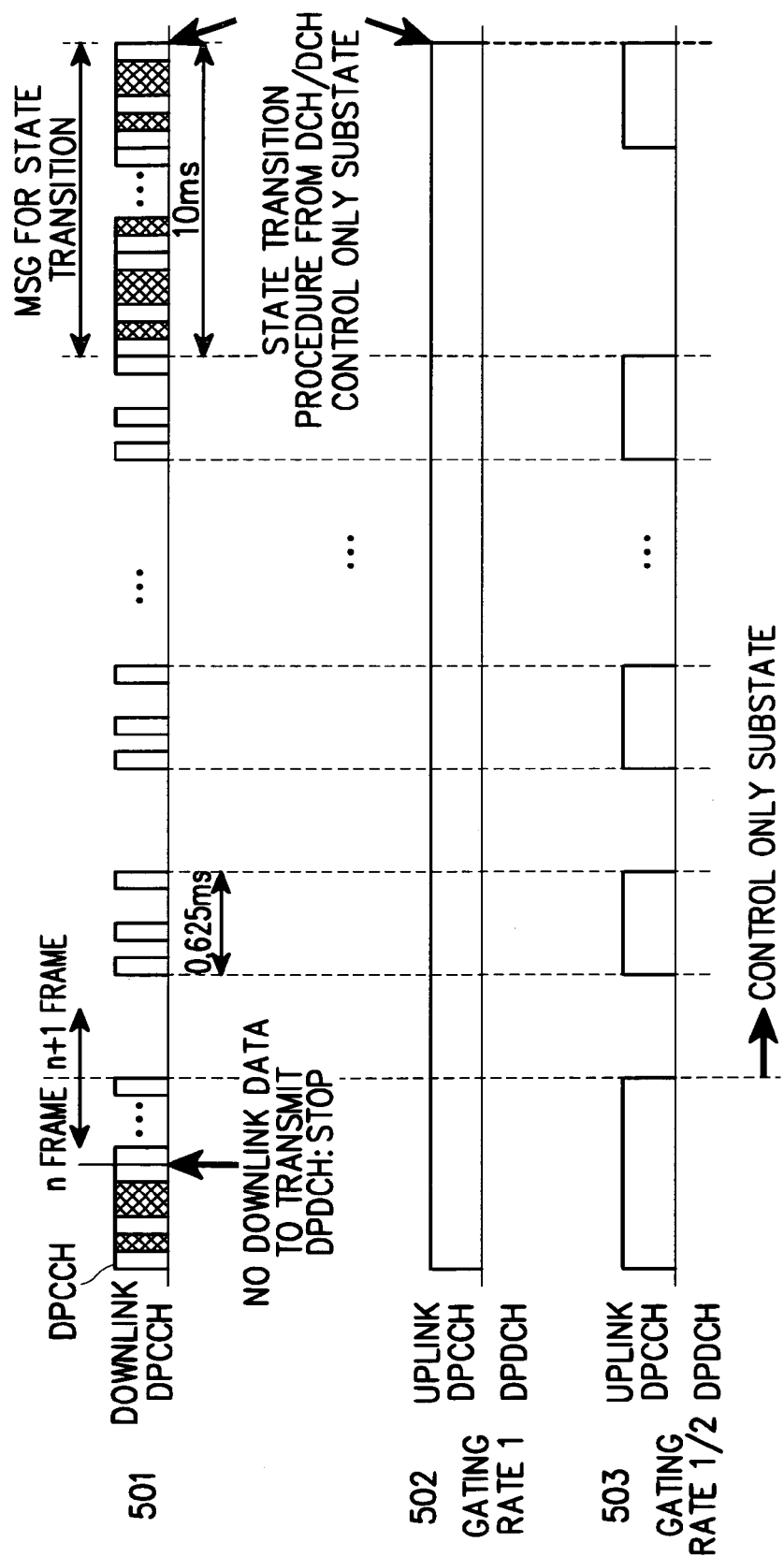

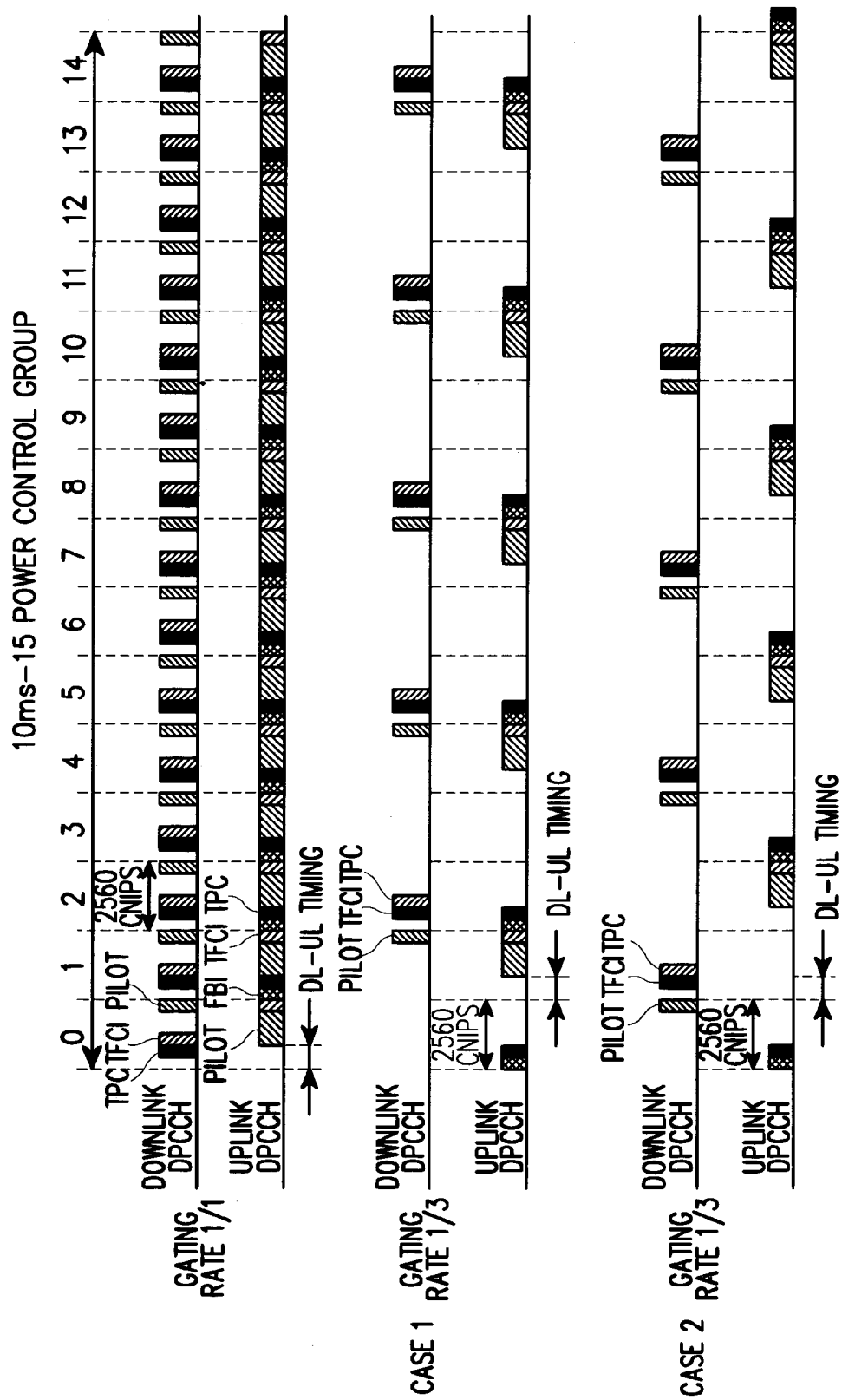

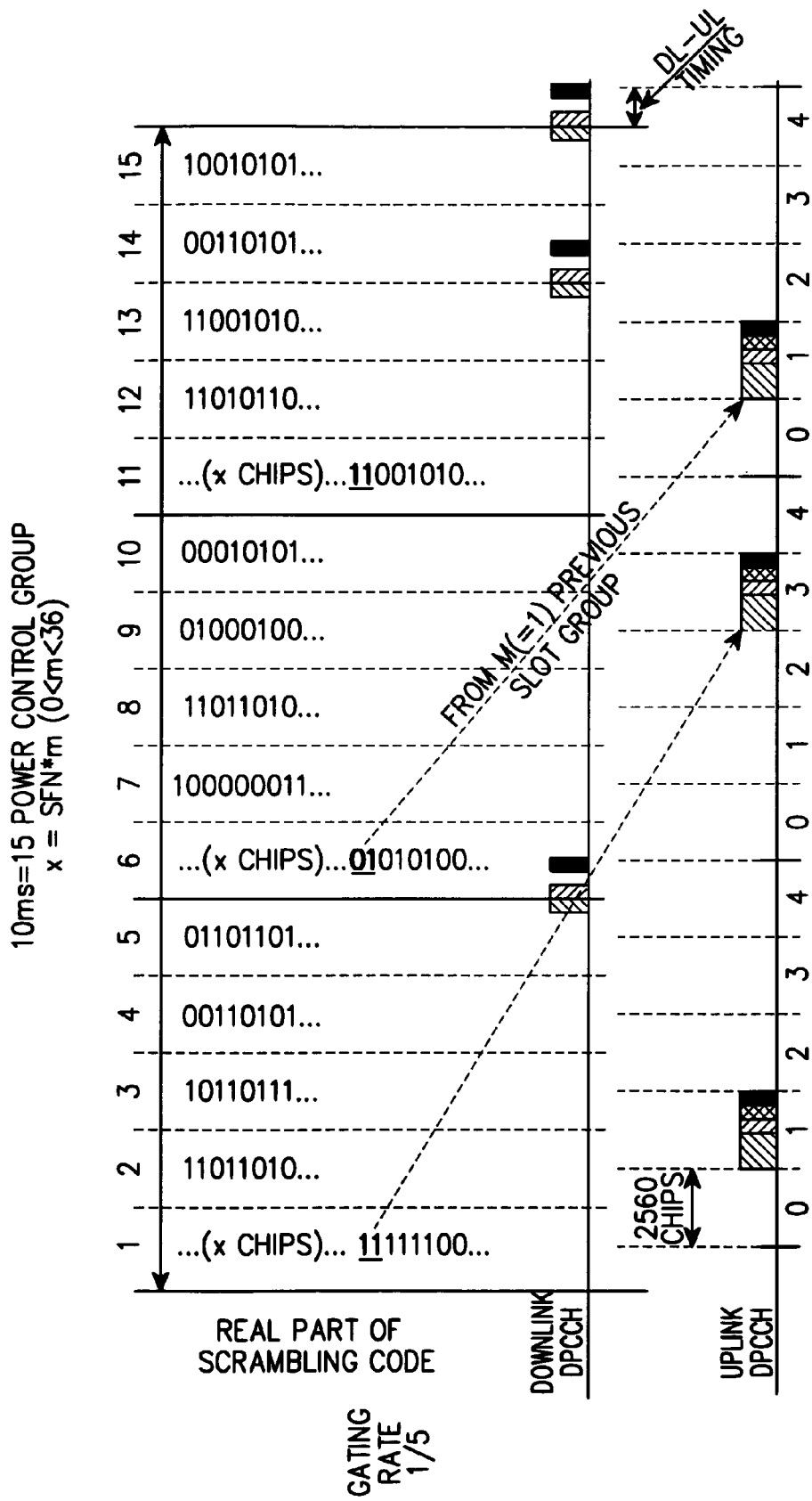

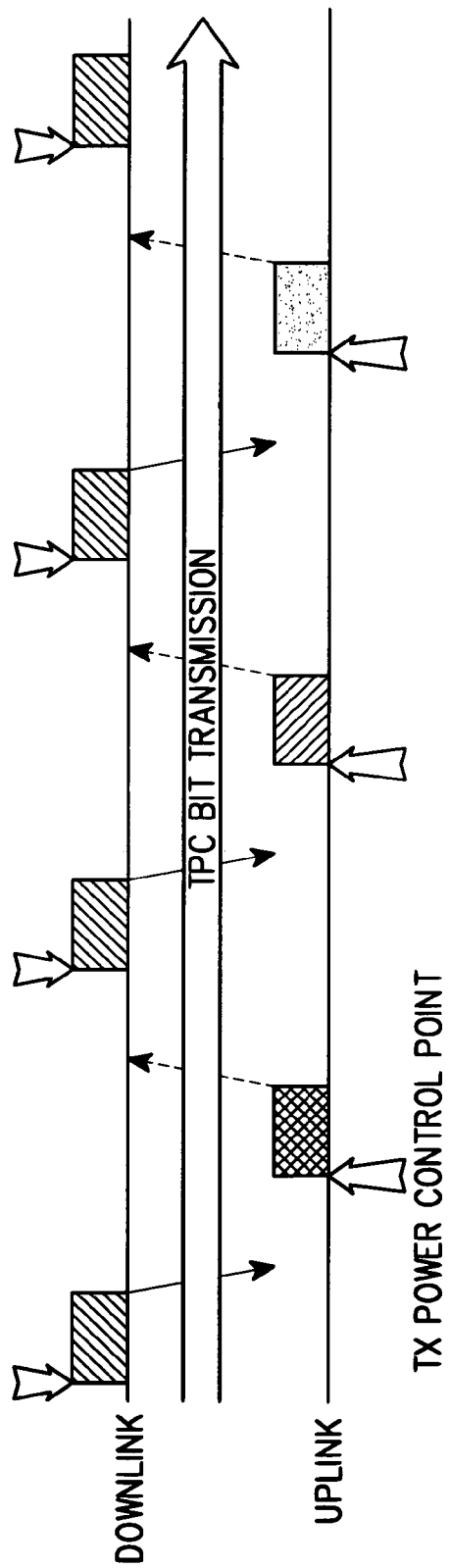

APPARATUS AND METHOD FOR GATING DATA ON A CONTROL CHANNEL IN A CDMA COMMUNICATION SYSTEM

PRIORITY

This application claims priority to an application entitled "Apparatus and Method for Gating Transmission Channel in a Control-Only Substate in a CDMA Communication System" filed in the Korean Industrial Property Office on Oct. 2, 1999 and assigned Serial No. 99-43128; an application entitled "Apparatus and Method for Gating Transmission Channel in a Control-Only Substate in a CDMA Communication System" filed in the Korean Industrial Property Office on Oct. 14, 1999 and assigned Serial No. 99-44627; an application entitled "Apparatus and Method for Gating Transmission Channel in a Control-Only Substate in a CDMA Communication System" filed in the Korean Industrial Property Office on Oct. 15, 1999 and assigned Serial No. 99-45450; an application entitled "Apparatus and Method for Gating Transmission Channel in a Control-Only Substate in a CDMA Communication System" filed in the Korean Industrial Property Office on Nov. 26, 1999 and assigned Serial No. 99-53187; and an application entitled "Apparatus and Method for Gating Transmission and Reception Signal on a Control Channel in a CDMA Communication System" filed in the Korean Industrial Property Office on May 23, 2000 and assigned Serial No. 2000-28775, the contents of all of which are hereby incorporated by reference.

BACKGROUND OF THE INVENTION

1. Field of the Invention

The present invention relates generally to a data communication apparatus and method for a CDMA communication system, and in particular, to an apparatus and method for gating data according to whether there is data to transmit.

2. Description of the Related Art

Conventional CDMA (Code Division Multiple Access) mobile communication systems primarily provide voice service. However, future CDMA mobile communication systems will support the IMT-2000 standard, which can provide high-speed data service as well as voice service. More specifically, the IMT-2000 standard can provide high-quality voice service, moving picture service, Internet search service, etc. During data service, IMT-2000 mobile communication systems transmits traffic data over a data channel and transmits control data over a control channel in serial or in parallel with the traffic data. Here, "traffic data" includes voice, picture and packet data, and "control data" includes control and signaling data related to transmission of the traffic data.

In a mobile communication system, data communication is typically characterized by bursts of data transmissions alternating with long periods of non- transmission. The bursts of data are referred to as "packets" or "packages" of data. In the conventional mobile communication system, the base station and the mobile station continuously transmit data on the control channel for a predefined time even when there is no traffic data to transmit. That is, the base station and the mobile station continuously transmit data on the control channel even for the time period where there is no traffic data to transmit, even though this has a deleterious effect on the limited radio resources, base station capacity, power consumption of the mobile station, and interference. This continuous transmission is done in order to minimize the time delay due to sync reacquisition when there is new traffic data to transmit. If there is no data to transmit for a predefined time, the base station and the mobile station release the data channel and the control channel. In this state, if there is new data to transmit, the base station and the mobile station establish new data channel and control channel.

The IMT-2000 mobile communication system standard defines many states according to channel assignment circumstances and state information existence/nonexistence in order to provide packet data service as well as voice service. For example, a state transition diagram for a cell connected state, a radio bearer activated substate (or RBA mode) and a radio bearer suspended substate (or RBS mode) are well defined in 3GPP RAN TS S2 series S2.03, 99.04.

FIG. 1A shows state transition in the cell connected state of the conventional mobile communication system. Referring to FIG. 1A, the cell connected state includes a paging channel (PCH) state, a random access channel (RACH)/downlink shared channel (DSCH) state, a RACH/forward link access channel (FACH) state, and a dedicated channel (DCH)/DCH(Dedicated Channel), DCH/DCH+DSCH, DCH/DSCH+DSCH Ctrl (Control Channel) state.

FIG. 1B shows a radio bearer activated substate (i.e., RBA mode) and a radio bearer suspended substate (i.e., RBS mode) within the DCH/DCH, DCH/DCH+DSCH, DCH/DSCH+DSCH Ctrl state.

In many cases, data transmission is performed intermittently, such as for Internet access and file downloading. Therefore, there occurs a non-transmission period between transmissions of packet data. During this period, the conventional data transmission method releases or continuously maintains the data channel. If the dedicated data channel is released, reconnecting the channel requires a long period of time, making it difficult to provide a corresponding service in real time. On the other hand, if the dedicated data channel is maintained, channel resources are wasted.

The downlink (or forward link), which transmits signals from the base station to the mobile station, includes the following physical channels. Physical channels which depart from the scope of the invention will not be described for the sake of simplicity. The downlink physical channels involved in the invention include a dedicated physical control channel (hereinafter, referred to as DPCCH) in which pilot symbols are included for sync acquisition and channel estimation, a dedicated physical data channel (hereinafter, referred to as DPDCH) for exchanging traffic data with a specific mobile station, and a down link shared channel(DSCH) for transmitting traffic data to multiple mobile stations. The downlinkDPDCH includes the traffic data, and the downlink DPCCH includes, at each slot, the control data such as transport format combination indicator (hereinafter, referred to as TFCI), transmit power control (hereinafter, referred to as TPC) information and pilot symbols, which are time multiplexed within one slot. The uplink (or reverse link), which transmits signals from the mobile station to the base station, also has an uplink dedicated control channel and dedicated data channel.

Embodiments of the present invention will be described with reference to the case where the frame length is 10 msec and each frame includes 16 slots, i.e., each slot has a length of 0.625 msec. Alternatively, embodiments of the present invention will also be described with reference to another case where the frame length is 10 msec and each frame includes 15 slots, i.e., each slot has a length of 0.667 msec. The slot may have either the same length as a power control group (PCG) or a different length from the power control group. It will be assumed herein that the power control group (0.625 msec or 0.667 msec) has the same time period as the slot (0.625 msec or 0.667 msec). The slot includes pilot symbol, traffic data, transport format combination indicator, and power control command bit. The values stated above are given by way of example only.

FIG. 2A shows a slot structure including the downlink DPDCH and DPCCH. In FIG. 2A, although the DPDCH is divided into traffic data 1 (Data1) and traffic data 2 (Data2), there is a case where traffic data 1 does not exist and only traffic data 2 exists according to the types of the traffic data. In FIG. 2A, the DPCCH is constructed in the order of TFCI, TPC, and PILOT. Table 1 below shows the symbols constituting the downlink DPDCH/DPCCH fields, wherein the number of TFCI, TPC and pilot bits in each slot can vary according to a data rate and a spreading factor (SF).

Unlike the downlink DPDCH and DPCCH, uplink DPDCH and DPCCH for transmitting signals from the mobile station to the base station are separated by independent channel separation codes.

FIG. 2B shows a slot structure including the uplink DPDCH and DPCCH, wherein reference numeral 211 indicates a slot structure of the DPDCH and reference numeral 213 indicates a slot structure of the DPCCH. In FIG. 2B, with regard to the DPCCH, the number of TFCI, TPC and pilot bits can vary according to the service option (including the type of the traffic data and the transmit antenna diversity) or a handover circumstance. Tables 2 and 3 below show the symbols constituting the uplink DPDCH and DPCCH fields, respectively.

TABLE 1

Downlink DPDCH/DPCCH Fields

| Channel Bit Rate (kbps) | Channel Symbol Rate (ksps) | SF | Bits/Frame DPDCH | Bits/Frame DPCCH | Bits/Frame TOT | Bits/Slot | DPDCH Bits/Slot $N_{data1}$ | DPDCH Bits/Slot $N_{data2}$ | DPCCH Bits/Slot $N_{TFCI}$ | DPCCH Bits/Slot $N_{TPC}$ | DPCCH Bits/Slot $N_{pilot}$ |
|---|---|---|---|---|---|---|---|---|---|---|---|
| 16 | 8 | 512 | 64 | 96 | 160 | 10 | 2 | 2 | 0 | 2 | 4 |
| 16 | 8 | 512 | 32 | 128 | 160 | 10 | 0 | 2 | 2 | 2 | 4 |
| 32 | 16 | 256 | 160 | 160 | 320 | 20 | 2 | 8 | 0 | 2 | 8 |
| 32 | 16 | 256 | 128 | 192 | 320 | 20 | 0 | 8 | 2 | 2 | 8 |
| 64 | 32 | 128 | 480 | 160 | 640 | 40 | 6 | 24 | 0 | 2 | 8 |
| 64 | 32 | 128 | 448 | 192 | 640 | 40 | 4 | 24 | 2 | 2 | 8 |
| 128 | 64 | 64 | 1120 | 160 | 1280 | 80 | 14 | 56 | 0 | 2 | 8 |
| 128 | 64 | 64 | 992 | 288 | 1280 | 80 | 6 | 56 | 8 | 2 | 8 |
| 256 | 128 | 32 | 2400 | 160 | 2560 | 160 | 30 | 120 | 0 | 2 | 8 |
| 256 | 128 | 32 | 2272 | 288 | 2560 | 160 | 22 | 120 | 8 | 2 | 8 |
| 512 | 256 | 16 | 4832 | 288 | 5120 | 320 | 62 | 240 | 0 | 2 | 16 |
| 512 | 256 | 16 | 4704 | 416 | 5120 | 320 | 54 | 240 | 8 | 2 | 16 |
| 1024 | 512 | 8 | 9952 | 288 | 10240 | 640 | 126 | 496 | 0 | 2 | 16 |
| 1024 | 512 | 8 | 9824 | 416 | 10240 | 640 | 118 | 496 | 8 | 2 | 16 |
| 2048 | 1024 | 4 | 20192 | 288 | 20480 | 1280 | 254 | 1008 | 0 | 2 | 16 |
| 2048 | 1024 | 4 | 20064 | 416 | 20480 | 1280 | 246 | 1008 | 8 | 2 | 16 |

TABLE 2

Uplink DPDCH Fields

| Channel Bit Rate (kbps) | Channel Symbol Rate (ksps) | SF | Bits/Frame | Bits/Slot | $N_{data}$ |
|---|---|---|---|---|---|
| 16 | 16 | 256 | 160 | 10 | 10 |
| 32 | 32 | 128 | 320 | 20 | 20 |
| 64 | 64 | 64 | 640 | 40 | 40 |
| 128 | 128 | 32 | 1280 | 80 | 80 |
| 256 | 256 | 16 | 2560 | 160 | 160 |
| 512 | 512 | 8 | 5120 | 320 | 320 |
| 1024 | 1024 | 4 | 10240 | 640 | 640 |

TABLE 3

Uplink DPCCH Fields

| Channel Bit Rate (kbps) | Channel Symbol Rate (ksps) | SF | Bits/Frame | Bits/Slot | $N_{pilot}$ | $N_{TPC}$ | $N_{TFCI}$ | $N_{FBI}$ |
|---|---|---|---|---|---|---|---|---|
| 16 | 16 | 256 | 160 | 10 | 6 | 2 | 2 | 0 |
| 16 | 16 | 256 | 160 | 10 | 8 | 2 | 0 | 0 |
| 16 | 16 | 256 | 160 | 10 | 5 | 2 | 2 | 1 |
| 16 | 16 | 256 | 160 | 10 | 7 | 2 | 0 | 1 |
| 16 | 16 | 256 | 160 | 10 | 6 | 2 | 0 | 2 |
| 16 | 16 | 256 | 160 | 10 | 5 | 1 | 2 | 2 |

Tables 1 to 3 show an example where there exists one DPDCH which is a traffic channel. However, there may exist second, third and fourth DPDCHs according to the service types. Further, the downlink and uplink both may include several DPDCHs. Although the base station transmitter and the mobile station transmitter will be described with reference to the case where there exist three DPDCHs, the number of DPDCHs is not limited.

FIG. 3A shows a structure of the conventional base station transmitter. Referring to FIG. 3A, multipliers 111, 121, 131 and 132 multiply outputs of DPCCH, DPDCH$_1$ (or DSCH), DPDCH$_2$ and DPDCH$_3$ data generators 101, 102, 103 and 104, which have undergone channel encoding and interleaving, by their associated gain coefficients $G_1$, $G_2$, $G_3$ and $G_4$, respectively. The gain coefficients $G_1$, $G_2$, $G_3$ and $G_4$ may have different values according to circumstances such as the service option and the handover. A multiplexer (MUX) 112 time-multiplexes the DPCCH signal and the DPDCH$_1$ signal into the slot structure of FIG. 2A. A first serial-to-parallel (S/P) converter 113 distributes the output of the multiplexer 112 to an I channel and a Q channel. Second and third S/P converters 133 and 134 S/P-convert the DPDCH$_2$ and DPDCH$_3$ signals and distribute them to the I channel and the Q channel, respectively.

The S/P-converted I and Q channel signals are multiplied by channelization codes $C_{Ch1}$, $C_{Ch2}$ and $C_{Ch3}$ in multipliers 114, 122, 135, 136, 137 and 138, for spreading and channel separation. Orthogonal codes are used for the channelization codes. The I and Q channel signals multiplied by the channelization codes in the multipliers 114, 122, 135, 136, 137 and 138 are summed by first and second summers 115 and 123, respectively. That is, the I channel signals are summed by the first summer 115, and the Q channel signals are summed by the second summer 123. The output of the second summer 123 is phase shifted by 90° by a phase shifter 124. A summer 116 sums an output of the first summer 115 and an output of the phase shifter 124 to generate a complex signal I+jQ. A multiplier 117 scrambles the complex signal with a PN sequence $C_{scramb}$ which is uniquely assigned to each base station, and a signal separator 118 separates the scrambled signal into a real part and an imaginary part and distributes them to the I channel and the Q channel. The I and Q channel outputs of the signal separator 118 are filtered by lowpass filters 119 and 125, respectively, to generate bandwidth-limited signals. The output signals of the filters 119 and 125 are multiplied by carriers cos {$2\pi f_c t$} and sin {$2\pi f_c t$} in multipliers 120 and 126, respectively, to frequency-up convert the signals to a radio frequency (RF) band. An adder 127 sums the frequency-shifted I and Q channel signals.

FIG. 3B shows a structure of the conventional mobile station transmitter. Referring to FIG. 3B, multipliers 211, 221, 223 and 225 multiply outputs of DPCCH, DPDCH$_1$, DPDCH$_2$ and DPDCH$_3$ data generators 201, 202, 203 and 204, which have undergone channel encoding and interleaving, by their associated channelization codes $C_{ch1}$, $C_{ch2}$, $C_{ch3}$ and $C_{ch4}$, respectively, for spreading and channel separation. Orthogonal codes are used for the channelization codes. The output signals of the multipliers 211, 221, 223 and 225 are multiplied by their associated gain coefficients $G_1$, $G_2$, $G_3$ and $G_4$ in multipliers 212, 222, 224 and 226, respectively. The gain coefficients $G_1$, $G_2$, $G_3$ and $G_4$ may have different values.

The outputs of the multipliers 212 and 222 are summed by a first summer 213 and output as an I channel signal, and the outputs of the multipliers 224 and 226 are summed by a second summer 227 and output as a Q channel signal. The Q channel signal output from the second summer 227 is phase shifted by 90° in a phase shifter 228. A summer 214 sums the output of the first summer 213 and the output of the phase shifter 228 to generate a complex signal I+jQ. A multiplier 215 scrambles the complex signal with a PN sequence $C_{scramb}$ which is uniquely assigned to the mobile station, and a signal separator 229 separates the scrambled signal into a real part and an imaginary part and distributes them to the I channel and the Q channel. The I and Q channel outputs of the signal separator 229 are filtered by lowpass filters 216 and 230, respectively, to generate bandwidth-limited signals. The output signals of the filters 216 and 230 are multiplied by carriers cos {$2\pi f_c t$} and sin {$2\pi f_c t$} in multipliers 217 and 231, respectively, to frequency-up convert the signals to a radio frequency (RF) band. An adder 218 sums the frequency-up-converted I and Q channel signals.

FIG. 4A shows a conventional method of transmitting the downlink DPCCH and the uplink DPCCH in the RBS mode when transmission of the uplink DPDCH is discontinued. FIG. 4B shows a conventional method of transmitting the downlink DPCCH and the uplink DPCCH in the RBS mode when transmission of the downlink DPDCH is discontinued.

As illustrated in FIGS. 4A and 4B, the mobile station constantly transmits the uplink DPCCH in the RBS mode in order to avoid a resynchronization acquisition process in the base station. When there is no traffic data to transmit for a long time in the RBS mode, the base station and the mobile station make a transition to an RRC (Radio Resource Control) connection released state. In this state, transmission of the uplink DPDCH is discontinued, but the mobile station transmits pilot symbols and TPC (Transmit Power Control) bits over the DPCCH until the transition is completed, thereby there is an unnecessary interference in the uplink. The interference of the uplink causes a decrease in the capacity of the uplink.

In the conventional method, although continuous transmission of the uplink DPCCH is advantageous in that it is possible to avoid the sync reacquisition process in the base station, it increases interference to the uplink, causing a decrease in the capacity of the uplink. Further, in the downlink, continuous transmission of the uplink transmission power control (TPC) bits causes an interference of the downlink and a decrease in the capacity of the downlink. Therefore, it is necessary to minimize the time required for the sync reacquisition process in the base station, to minimize the interference due to transmission of the uplink DPCCH signal and to minimize the interference due to transmission of the uplink transmission power control(TPC) bits over the downlink.

SUMMARY OF THE INVENTION

It is, therefore, an object of the present invention to provide an apparatus and method for transmitting on and off a DPCCH signal when there is no traffic data(user data or signaling message) to transmit over a data channel for a predefined time in a mobile communication system.

It is another object of the present invention to provide an apparatus and method for gating slot data on the DPCCH in an irregular pattern when there is no traffic data to transmit over the data channel for a predefined time in a mobile communication system.

It is further another object of the present invention to provide an apparatus and method for performing a gated transmission procedure when there is no traffic data to transmit over the data channel for a predefined time, and randomly gating a given slot in a gating slot group unit set during the gated transmission procedure, in a mobile communication system.

It is yet another object of the present invention to provide an apparatus and method in which a base station performs a gated transmission procedure when there is no traffic data to transmit over the data channel for a predefined time, and randomly gates a given slot in a gating slot group unit set during the gated transmission procedure, in a mobile communication system.

It is still another object of the present invention to provide an apparatus and method in which a mobile station performs a gated transmission procedure upon receipt of a message for performing the gated transmission procedure from a base station, and randomly gates a given slot in a gating slot group unit set during the gated transmission procedure, in a mobile communication system.

It is still another object of the present invention to provide an apparatus and method for performing a gated transmission procedure when there is no traffic data to transmit over the data channel for a predefined time, and randomly gating a given slot in a gating slot group unit set as a connected frame number during the gated transmission procedure, in a mobile communication system.

It is still another object of the present invention to provide an apparatus and method for gating slot data on a DPCCH by transmitting a pilot symbol of a slot located before gated on slot and transmitting TFCI and TPC of the gated on slot, in a mobile communication system.

It is still another object of the present invention to provide an apparatus and method for controlling transmission power of control data using power control information while gating data on the DPCCH, in a mobile communication system.

To achieve the above and other objects, there is provided a method for transmitting control data on a downlink channel in a base station for a mobile communication system. The base station determines whether there is downlink data channel data to transmit to a mobile station. If there is no data to be transmitted over the downlink data channel (DCH or DSCH) for a predetermined time, the base station drives a random position selector to determine a gating slot position, gating on the control data in the determined slot position, and gating off the control data in other positions. All channel data is organized into a stream of frames, each frame includes a plurality of slots, the slots in each frame are divided into a plurality of gating slot groups, and the determined slot position is a randomized slot position in each gating slot group.

Preferably, the random position selector determines the gating slot position by calculating a value x by multiplying a system frame number (SFN) of a received signal by a specific integer; selecting n bits in a position which is at an x-chip distance from a start point of a corresponding Gold code before a plurality of gating durations used in generating a downlink signal; and determining a gating slot position of a corresponding gating slot group by performing a modulo operation by the number of the slots constituting the gating slot group on the selected bits.

BRIEF DESCRIPTION OF THE DRAWINGS

The above and other objects, features and advantages of the present invention will become more apparent from the following detailed description when taken in conjunction with the accompanying drawings in which:

FIG. 5A is a diagram illustrating a structure of a base station transmitter for gating data on the DPCCH according to an embodiment of the present invention;

FIG. 7B is a diagram illustrating another method for transmitting a signal when an uplink DPDCH message is generated while gating an uplink DPCCH in the RBS mode according to an embodiment of the present invention;

FIG. 8A is a diagram illustrating a method for transmitting downlink and uplink signals when transmission of a downlink DPDCH is discontinued according to an embodiment of the present invention;

FIG. 8C is a diagram illustrating another method for transmitting downlink and uplink signals when transmission of the downlink DPDCH is discontinued according to an embodiment of the present invention;

FIG. 8D is a diagram illustrating another method for transmitting downlink and uplink signals when transmission of the uplink DPDCH is discontinued according to an embodiment of the present invention;

FIG. 9A is a diagram illustrating a method for transmitting downlink and uplink signals when transmission of a downlink DPDCH is discontinued (gated transmission for the downlink DPCCH) according to an embodiment of the present invention;

FIGS. 12A and 12B are diagrams illustrating gated transmission for downlink and uplink DPCCHs according to a fifth embodiment of the present invention;

FIG. 14B is a diagram illustrating gated transmission for downlink and uplink DPCCHs according to a tenth embodiment of the present invention;

FIG. 17B is a diagram illustrating a power control time relationship when ⅕ rate gating is applied to both the downlink and the uplink according to an embodiment of the present invention;

DETAILED DESCRIPTION OF THE PREFERRED EMBODIMENT

Figure 1A:
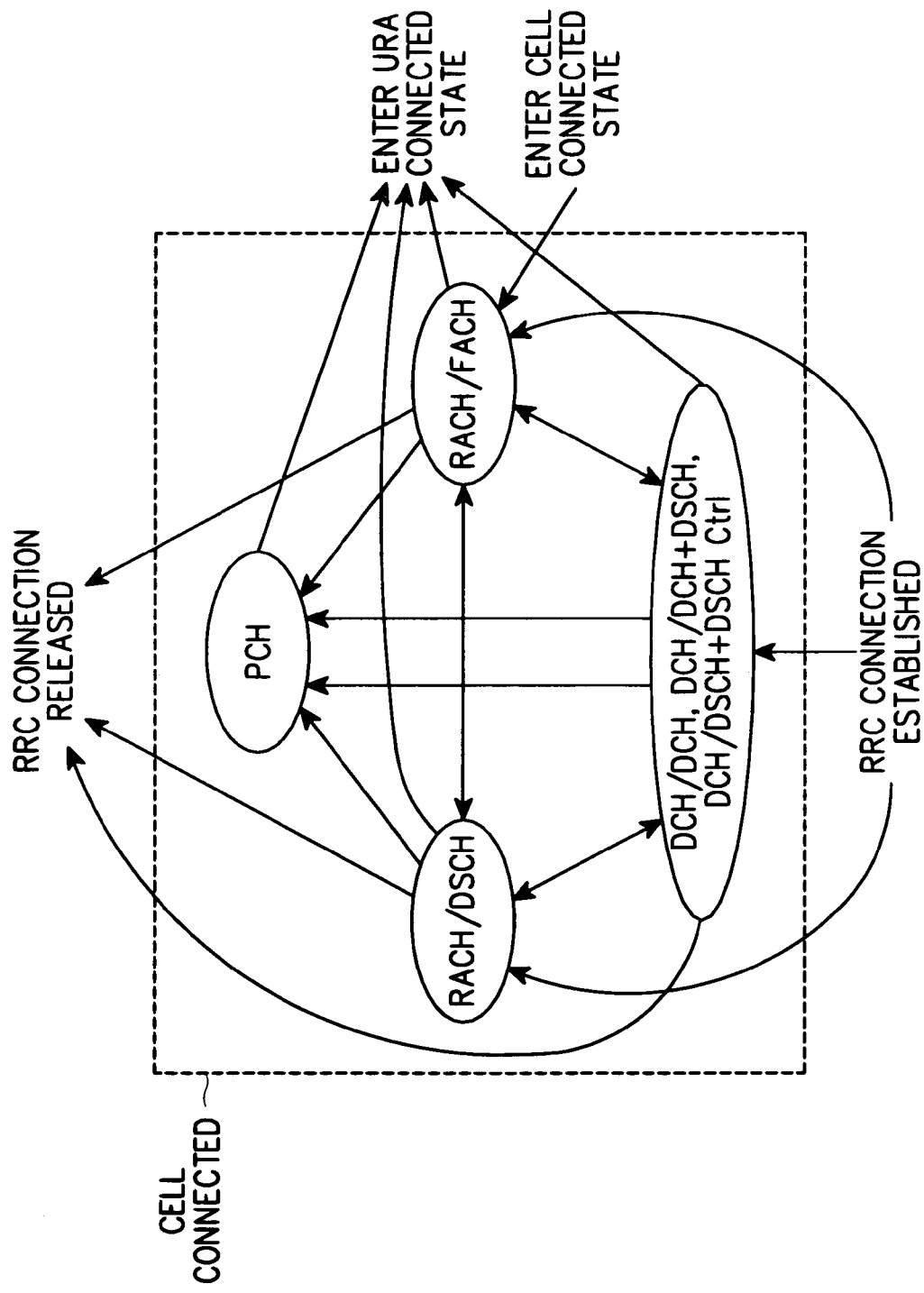
FIG. 1A is a conventional state transition diagram for a packet data service.
Figure 1B:
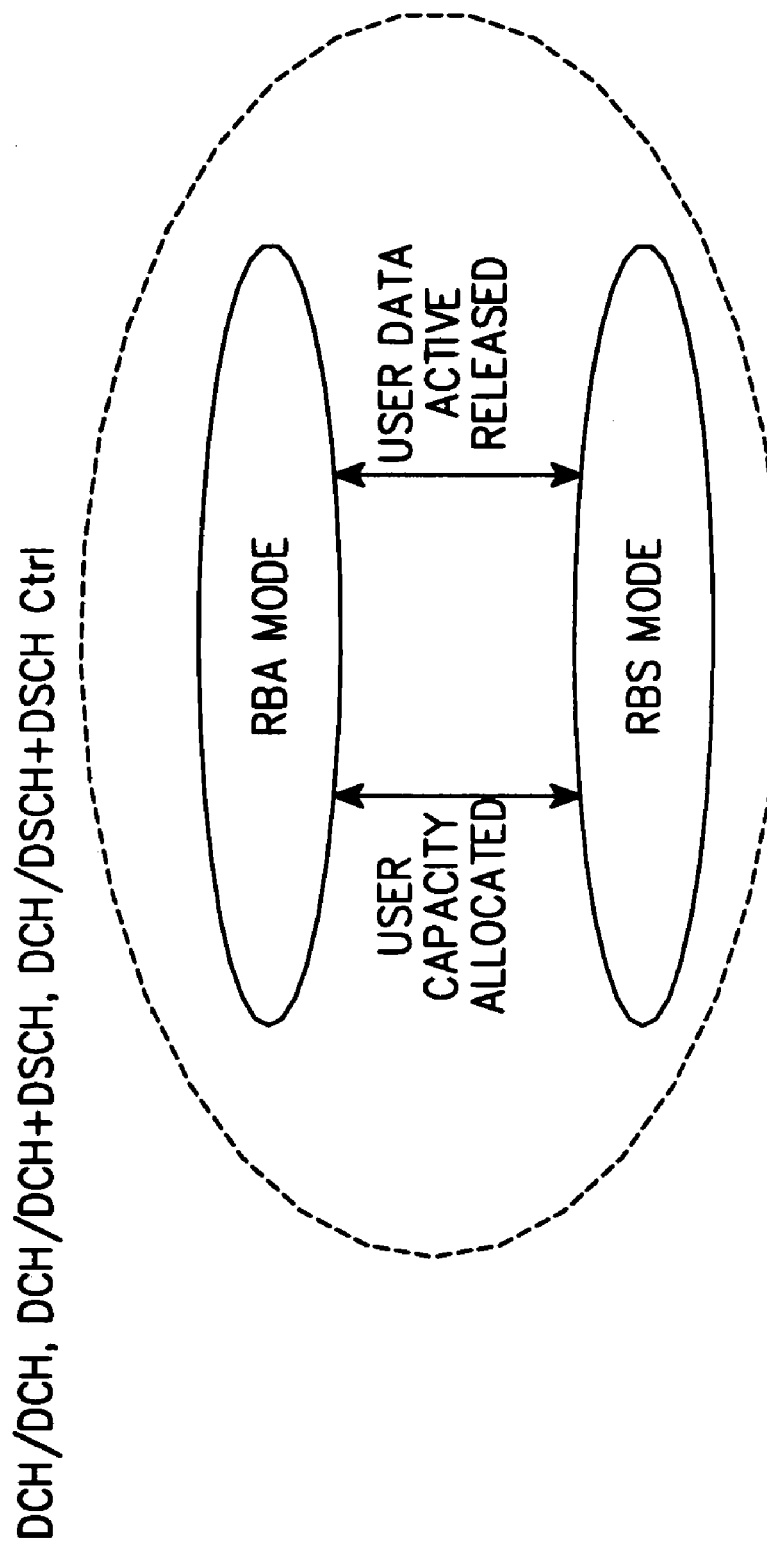
FIG. 1B is a conventional state transition diagram between a RBA mode and a RBS mode of the DCH/DCH state.

A preferred embodiment of the present invention will be described herein below with reference to the accompanying drawings. In the following description, well-known functions or constructions are not described in detail since they would obscure the invention in unnecessary detail.

The term "normal transmission" as used herein refers to continuously transmitting TFCI, TPC and pilot symbol included in the downlink or uplink DPCCH. Further, the term "gated transmission" refers to transmitting TFCI, TPC and pilot symbol included in the downlink or uplink DPCCH, only at a specific power control group (or slot) according to a predetermined pattern, or refers to gated on transmission of a DPCCH signal only at a pilot symbol of a slot located before gated on slot and TFCI and TPC of the gated on slot according to a predetermined gated on pattern. The information, transmission of which is discontinued in the downlink DPCCH during gated transmission, may include either all or some of the TFCI, TPC and pilot symbol in one power control group (or slot). In addition, the term "gating position selection" as used herein refers to selecting a position of a slot for transmitting data on the DPCCH during gated transmission, and "gating position" refers to the slot selected for transmitting the control data. Further, the term "control data" as used herein refers to a DPCCH signal, and the term "traffic data" refers to signaling data and/or user data which is transmitted in bursts between the base station and the mobile station. TFCI, TPC, FBI (Feedback Indicator) and pilot symbol are included in the "control data". Although the invention will be described with reference to an example of gating data on the DPCCH, the gated transmission method according to the present invention can also be applied to the case of gating control data on any other channel which periodically transmits control data.

The gated transmission operation, which will be described later, can be applied to either the case when the gated transmission unit is equal to the slot unit, or the case when the gated transmission unit is not equal to the slot unit. When the gated transmission unit is not equal to the slot unit, it is preferable to gate TPC, TFCI and pilot symbol differently. That is, an nth pilot symbol and (n+1)th TFCI and TPC are set as a gated transmission unit.

In addition, since performance at the beginning of a frame is very important, the preferred embodiments of the present invention locate the TPC, which is for controlling the power of the first slot of the next frame, at the last slot of one frame. That is, TPC bits for the downlink DPCCH and the uplink DPCCH are located at the last slot of the nth frame, and power of the first slot of the (n+1)th frame is controlled using the TPC bits existing at the last slot of the nth frame.

In an exemplary embodiment of the present invention, when the mobile communication system performs gated transmission, the base station and the mobile station determine positions of the gating slots according to either a predetermined regular pattern, or an irregular pattern determined by setting given slots in a gating slot group as gating positions using the System Frame Number (SFN) and the Connection Frame Number (CFN). Further, in the mobile communication system, a DPDCH and one frame of the DPDCH can be comprised of a plurality of slots. In the various embodiments of the present invention, one frame can be comprised of 15 or 16 slots, and the invention will be described here for both cases. Below, the gated transmission operation performed in the regular pattern will be described with reference to the case where one frame is comprised of 16 slots, and the gated transmission performed in the irregular pattern will be described with reference to the case where one frame is comprised of 15 slots.

Figure 2A:
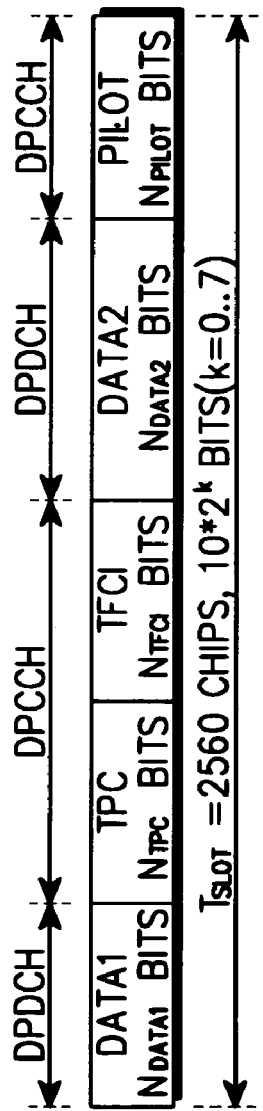
FIG. 2A is a diagram illustrating a slot structure of downlink DPDCH and DPCCH in a CDMA communication system.
Figure 2B:
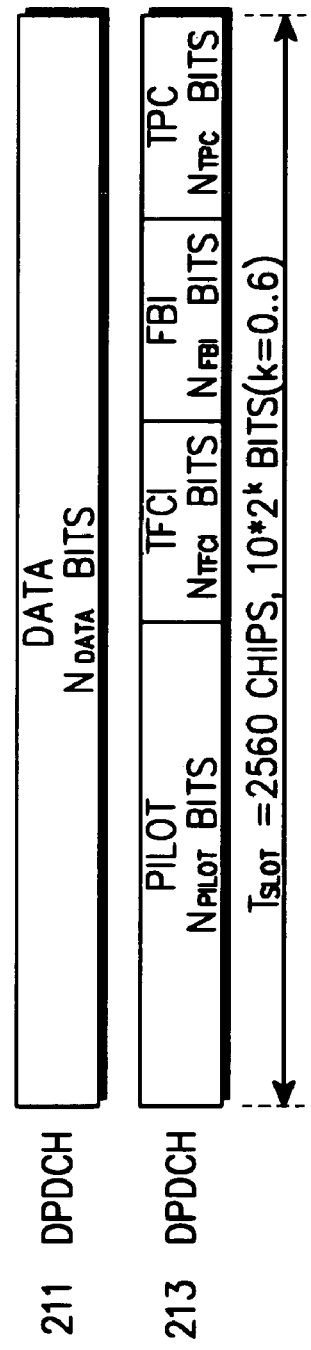
FIG. 2B is a diagram illustrating a slot structure of uplink DPDCH and DPCCH in a CDMA communication system.
Figure 15A:
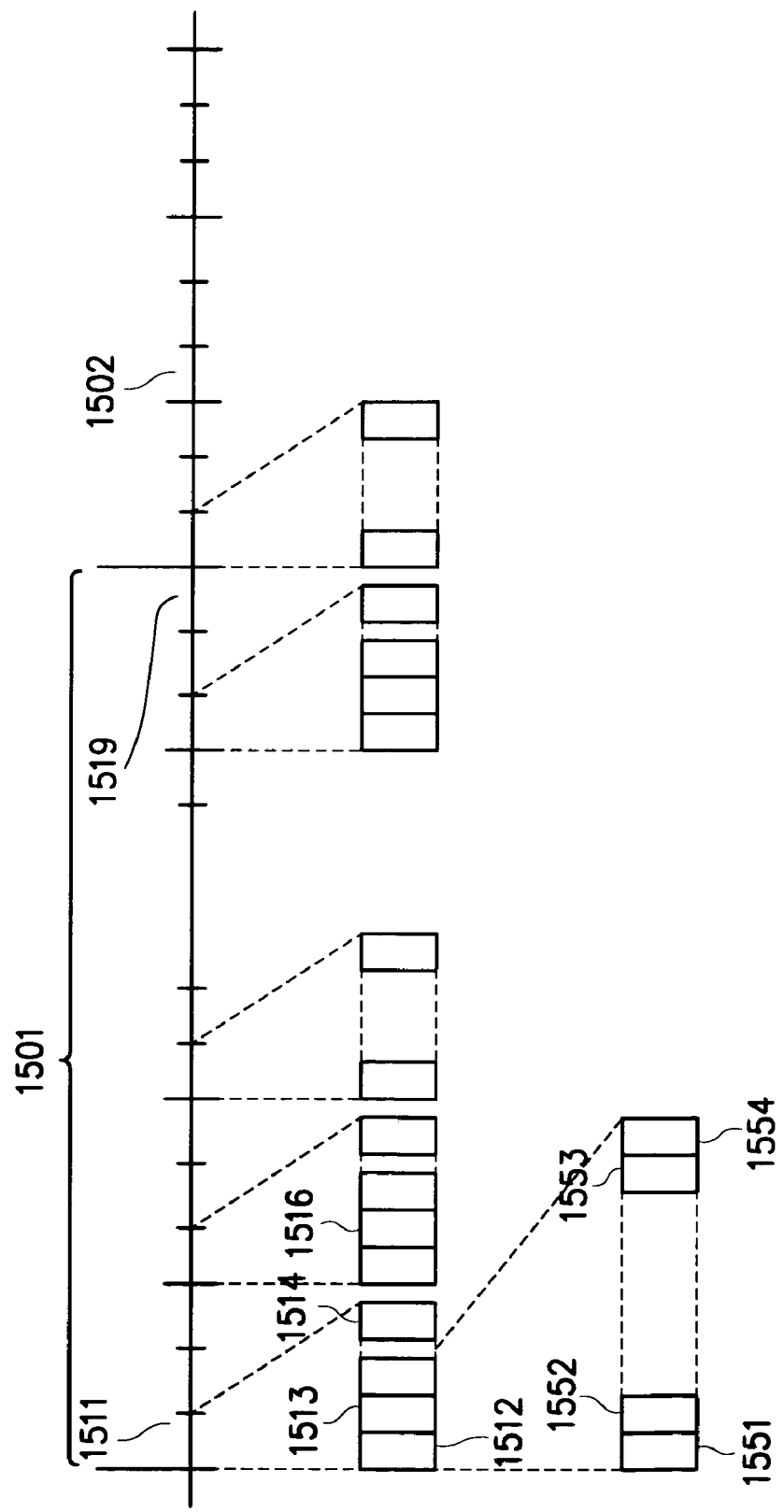
FIG. 15A is a diagram illustrating a method for extracting a partial sequence required to generate a gated transmission pattern from an uplink scrambling code according to an embodiment of the present invention.
Figure 15B:
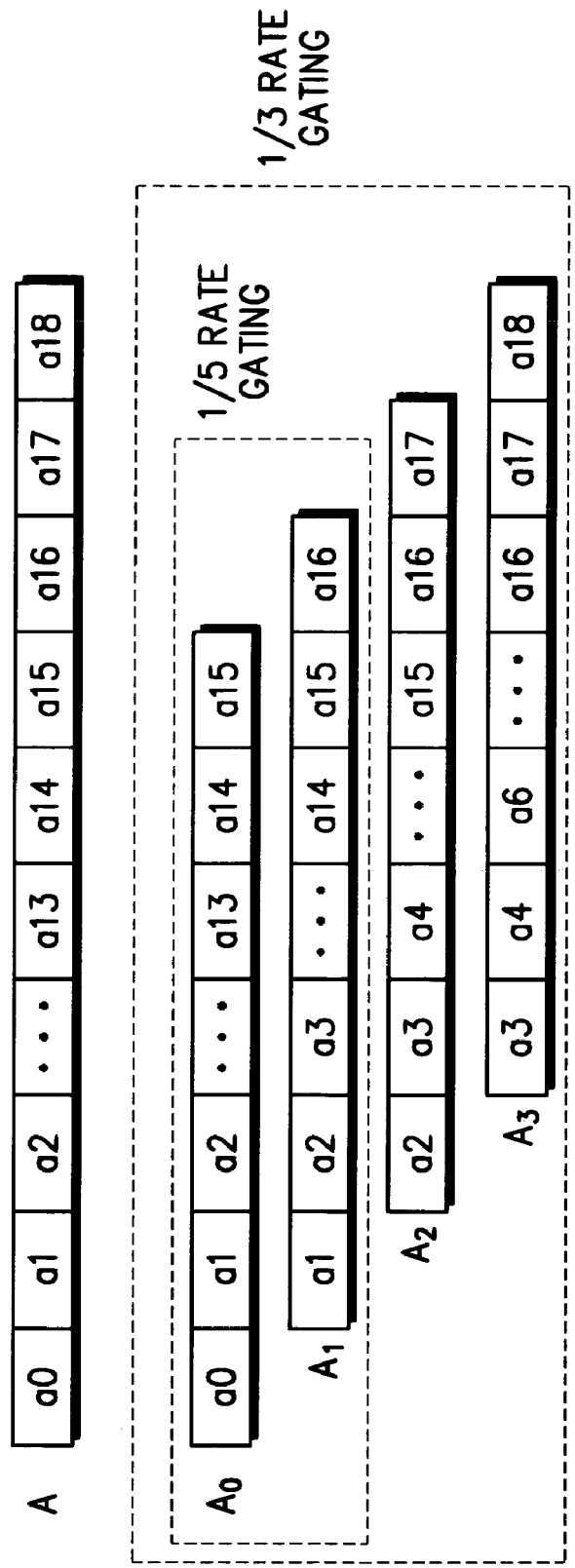
FIG. 15B is a diagram illustrating a method for extracting an n-bit sequence required to generate a gated transmission pattern from a fixed sequence according to an embodiment of the present invention.
Figure 16:
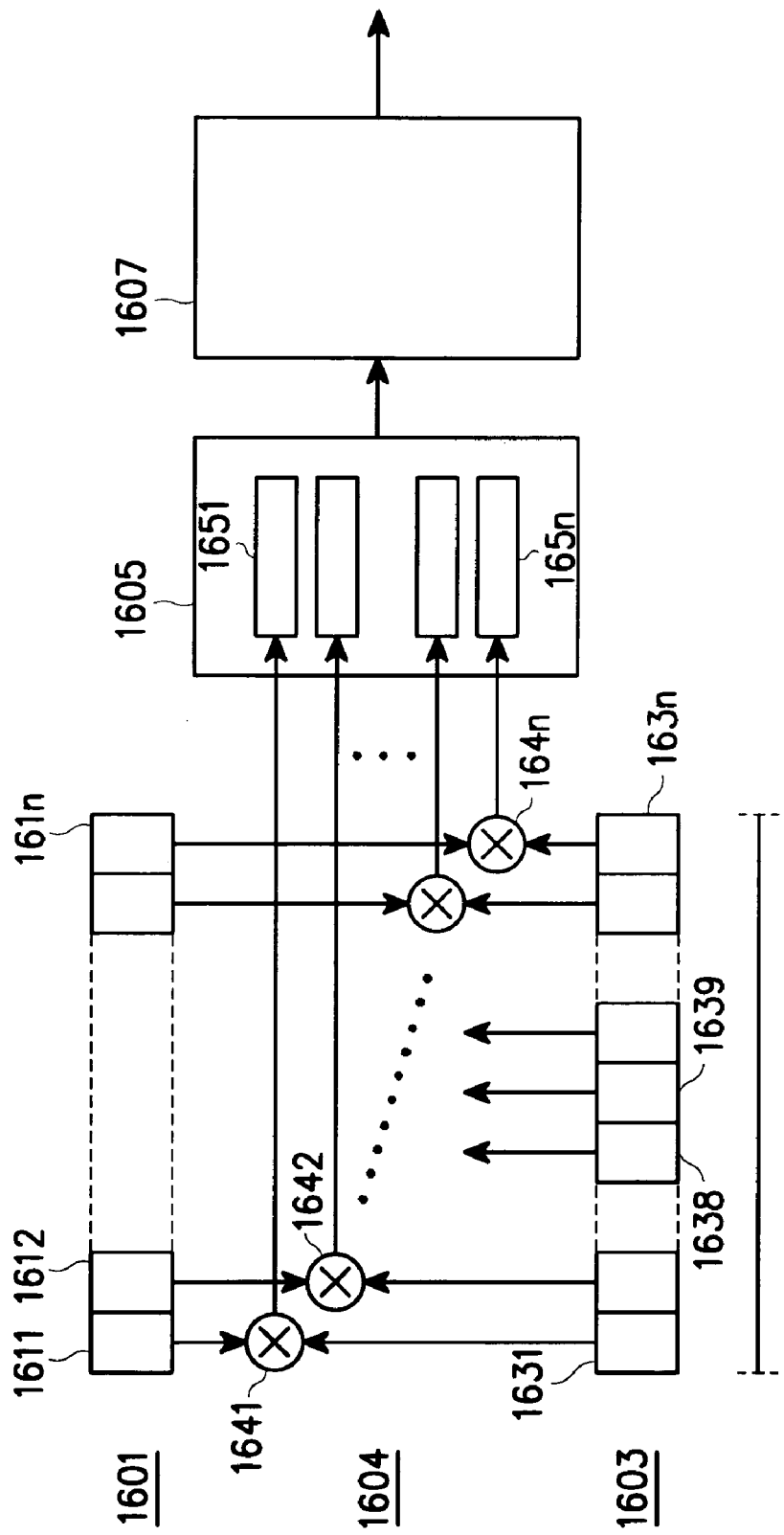
FIG. 16 is a diagram illustrating a structure of a gating position selector for selecting a gating position by using the uplink scrambling code of FIG. 15A and the fixed sequence of FIG. 15B together with CFN according to an embodiment of the present invention.

The invention will be described focusing on the process of performing ⅓ and ⅕ rate gated transmission on the downlink and uplink DPCCHs of FIGS. 2A and 2B. It is also possible to determine gating positions according to random patterns as shown in FIGS. 15A, 15B and 16.

A hardware structure according to an embodiment of the invention will be described below.

Figure 3A:
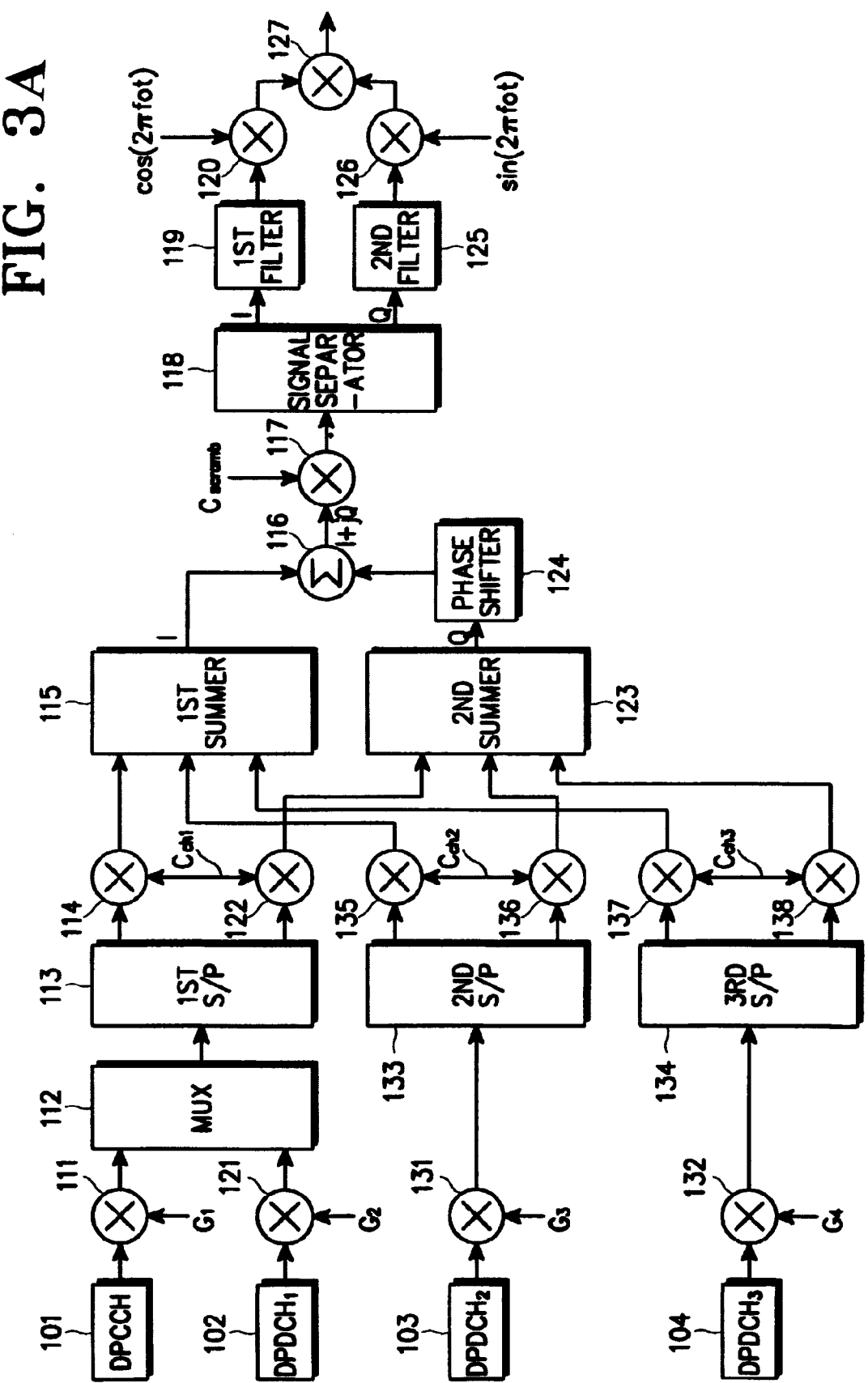
FIG. 3A is a diagram illustrating a structure of a conventional base station transmitter in a CDMA communication system.

FIG. 5A shows a structure of a base station transmitter according to an embodiment of the present invention. The base station transmitter is different from the conventional one of FIG. 3A in that with regard to the downlink DPCCH, the output of the multiplier 111 is gated by a gated transmission controller 141. That is, the gated transmission controller 141 performs gated transmission on a pilot symbol of one slot of the downlink DPCCH and TFCI and TPC bits of the next slot in a pattern scheduled with the mobile station, when the traffic data to be transmitted over the downlink DPDCH is not generated for a predetermined time or when traffic data is not received over the uplink DPDCH for a predetermined time. In addition, the gated transmission controller 141 performs gated transmission on one power control group (or one entire slot) including the pilot symbols, TFCI and TPC bits for the downlink DPCCH at a power control group (or time slot) scheduled with the mobile station in the RBS mode where the traffic data is not transmitted over the downlink and uplink DPDCHs.

When the downlink and uplink DPCCH signals are simultaneously gated, the downlink gating pattern is equal to the uplink gating pattern, but an offset may exist between them for efficient power control. The offset can be given as a system parameter or can be known by a message indicating the start of gated transmission. The gating start indication message is transmitted from the base station to the mobile station to indicate a start point of gated transmission and a gating rate, after traffic data to be transmitted over the DPDCH is not generated for a predetermined time. This message can also be transmitted from the mobile station to the base station. In addition, the base station can determine a gating start indication message in response to a gating request of the mobile station, and transmit the determined message to the mobile station.

The gated transmission controller 141 can gate either the slot data on the DPCCH or the control data of multiple slots. One slot of the DPCCH is comprised of the control data such as pilot symbol, TFCI and TPC (in the mobile station, FBI is further included). During gated transmission, the gated transmission controller 141 can gate the entire control data included in the slot of the gating position. As an alternative method, the gated transmission controller 141 can gate a pilot symbol of an nth slot duration located before an (n+1)th slot of the gating position, and TPC and TFCI bits of the (n+1)th slot. This embodiment of the present invention will be described with reference to the latter method.

In addition, the gated transmission controller 141 locates the TPC bits at the last slot of one frame, where the TPC bits are for power controlling the first slot of the next frame in order to guarantee performance of the beginning part of the next frame. That is, the TPC bits for the downlink DPCCH and the uplink DPCCH are located at the last slot of the nth frame, and power of the first slot of the (n+1)th frame is controlled using the TPC bits existing at the last slot of the nth frame.

When the mobile station performs gated transmission and the base station does not perform gated transmission, the base station transmitter determines a TPC (Transmit Power Control) bit by measuring the one DPCCH slot signal discontinuously transmitted from the mobile station and then transmits the determined TPC bit at every slot until the base station determines new TPC bit by measuring another up link DPCCH slot signal.

Figure 3B:
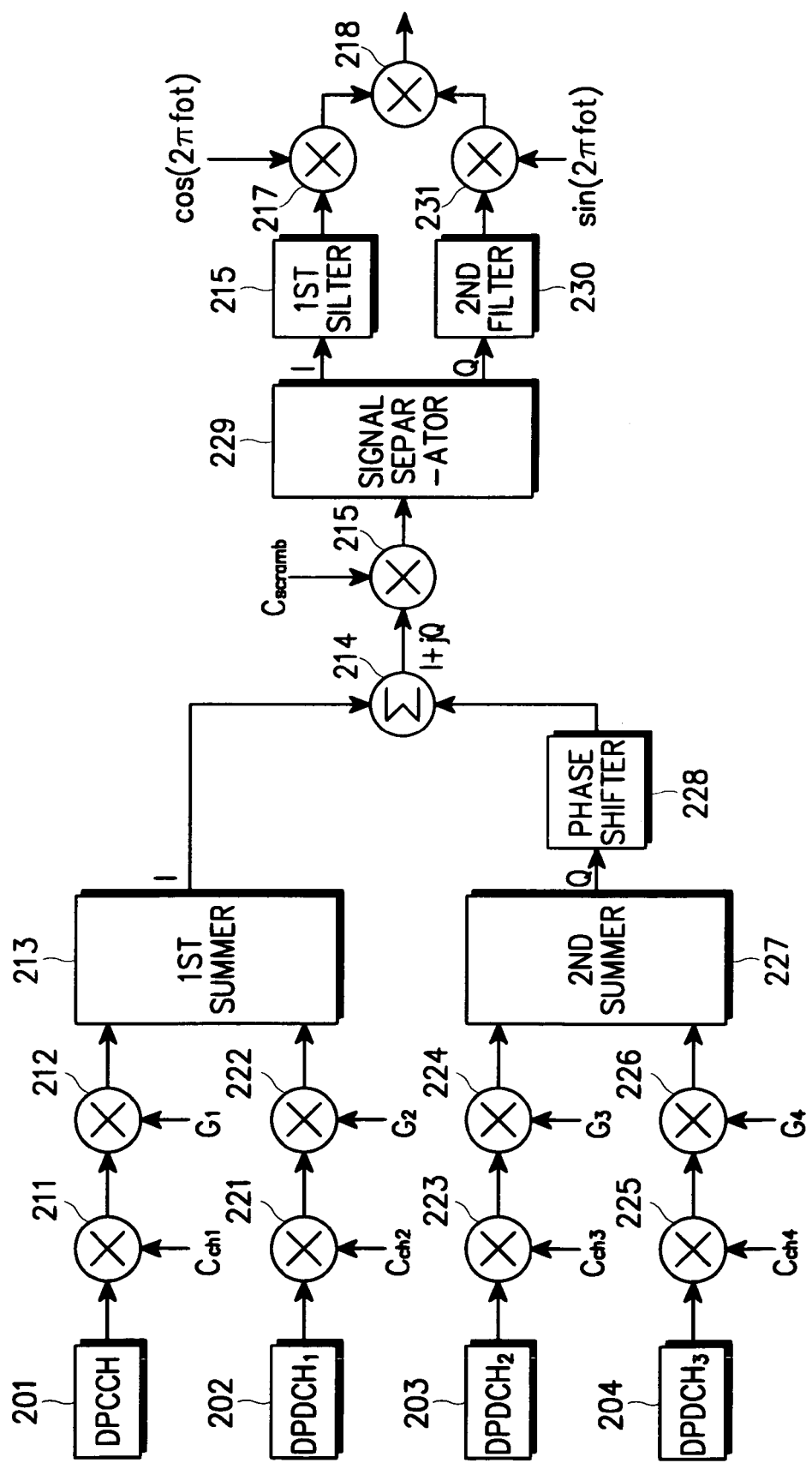
FIG. 3B is a diagram illustrating a structure of a conventional mobile station transmitter in a CDMA communication system.
Figure 4A:
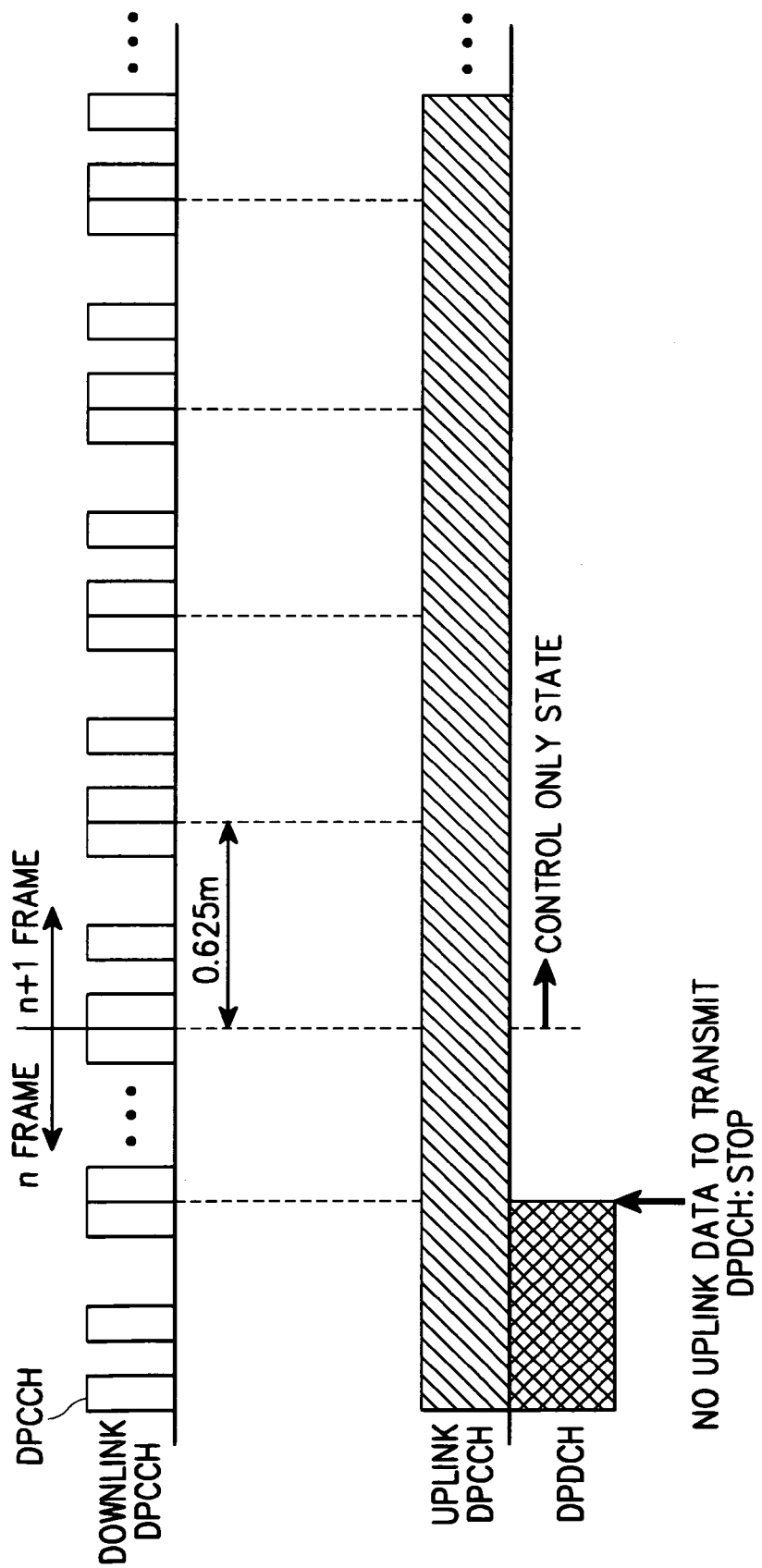
FIG. 4A is a diagram illustrating a conventional method of transmitting a downlink DPCCH and an uplink DPCCH when transmission of an uplink DPDCH is discontinued in the RBS mode in a CDMA communication system.
Figure 4B:
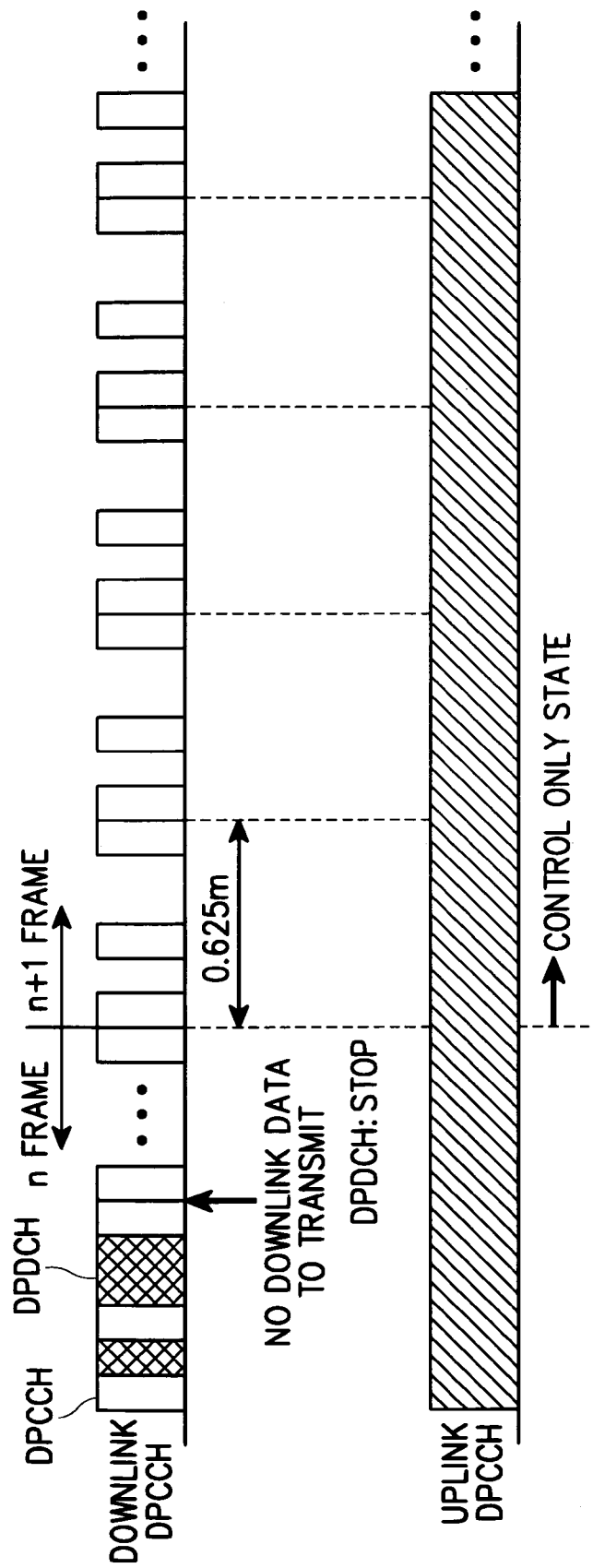
FIG. 4B is a diagram illustrating a conventional method of transmitting the downlink DPCCH and the uplink DPCCH when transmission of a downlink DPDCH is discontinued in the RBS mode in a CDMA communication system.
Figure 5B:
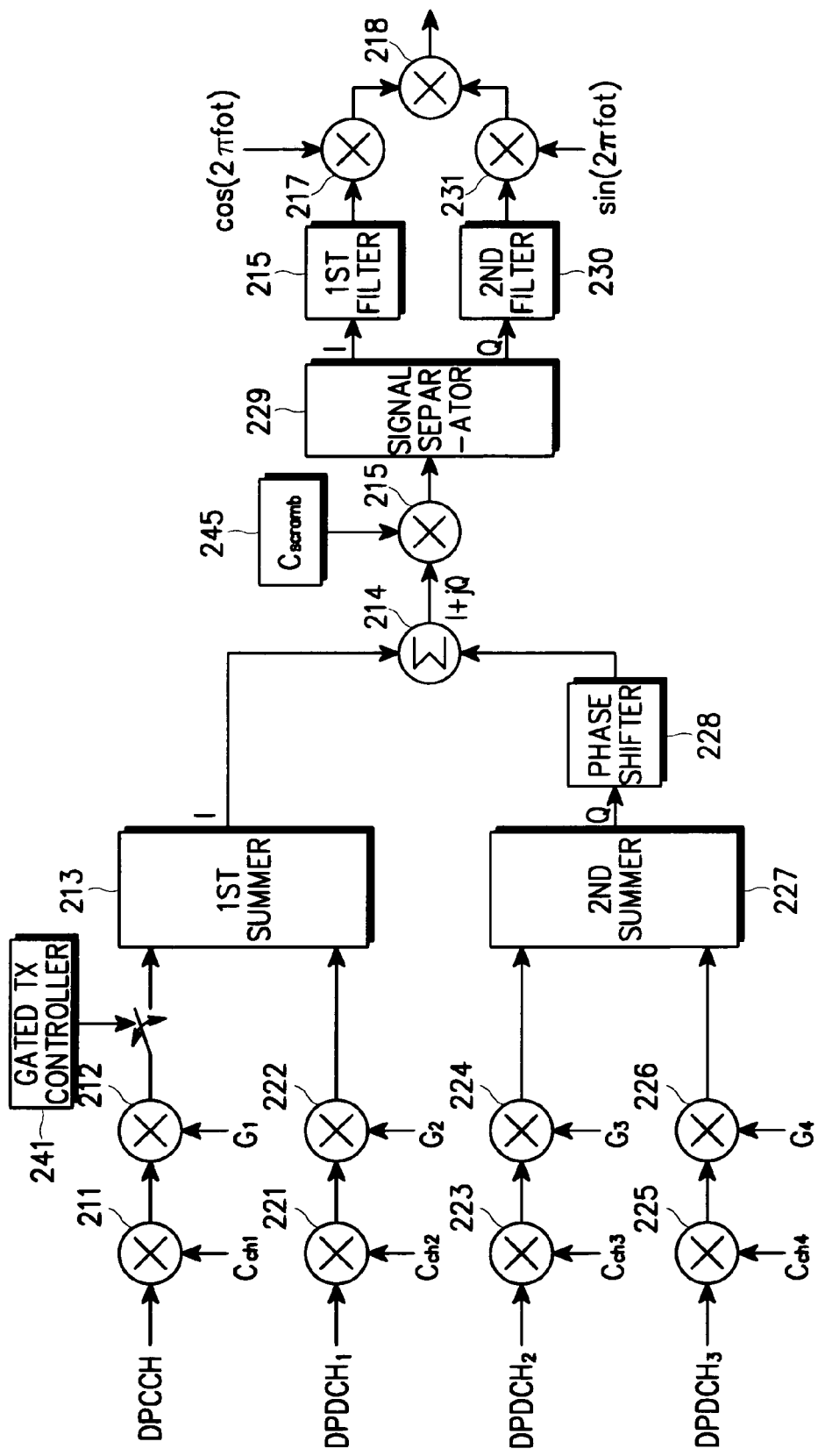
FIG. 5B is a diagram illustrating a structure of a mobile station transmitter for gating data on the DPDCH according to an embodiment of the present invention.

FIG. 5B shows a structure of a mobile station transmitter according to an embodiment of the present invention. The mobile station transmitter is different from the conventional one of FIG. 3B in that a gated transmission controller 241 is provided to gate transmission of the uplink DPCCH. That is, the gated transmission controller 241 performs gated transmission on one power control group (or one entire slot) including the pilot symbols, TFCI, FBI and TPC bits for the uplink DPCCH at a power control group (or time slot) scheduled with the base station, when traffic data to be transmitted over the downlink and uplink data channels (DPDCH or DSCH) is not generated for a predetermined time or when traffic data to be transmitted over the uplink DPDCH is not generated for a predetermined time.

Now, a description will be made of a transmission signal structure of the base station and the mobile station according to an embodiment of the present invention.

Figure 6A:
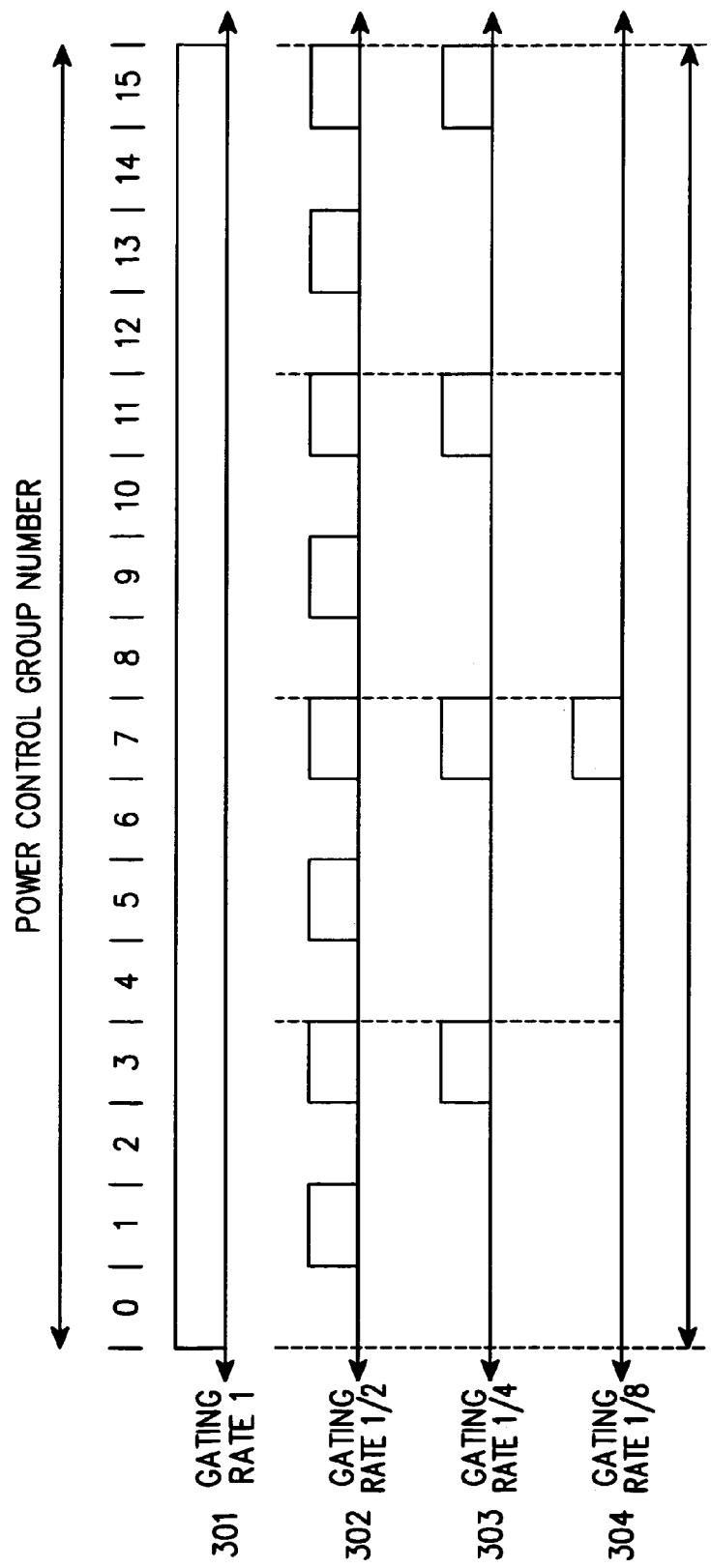
FIG. 6A is a diagram illustrating a method for transmitting a signal according to a regular or gated transmission pattern for an uplink DPCCH in the RBS mode according to an embodiment of the present invention.

FIG. 6A shows a method for transmitting an uplink DPCCH signal according to a regular or gated transmission pattern when there is no data to be transmitted over the DPDCH for a predetermined period of time according to an embodiment of the present invention. In FIG. 6A, reference numerals 301, 302, 303 and 304 show different gating rates according to duty cycles (hereinafter, referred to as DC). Herein, the "duty cycle" (or "DC") and the "gating rate" are used to refer to the same thing. Reference numeral 301 shows a conventional method for transmitting the uplink DPCCH without gating (DC=1), and reference numeral 302 shows a method for regularly transmitting every other power control group (or time slot), when DC=½ (only ½ of all the slots in one frame are transmitted). Reference numeral 303 shows a method for regularly transmitting every fourth slot(3rd, 7th, 11th and 15th slots), when DC=¼ (only ¼ of all the slots in one frame are transmitted). Reference numeral 304 shows a method for regularly transmitting every eighth slots (7th and 15th slots), when DC=⅛ (only ⅛ of all the slots in one frame are transmitted).

In the embodiment of FIG. 6A, when DC=½ and ¼, although the gated transmission controller 241 of the mobile station regularly gates the slots of the uplink DPCCH, it is also possible to gate arbitrary slots according to the corresponding DC. That is, when DC=½, it is also possible to continuously gate adjacent arbitrary slots according to an irregular pattern, rather than regularly transmitting every other slot. Further, when DC=½, it is also possible to continuously transmit half of all the slots at the second half (8th to 15th slots) of the frame. When DC=¼, it is also possible to continuously transmit ¼ of all the slots beginning at a ¾ point of the frame (i.e., 12th to 15th slots). When DC=⅛, it is also possible to continuously transmit ⅛ of all the slots beginning at a ⅞ point of the frame (i.e., 14th to 15th slots).

The gating rate can be varied during gated transmission. For this, the mobile station and the base station should know when and which gating rate they will use, so that it is necessary to transmit a message for this. The gating rate is determined at the start of gated transmission and preferably, not changed during the gated transmission.

Figure 6B:
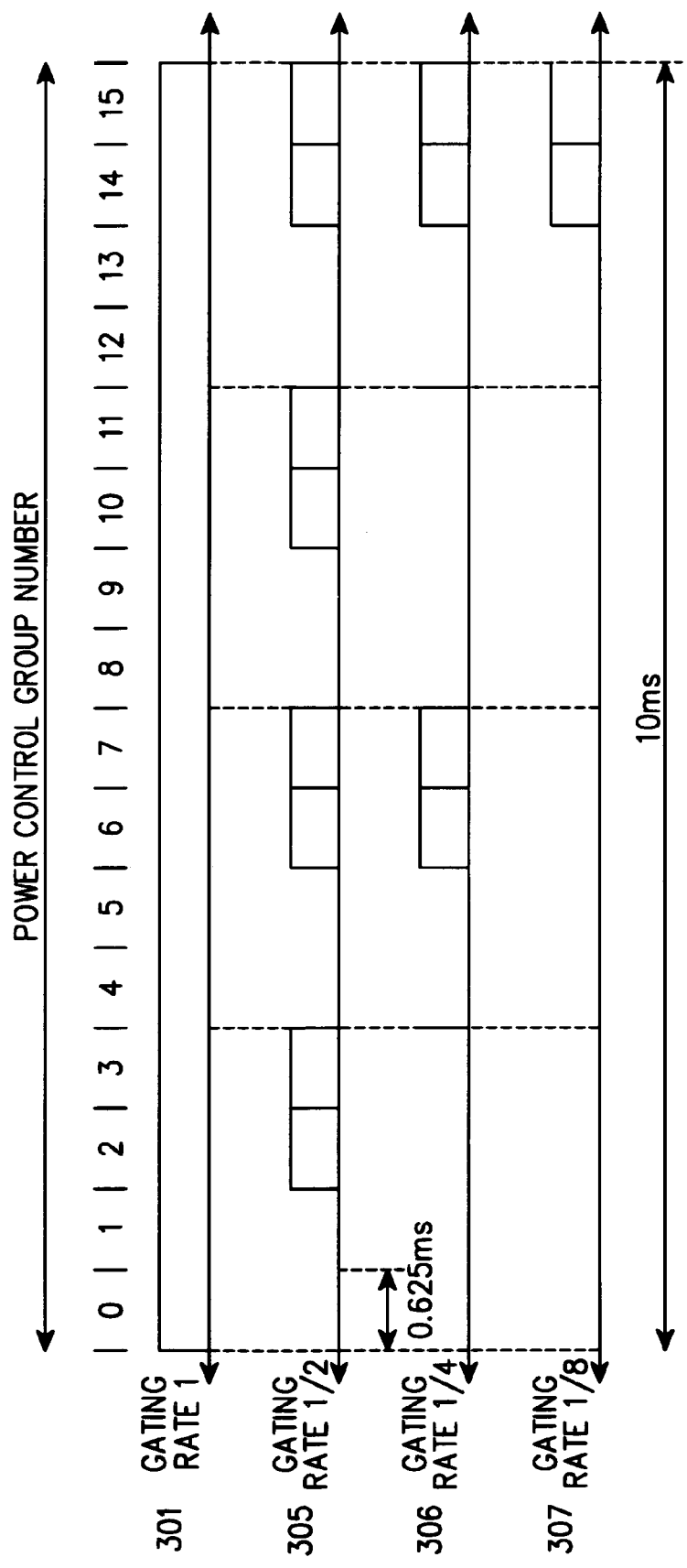
FIG. 6B is a diagram illustrating another method for transmitting a signal according to a regular or gated transmission pattern for an uplink DPCCH in the RBS mode according to an embodiment of the present invention.

FIG. 6B shows a method for transmitting a signal according to a regular or gated transmission pattern for the uplink DPCCH according to another embodiment of the present invention. In FIG. 6B, reference numerals 305, 306 and 307 show different gating rates according to a ratio of a duty cycle DC. Reference numeral 305 shows a method for transmitting two consecutive slots at regular locations ($2^{nd}$–$3^{rd}$, $6^{th}$–$7^{th}$, $10^{th}$–$11^{th}$ and $14^{th}$–$15^{th}$ slots), when DC=½ (only ½ of all the slots in one frame are transmitted). Reference numeral 306 shows a method for transmitting two consecutive slots at regular locations ($6^{th}$–$7^{th}$ and $14^{th}$–$15^{th}$ slots), when DC=¼ (only ¼ of an slots in one frame are transmitted). Reference numeral 307 shows a method for transmitting two consecutive slots at regular locations ($14^{th}$–$15^{th}$ slots), when DC=⅛ (only ⅛ of all the slots in one frame are transmitted).

In the embodiment of FIG. 6B, when DC=½ and ¼, although the gated transmission controller 241 of the mobile station regularly gates the slots of the uplink DPCCH, it is also possible to gate arbitrary slots out of all the slots according to the corresponding DC. That is, when DC=½, it is also possible to continuously gate 4 consecutive slots (e.g., $2^{nd}$–5 slots) according to an irregular pattern, rather than regularly transmitting every other 2 consecutive slots.

Next, a description will be made of signal transmission diagrams of the base station and the mobile station according to another embodiment, in which the slot gating positions are selected such that a signal should be transmitted at one of consecutive three or five consecutive slots. The embodiment will be described for the gating rate of ⅓ or ⅕, in the case where one frame includes 15 slots (i.e. power control groups).

Figure 5C:
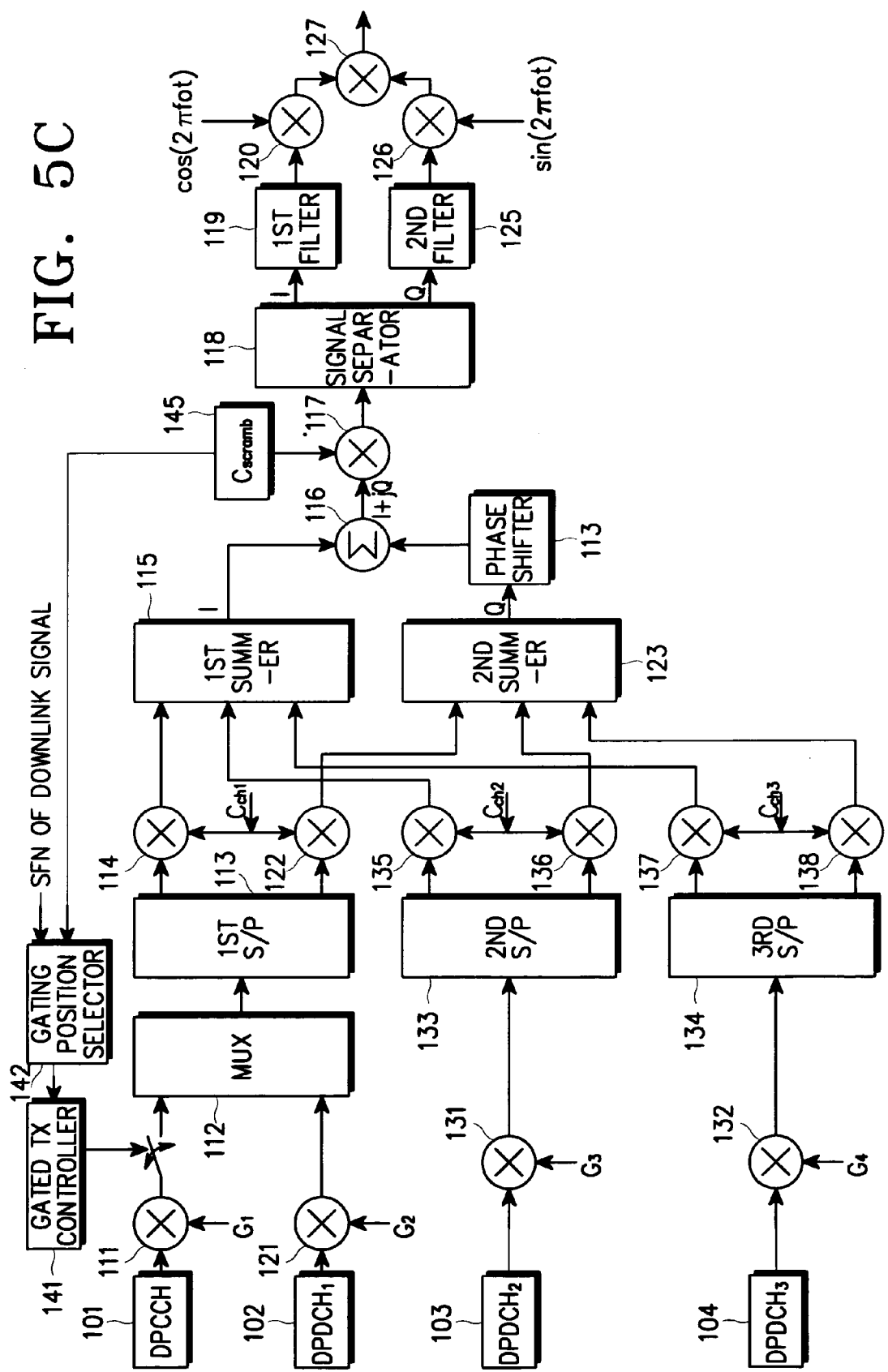
FIG. 5C is a diagram illustrating a structure of a base station transmitter with a gating position selector, for gating data on the DPDCH according to an embodiment of the present invention.

FIG. 5C shows a structure of a base station transmitter with a gating position selector according to an embodiment of the present invention. The base station transmitter is different from that of FIG. 5A in that the positions of the transmission slots for the downlink DPCCH are selected by a gating position selector 142.

Figure 5D:
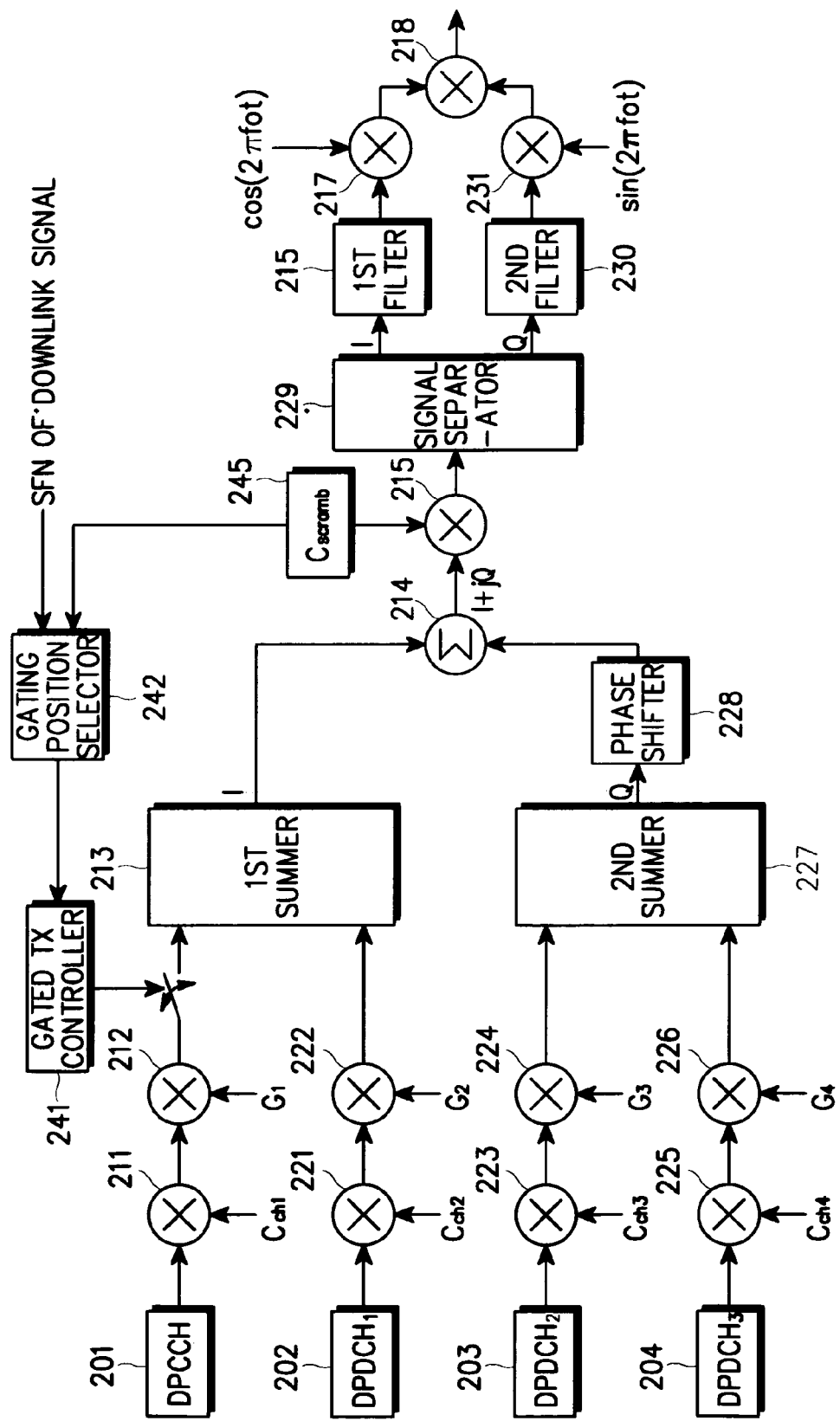
FIG. 5D is a diagram illustrating a structure of a mobile station transmitter with a gating position selector, for gating data on the DPDCH according to an embodiment of the present invention.

FIG. 5D shows a structure of a mobile station transmitter with a gating position selector according to an embodiment of the present invention. The base station transmitter is different from that of FIG. 5B in that the positions of the transmission slots for the uplink DPCCH are selected by a gating position selector 242.

Arranging the gating positions of the slots irregularly is to prevent electromagnetic wave-related bad effects due to the power of the regularly transmitted signals. In this embodiment, a scrambling code is used to irregularly gating the transmission signals.

One method for selecting the gating positions of the gating slot is to use the system frame number (SFN) of a downlink signal immediately before transmission of an uplink signal, and a scrambling code generated to descramble a received downlink signal in the mobile station. The mobile station reads a code bits in a specific position of the scrambling code using the SFN of the downlink signal, and determines the gating slots using the read value. Since the SFN value of 0 to 71 is continuously transmitted over a broadcasting channel from the base station, the mobile station can read the SFN by receiving data on the broadcasting channel. For the scrambling code, a secondary scrambling code or a primary scrambling code can be used. If the base station knows the gating position of the mobile station, it can exactly receive the data gated-on by the mobile station. Therefore, it is preferable that the gating position should be agreed between the transmission side and the receiving side. For this agreement, this embodiment uses a scrambling code with a random property, which is equally used by the base station and the mobile station, and the SFN for reducing the periodicity, thereby to determine a position of a slot to be gated.

The gating position controller 242(FIG. 5D) of the mobile station determines a position of the slot to be gated on by using a Gold code, which is a real part of a scrambling code generated internally to descramble a received signal, and the SFN of the received signal. When DC=3, the gating position controller 242 selects one slot in an arbitrary position out of 3 slots (gating slot group), and when DC=5, the gating position controller 242 selects one slot in an arbitrary position out of 5 slots (gating slot group). Herein, the 3-slot duration for DC=⅓ and the 5-slot duration for DC=⅕ will be referred to as "gating duration" or "gating slot group".

A first method for randomly determining the slot to be gated on in a gating slot group unit according to an embodiment of the present invention is determined in the following order. FIGS. 13A, 13B, 14A, and 14B are related to this method.

1. A system frame number (SFN) 0 to 71 of a signal received immediately before transmission is multiplied by an integer between 1 and 35. Let the calculation result be 'x' ($0 \leq x \leq 2485$).

Figure 13A:
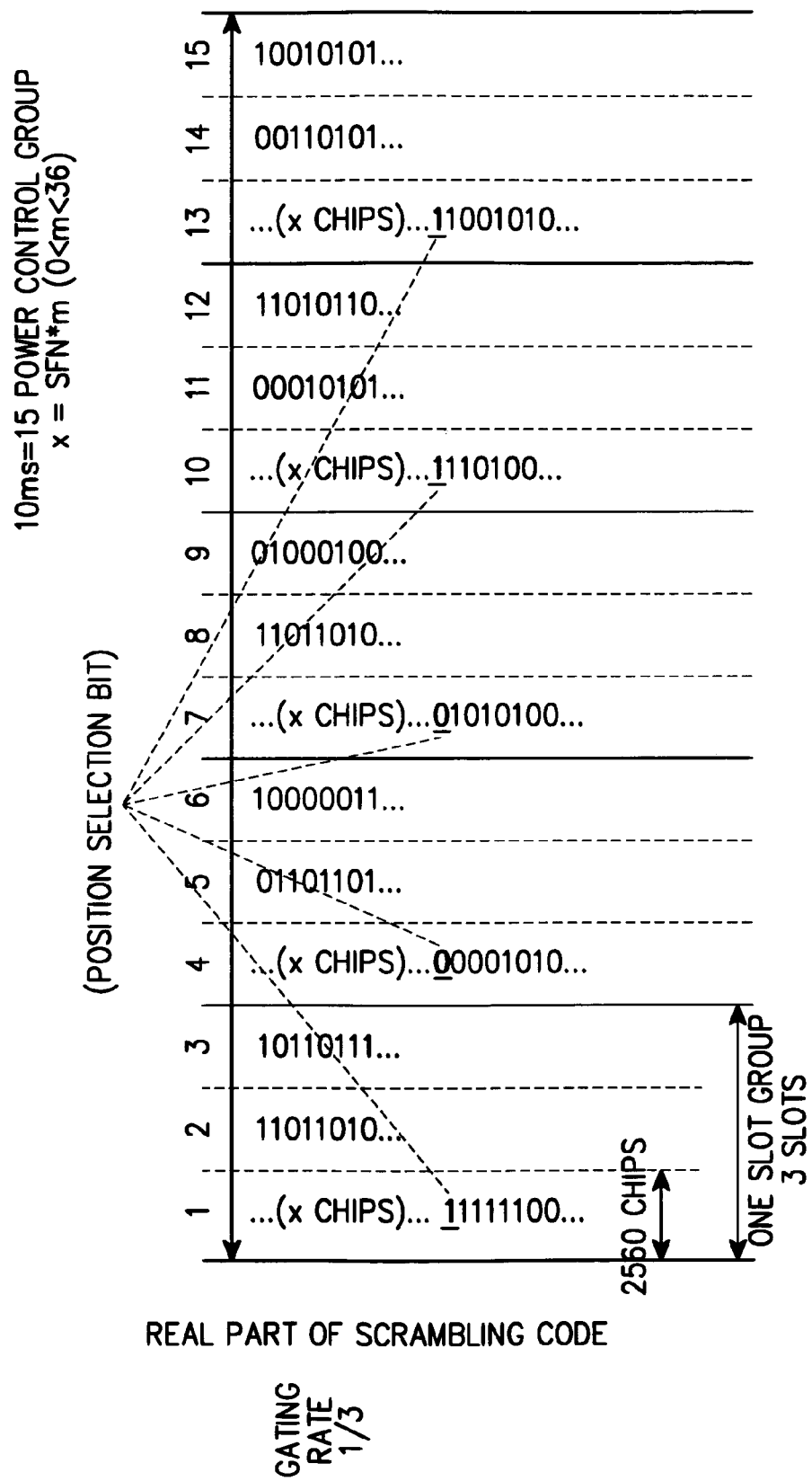
FIG. 13A is a diagram illustrating a method for determining a position selection bit during gated transmission of the downlink and uplink DPCCHs according to the first embodiment of the present invention.

2a. For DC=⅓, one bit of the real part of the scrambling code is selected in the position which is at an x-chip apart from the boundary of gating group, as shown in FIG. 13A. The selected one bit can be used for determining the position of gating slot in the following gating slot group. That is, the position of gating slot in current gating slot group can be determined based on the one bit selected in the previous gating slot group.

Figure 13B:
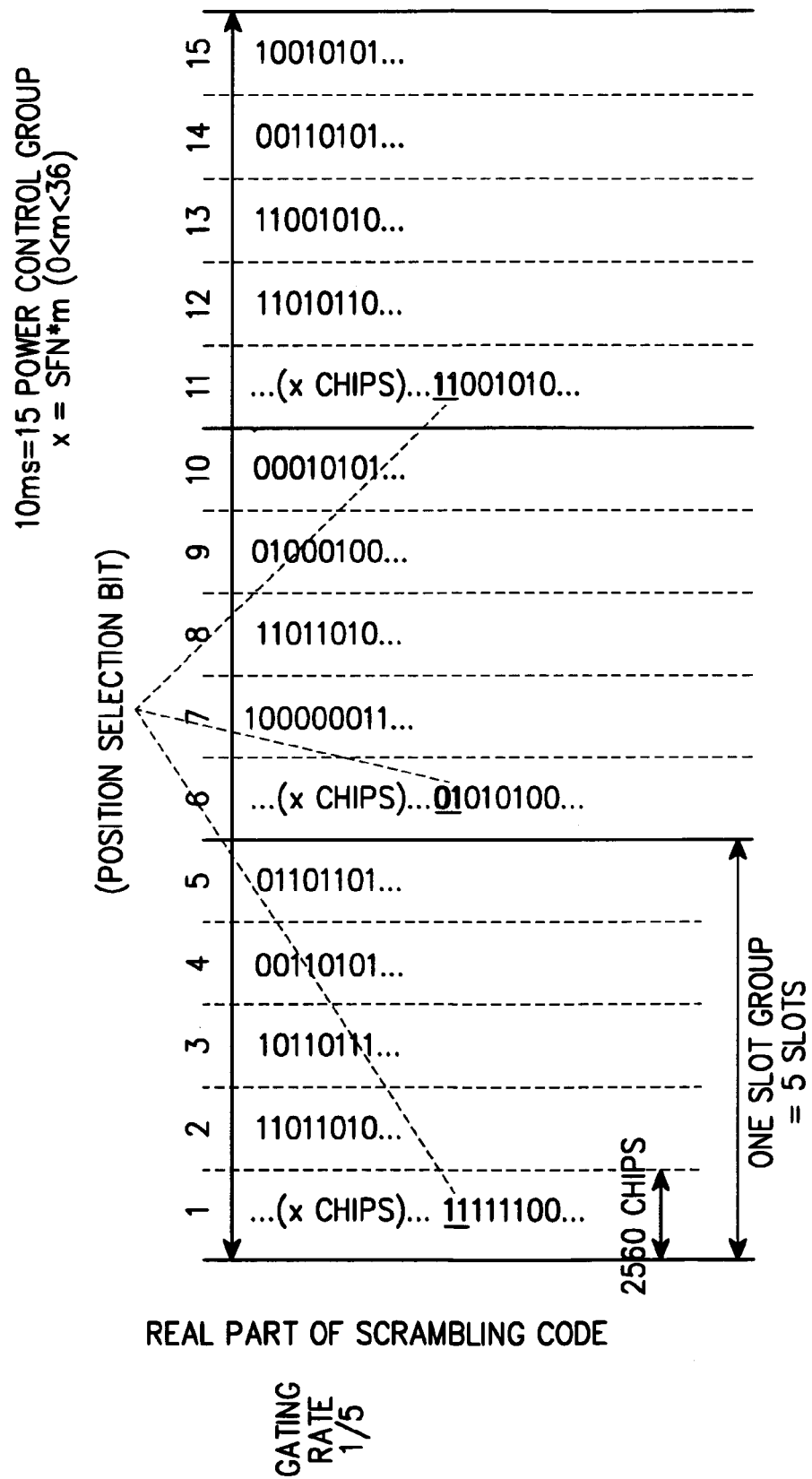
FIG. 13B is a diagram illustrating a method for determining a position selection bit during gated transmission of the downlink and uplink DPCCHs according to the second embodiment of the present invention.

2b. For DC=⅕, two bits of the real part of the scrambling code are selected in the position which is at an x-chip apart from the boundary of gating group, as shown in FIG. 13B.

3a. For DC=⅓, the position of a gating slot to be transmitted is determined using the selected one bit. Since only one bit is used, the position is randomly selected between two slots determined by the agreement, out of three transmittable slot positions.

3b. For DC=⅕, the position of a slot to be transmitted is determined using the selected two bits. Since the two bit are used, the positions are randomly selected among four slot positions determined by the agreement, out of five transmittable slot positions.

4. When the SFN is changed, the above procedure is performed again from step 1 with a new value. In this case, the integer value used in step 1 (ranges from 1 to 35) is maintained.

For the positions of the transmission gating slots of the downlink the downlink gating pattern (or downlink gated transmission pattern) is equal to that of uplink. For efficient power control, however, a specific offset may exist between uplink and downlink gating-on slot. This offset is given as a system parameter. In addition, the downlink gating pattern can be determined using preset positions, regardless of the uplink gating pattern.

Figure 14A:
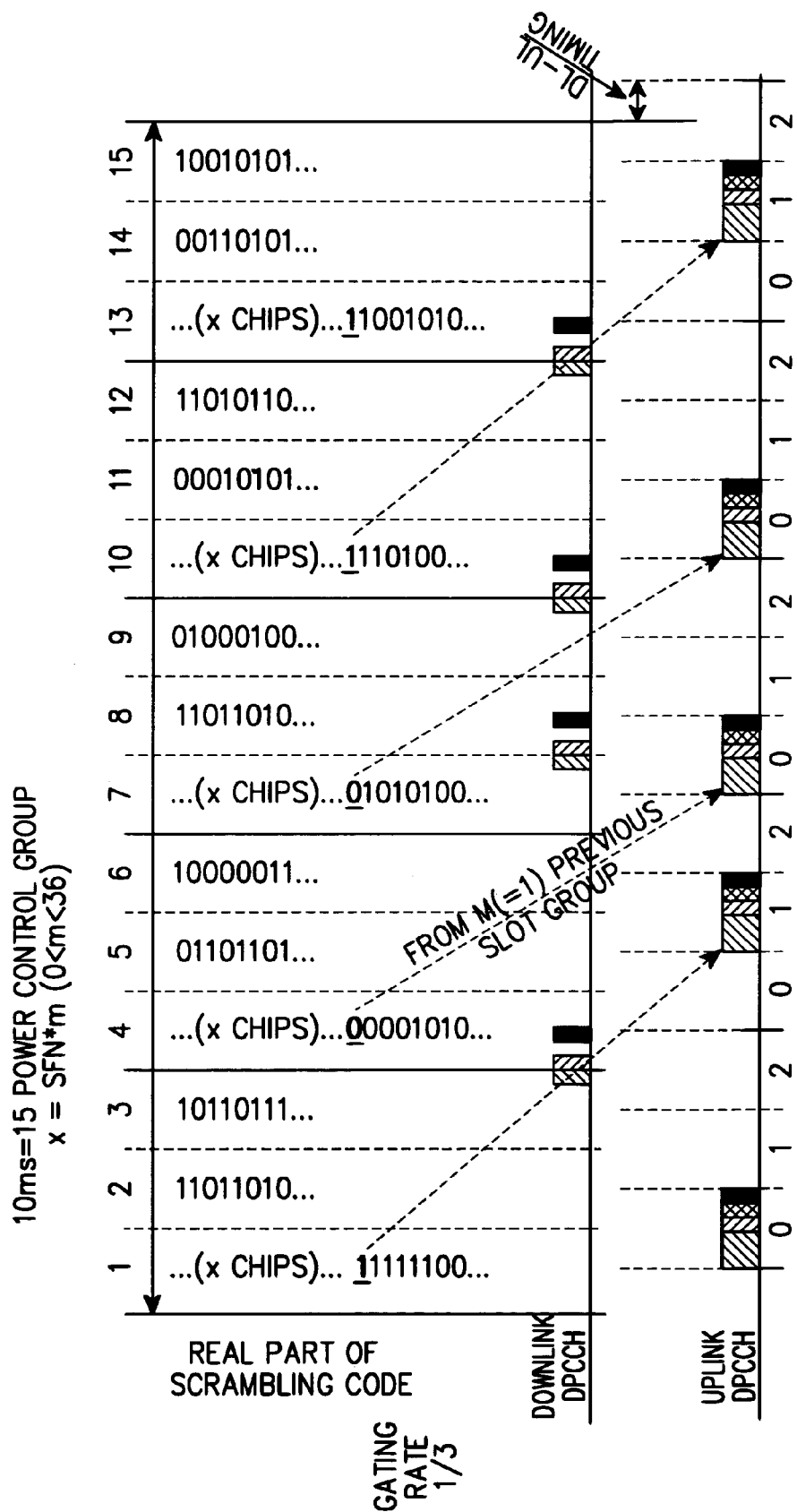
FIG. 14A is a diagram illustrating gated transmission for downlink and uplink DPCCHs according to a ninth embodiment of the present invention.

FIG. 14A shows a method for selecting gating positions of the gating slot groups for DC=⅓. The gating position controller 242 of the mobile station receives a scrambling code and SFN of the downlink signal, and selects one bit in the real part of the scrambling code. The selected one bit is utilized for determining the gating-on slot of the next gating slot group. In other words, the position of gating-on slot in the current gating slot group is determined based on the one bit selected in the previous gating slot group. In general, the time difference in unit of slot between current gating slot group and the gating slot group from which the one bit is selected may be greater than one. Here, the base station transmits the downlink gating slot in the position which is a predetermined number of slots off from the position of the gating slot received in the uplink.

FIG. 14B shows a method for selecting gating positions of the gating slot groups for DC=⅓. The gating position controller 242 of the mobile station receives a scrambling code and SFN of the downlink signal, and selects two bits in the real part of the scrambling code. The selected two bits are utilized for determining the gating-on slot of the next gating slot group. In other words, the position of gating-on slot in the current gating slot group is determined based on the two bits selected in the previous gating slot group. In general, the time difference in unit of slot between current gating slot group and the gating slot group from which the two bits are selected can be larger than one. Here, the base station transmits the downlink gating-on slot in the position which is a predetermined number of slots off from the position of the gating-on slot received in the uplink.

When determining a location of the real part of the scrambling code, it is also possible to use the channelization code number for the downlink signal, which is uniquely applied to each mobile station, in addition to the SFN. Using the channelization code for the downlink signal is to prevent the downlink signals for the different mobile stations from transmitting the gating slots in the same time position.

Another method for selecting the gating slot in a gating slot group is shown in FIGS. 13C, 13D, 14C, and 14D. In this method, the gating positions are determined by performing modulo-3 or modulo-5 operation on the decimal value of N bits from specific portion of real part of scrambling code.

A second method for randomly selecting an arbitrary slot in a gating slot group unit according to this embodiment of the present invention is determined in the following order.

1. A system frame number (SFN) 0 to 71 of a signal received immediately before transmission is multiplied by an integer between 1 and 35. Let the calculation result be 'x' (0≦x≦2485).

Figure 13C:
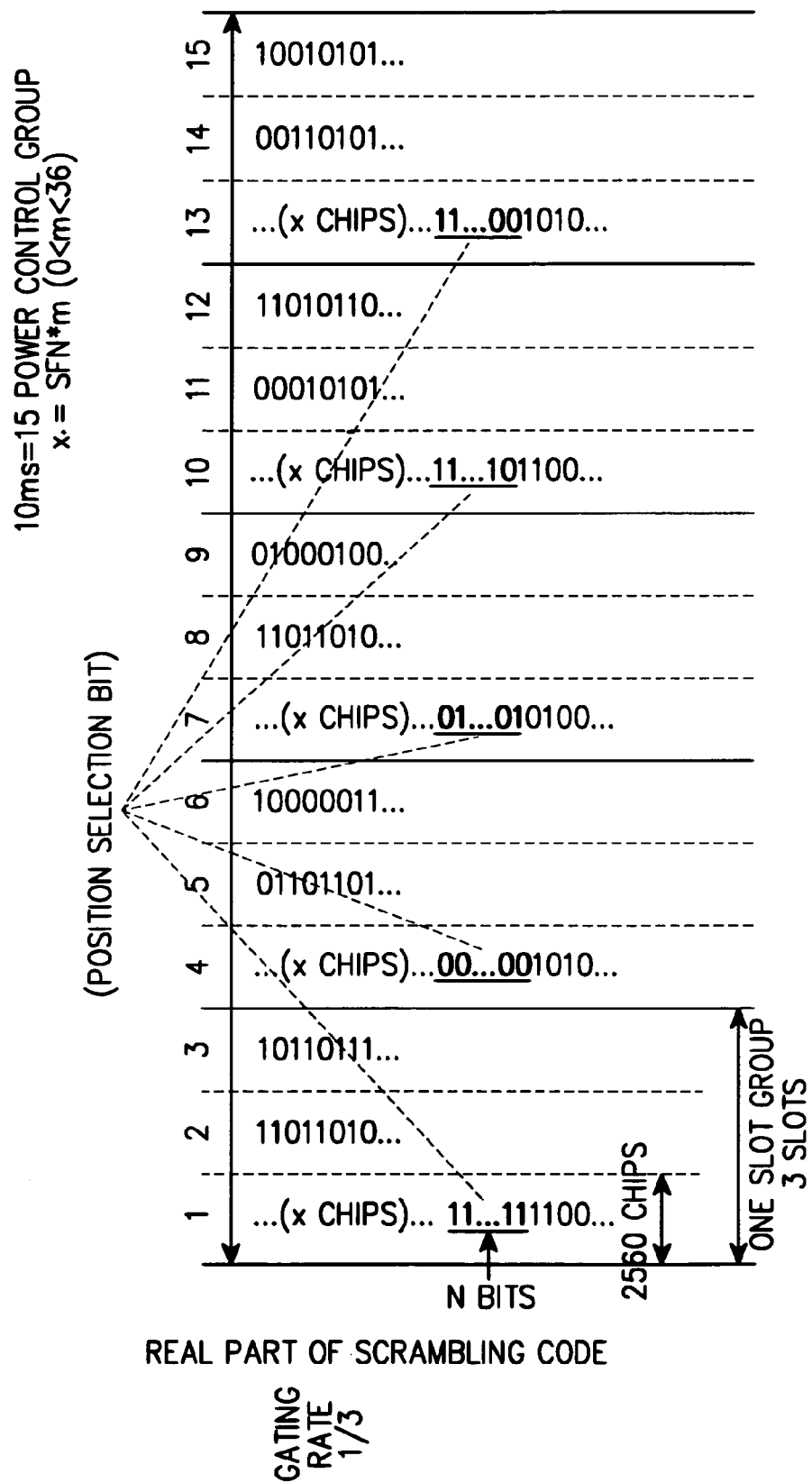
FIG. 13C is a diagram illustrating a method for determining a position selection bit during gated transmission of the downlink and uplink DPCCHs according to the third embodiment of the present invention.

2a. For DC=⅓, N bits of the real part of the scrambling code are selected in the position which is at an x-chip apart from the boundary of gating slot group, as shown in FIG. 13C. The selected N bits can be used for determining the position of gating slot in the following gating slot group. That is, the position of the gating slot in the current gating slot group can be determined based on the N bits selected in the previous gating slot group.

Figure 13D:
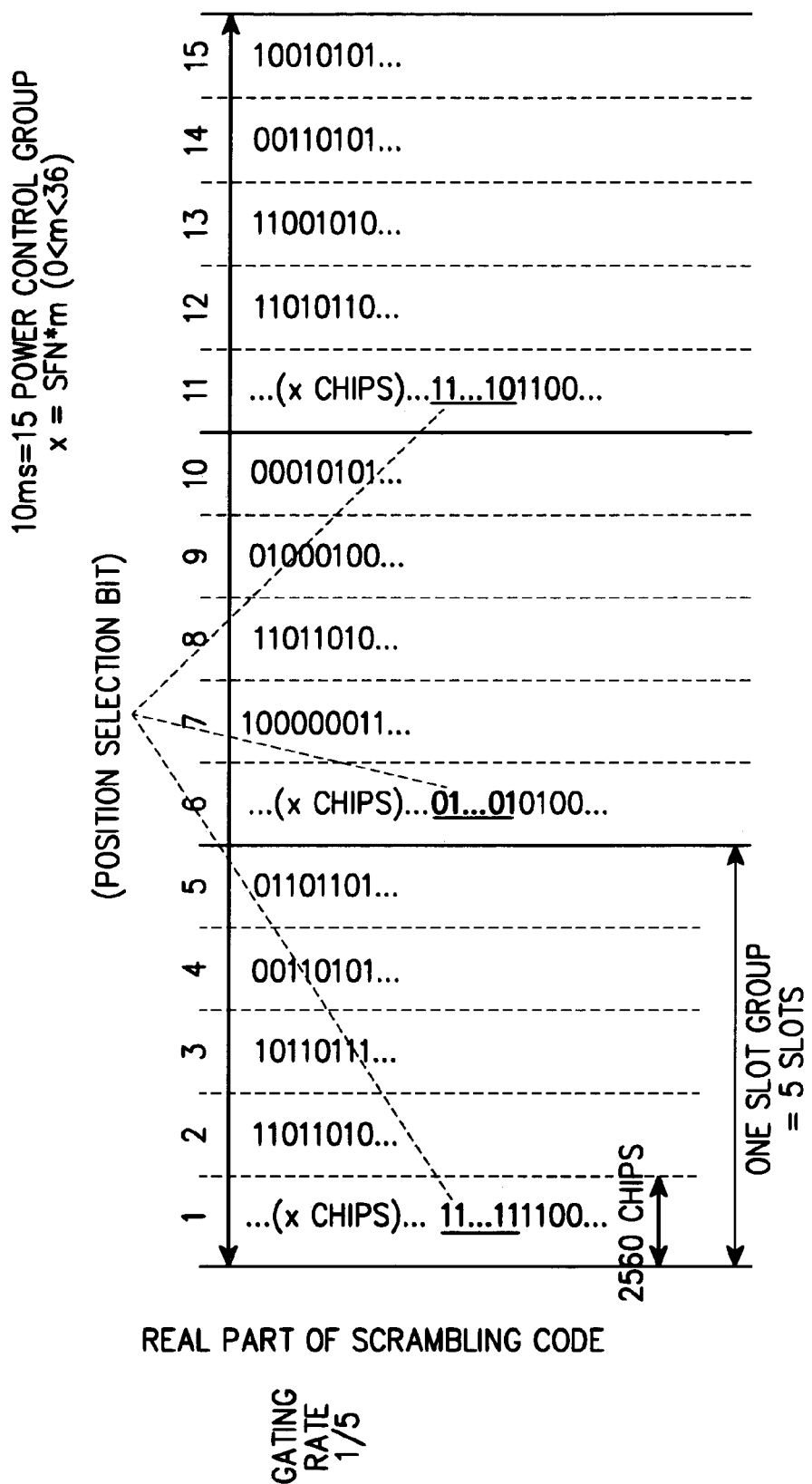
FIG. 13D is a diagram illustrating a method for determining a position selection bit during gated transmission of the downlink and uplink DPCCHs according to the fourth embodiment of the present invention.

2b. For DC=⅕, N bits of the real part of the scrambling code are selected in the position which is at an x-chip apart from the boundary of gating slot group, as shown in FIG. 13D. The selected N bits can be used for determining the position of the gating slot in the following gating slot group. That is, the position of the gating slot in the current gating slot group can be determined based on the N bits selected in the previous gating slot group.

3a. For DC=⅓, the position of a gating slot to be transmitted is determined using a value obtained by performing a modulo-3 operation on a decimal value corresponding to the selected N bits. Since the resulting value of the modulo-3 operation is one of 0, 1 and 2, each value designates the position of an arbitrary slot in the gating duration (or gating slot group).

3b. For DC=⅕, the position of a slot to be transmitted is determined using a value obtained by performing a modulo-5 operation on a decimal value corresponding to the selected N bits. Since the resulting value of the modulo-5 operation is one of 0, 1, 2, 3 and 4, each value designates the position of an arbitrary slot in the gating slot group.

4. When the SFN is changed, the above procedure is performed again from step 1 with a new value of offset x. In this case, the integer value used in step 1 (ranges from 1 to 35) is maintained.

The gating slot position selecting method selects the gating position of the gating slot group using the real part of the scrambling code and the SFN which ranges from 0 to 71. Therefore, the gating-on slot pattern has a period of 720 msec. In order to make the period of gating-on pattern greater than 720 msec, the x value can be changed whenever the SFN becomes a specific value.

Figure 14C:
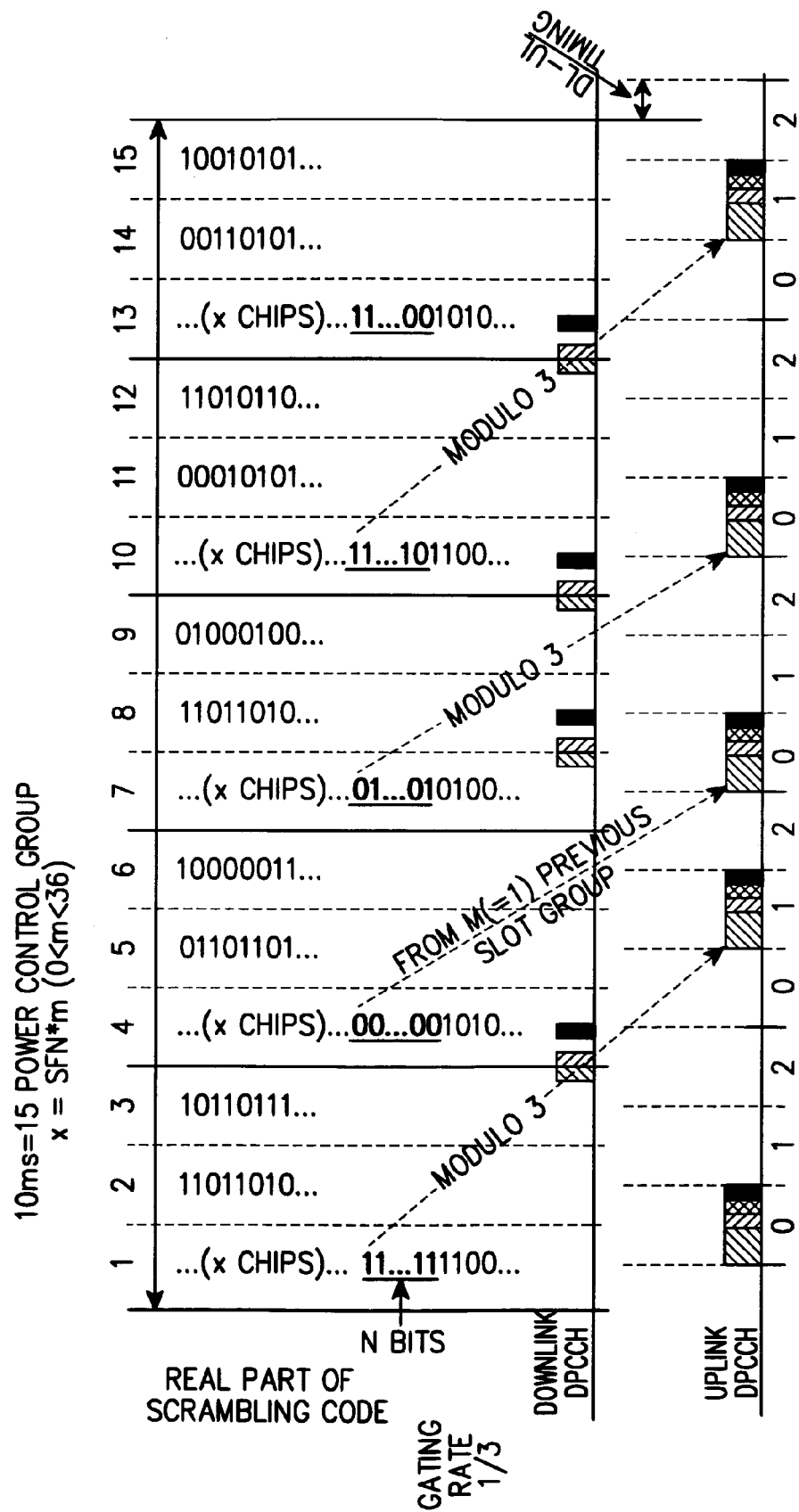
FIG. 14C is a diagram illustrating gated transmission for downlink and uplink DPCCHs according to an eleventh embodiment of the present invention.

FIG. 14C shows a method for selecting gating positions of the gating slot groups for DC=⅓. The gating position controller 242 of the mobile station receives a scrambling code and SFN of the downlink signal, selects N bits in the real part of the scrambling code. The selected one bit is utilized for determining the gating slot of the next gating slot group. In other words, the position of the gating slot in the current gating slot group is determined based on the modulo-3 operation of N bits selected in the previous gating slot group. In general, the time difference in unit of slot between current gating slot group and the gating slot group from which N bits are selected can be larger than one. Here, the base station transmits the downlink gating slot in the position that is a predetermined number of slots off from the position of the gating slot received in the uplink.

Figure 14D:
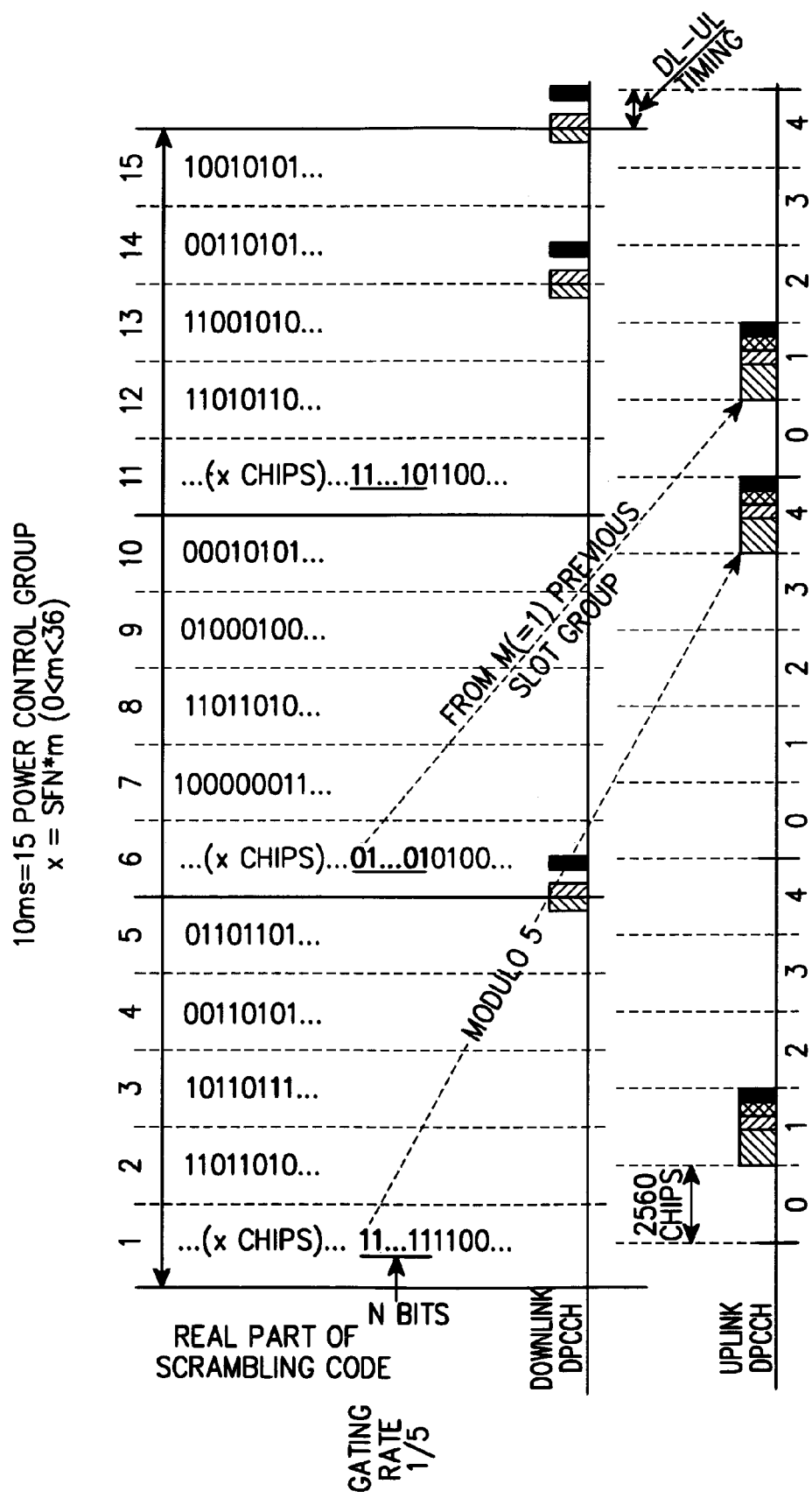
FIG. 14D is a diagram illustrating gated transmission for downlink and uplink DPCCHs according to a twelfth embodiment of the present invention.

FIG. 14D shows a method for selecting gating positions of the gating slot group for DC=⅕. The gating position controller 242 of the mobile station receives a scrambling code and SFN of the downlink signal, and selects N bits in the real part of the scrambling code. The selected N bits are utilized for determining the gating slot of the next gating slot group. In other words, the position of the gating slot in current gating slot group is determined based on the modulo-5 operation of N bits selected in the previous gating slot group. In general, the time difference in unit of the slot between the current gating slot group and the gating slot group from which N bits are selected can be larger than one. Here, the base station transmits the downlink gating slot in the position that is a predetermined number of slots off from the position of the gating slot received in the Uplink.

Arranging the gating positions of the slots irregularly is to prevent electromagnetic wave-related bad effects due to the power of the regularly transmitted signals. In order to randomly gate the transmission signals, this embodiment gives an example of using an arbitrary number for distinguishing the uplink/downlink frame together with an uplink scrambling code or a fixed sequence. The arbitrary number for distinguishing the uplink/downlink frame can become SFN or CFN (Connection Frame Number), and can also become an arbitrary system parameter for determining the uplink/downlink frame. The second method for gating a randomized slot in a gating slot group according to this embodiment of the present invention randomly gates a randomized slot in the using the CFN. That is, the second random gating method according to this embodiment of the present invention uses the CFN as an arbitrary number for distinguishing the uplink/downlink frame, and the CFN is a value which is equally used by every base station in communication with a specific mobile station (or user equipment). Further, the CFN is indicated by 8 bits and is a frame number having a repetition period of 256(0 to 255).

FIG. 15A shows a method for extracting a partial sequence required in generating a gating pattern from an uplink scrambling code. The scrambling code for the uplink signal is used for distinguishing the user equipment (UE) in the mobile communication system, and is classified into a long scrambling code and a short scrambling code. The long scrambling code has a length of 33,554,432 bits, and is applied to a one-frame signal transmitted from the user equipment using only a 38400-bit length code consisting of the $0^{th}$ to $38399^{th}$ bits of the full length, to distinguish the user equipment. The short scrambling code has a length of 256 bits and is repeated 150 times within one frame transmitted from the user equipment. The short scrambling code is a user identification scrambling code used for the case where the base station includes a separate device such as an interference remover.

Referring to FIG. 15A, a slot 1511 is a first slot of a frame 1501 and has a slot number 0. For a scrambling code applied to the slot 1511, the long scrambling code uses $0^{th}$ to $2559^{th}$ bits, and the short scrambling code repeats a scrambling code of $0^{th}$ to $255^{th}$ bits 10 times. In the following description, the long scrambling code and the short scrambling code will be both called a scrambling code. The long scrambling code and short scrambling code can be used in this invention. In FIG. 15A, reference numeral 1512 indicates a $0^{th}$ bit of the scrambling code of the first slot 1511, reference numeral 1513 indicates a $1^{th}$ bit of the scrambling code, and reference numeral 1514 indicates $2559^{th}$ bit of the scrambling code.

In FIG. 15A, reference numeral 1501 indicates 1-frame duration The frame 1501 is comprised of 15 slots from the $0^{th}$ slot 1511 to the $14^{th}$ slot 1519. A description of a method for selecting the gating slot position of the gating slot group in frame 1501 will be made below.

The frame 1501 is divided into gating slot groups each including 3 or 5 slots according to the DC. That is, for DC=⅓, the frame 1501 is divided into 5 gating slot groups each including 5 slots (i.e., gating slot group #0 includes 0th to $2^{nd}$ slots, gating slot group #1 includes $3^{rd}$ to $5^{th}$ slots, gating slot group #2 includes $6^{th}$ to $8^{th}$ slots, gating slot group #3 includes $9^{th}$ to $11^{th}$, and gating slot group #4 includes $12^{th}$ to $14^{th}$ slots). For DC=⅕, the frame 1501 is divided into 3 gating slot groups each including 5 slots (i.e., gating slot group #0 includes $0^{th}$ to $4^{th}$ slots, gating slot group #1 includes $5^{rd}$ to $9^{th}$ slots, gating slot group #2 includes $10^{th}$ to $14^{th}$ slots).

In FIG. 15A, the frame 1501 is divided into 3 or 5 gating slot groups according to the DC, and each gating slot group has an offset value that is equal to the gating slot group numbers for the respective gating slot groups. For DC=⅓, the offset values of gating slot group#0 is 0, the offset value of gating slot group#1 is 1, the offset value of gating slot group#2 is 2, the offset value of gating slot group#3 is 3, and the offset value of gating slot group#4 is 4. For DC=⅕, the offset value of gating slot group#0 is 0, the offset value of gating slot group#1 is 1, and the offset value of gating slot group#2 is 2. Application of the offset values will be described below.

$1551^{st}$ to $1554^{th}$ bits of FIG. 15A indicate the n extracted bits. Therefore, the n bits of $1551^{st}$ to $1554^{th}$ bits are selected from the $0^{th}$ bit 1512 to the $2559^{th}$ bit 1514 of the scrambling code used for the slot 1511 according to the prescribed agreement between a base station and a mobile station. Here, 'n' is a multiple of 8, and is a positive number which can be arbitrarily set. A method for selecting the n bits from bit 1551 to bit 1554 in the scrambling code applied to the slot 1511 is as follows. In order to decide the gating slot in current gating slot group, n bits from the scrambling code used in the previous gating slot group with an offset is utilized, where the offset is applied to the first bit of the scrambling code of the previous gating slot group.

(1) For DC=⅓, the frame is divided into 5 gating slot groups #0 to #4. For the n bits used for selecting the gating position of the gating slot group #0, n bits starting from the $30724^{th}$ bit of the scrambling code of the preceding frame are used. Here, the $30724^{th}$ bit is the bit to which offset of 4 is applied from the boundary of the gating slot group#4 of the previous frame. That is, it is the $30720^{th}$ bit, which is the start bit of the scrambling code applied to the gating slot group #4 of the previous frame. And the start bit of the n bits (which will be used for the gating slot group #0 in current frame) is $30724^{th}$ bit which is determined by applying an offset value of gating slot group #4(=4) of the previous frame of the gating slot group #0. Accordingly, the start bit for selecting a scrambling code used in selecting the gating position to be applied to the gating slot group #0 becomes the $30724^{th}$ bit.

Similarly, for the n bits used for selecting the gating position in the gating slot group #1, n bits are sequentially extracted starting from the $0^{th}$ bit of the scrambling code of the gating slot group #0 because the offset value for the gating slot group#0 is 0. For the n bits used for selecting the gating position in the gating slot group #2, n bits are sequentially extracted starting from the 7681 bit of the scrambling code by applying an offset value (i.e., offset value=1) of the gating slot group #1. For the n bits used for selecting the gating position in the gating slot group #3, n bits are sequentially extracted starting from the $15362^{nd}$ bit of the scrambling code by applying an offset value (i.e., offset value=2) of the gating slot group #2. For the n bits used for selecting the gating position in the gating slot group #4, n bits are sequentially extracted starting from the $23043^{d}$ bit of the scrambling code by applying an offset value (i.e., offset value=3) of the gating slot group #3. As described previously, for the n bits used for selecting the gating position in the gating slot group #0, n bits are sequentially extracted starting from the $30724^{th}$ bit of the scrambling code by applying an offset value (i.e., offset value=4) of the gating slot group #4 of the previous frame. In other words, the n bits used to determine the gating slot position within gating slot group #(p+1) are selected starting from bit number y, where y={$1^{st}$ bit of gating slot group #(p)}+{the offset of gating slot group #(p)} except for determining the gating slot position within gating slot group#0. In case of the gating slot position within gating slot group#0, n bits used to determine the gating slot position within gating slot group#0 are selected starting from bit number y, where y={$1^{st}$ bit of gating slot group#4 of the previous frame}+{the offset of gating slot group#4}.

In other words, the n bits used to determine the gating slot position within gating slot group #(p+1) are selected starting from bit number y, where y={$1^{st}$ bit of gating slot group #(p)}+{the offset of gating slot group #(p)} except for determining the gating slot position within gating slot group#0. In case of the gating slot position within gating slot group#0, n bits used to determine the gating slot position within gating slot group#0 are selected starting from bit number y, where y={$1^{st}$ bit of gating slot group#4 of the previous frame}+{the offset of gating slot group#4}.

(2) For DC=⅕, the frame is divided into 3 gating slot groups of the gating slot groups #0 to #2. For the n bits used for selecting the gating position of within the gating slot group #0, n bits are sequentially extracted starting from the $25602^{nd}$ bit of the scrambling code of the previous frame. For the n bits used for selecting the gating position of the gating slot group #1, n bits are sequentially extracted starting from the $0^{th}$ bit of the scrambling code. For the n bits used for selecting the gating position of the gating slot group #2, n bits are sequentially extracted starting from the $12801^{st}$ bit of the scrambling code.

FIG. 15B is a diagram for explaining a third method for performing random gating according to an embodiment of the present invention. This method is implemented using CFN. FIG. 15B shows a method for extracting an n-bit sequence required in generating a gating pattern from a fixed sequence A.

Referring to FIG. 15B, the n-bit (16 bit) sequences are used in determining the irregular transmission pattern in each gating slot group. The n-bit (16 bit) sequences are obtained by applying offset j(0, 1, 2, 3) shift selection from the fixed sequence (ie, A=a0, a1, a2 . . . a18=1011010011011101001). For DC ⅕, $A_0$ and $A_1$ can be used. The $A_0$ have 16 bits ($a_0$ to $a_{15}$) and $A_1$ have 16 bits(a1 to a16). For DC ⅓, $A_0$, $A_1$, $A_2$ and $A_3$ can be used. At that case, the $A_0$ is a0 to a15 extracted from the fixed sequence A with offset 0, the $A_0$ is a1 to a16 extracted from the fixed sequence A with offset 1, the $A_2$ is a2 to a17 extracted from the fixed sequence A with offset 2, and the $A_3$ is a3 to a18 extracted from the fixed sequence A with offset 3. The $A_0$ will be used for calculating the gating slot of the $0'^{th}$ gating slot group and the $A_1$ will be used for calculating the gating slot of the 1st gating slot group. The $A_2$ and $A_3$ will be used for calculating the gating slot of the 2nd and 3rd gating slot group when the DC is ⅓. Therefore, the $A_0$ and $A_1$ or $A_0$ to $A_3$ is periodically used in each frame. In FIG. 15B, the n-bit sequence is shown which is obtained by applying the offset to the fixed sequence A where the value of offset is equal to the current gating slot group number. Since the sequence to be used in each gating slot group is selected by applying an offset to the fixed sequence A, the following sequences cannot be used A.

1. The case where the sequences selected after applying the offset become equal.

Ex) A=10101010101010101010

Offset 0 $A_0$=10101010101010101010

Offset 1: $A_1$=01010101010101010101

Offset 2 $A_2$=10101010101010101010

2. Sequence of all 1's or all 0's

Ex) A=00000000000000000000

Ex) A=11111111111111111111

An exemplary hardware structure for selecting the gating position using the n bits used in selecting the gating slot position of FIGS. 15A and 15B is shown in FIG. 16. FIG. 16 shows an apparatus to perform a method for selecting the gating slot position by using the uplink scrambling code shown in FIG. 15A together with CFN, or the fixed sequence A shown in FIG. 15B together with the CFN.

Referring to FIG. 16, a memory 1601 stores the n bits of the scrambling code selected in the manner described with reference to FIG. 15A or stores the n bits (ie, 16 bit) from the fixed sequence according to the selecting manner described with reference to FIG. 15B.

A memory 1603 stores the repeated CFN, by the n-bit (16 bits) length, which is equally used in the user equipment and a base station in communication with the user equipment. The CFN is repeatedly increased 0 to 255 which can be represented by 8 bits, and is stored in the memory 1603, after being repeated n/8 times in order that the length of bits stored in memory 1603 equal the value of 'n'. A bit 1631 stored in the memory 1603 is the $0^{th}$ bit which is the most significant bit (MSB) of the CFN, and a bit 1638 is the $7^{th}$ bit which is the least significant bit (LSB) of the CNF. A bit 1639 stored in the memory 1603 is the MSB of the CFN and has the same value as the bit 1631, and a bit 163n is the LSB of the CFN and has the same value as the bit 1638. In the memory 1603 of FIG. 16, the order of the MSB and the LSB of the CFN can be changed.

A multiplier 1604 of FIG. 16 is comprised of n exclusive OR (XOR) operators 1641–164n. The multiplier 1604 performs an XOR operation on the n bits stored in the memory 1601 and the CFN bits stored in the memory 1603, and provides the operation results to a decimal converter 1605. That is, the n XOR operators 1641–164n XOR the bits 1611–161n output from the memory 1601 and the bits 1631–163n output from the memory 1603.

The decimal converter 1605 converts the operation results of the multiplier 1604 to a decimal number. That is, the decimal converter 1605 includes memories 1651-165n for storing n operation values output from the XOR operators 1641–164n of the multiplier 1604, and converts the operation values stored therein to a decimal number. A value of the decimal number is determined according to the value of 'n'. The decimal number output from the decimal converter 1605 is provided to a modulo operator 1607. The modulo operator 1607 outputs a value which depends on the DC value. For DC=⅓, the modulo operator 1607 outputs one of 0, 1 and 2. For DC=⅕, the modulo operator 1607 outputs one of 0, 1, 2, 3 and 4. The slots not to be transmitted in the gating slot group to m which the output results of the modulo operator 1607 are applied, are determined based on the output results. The decimal converter 1605 and the modulo operator 1607 can also be implemented by software.

The descriptions of FIGS. 15A and 16 can be expressed by Equation (1) below.

$$N(G, C^i) = \left\{ \sum_{l=0}^{15} \left( S \left( G_{prev} \times 2560 \times \frac{1}{T} + G_{prev} + l \right) \oplus C^i_{(l \bmod 8)} \right) \times 2^{15-l} \right\} \bmod T \quad (1)$$

where,

G: current gating slot group number, $G_{prev}$: previous gating slot group number, $C^i$: CFN number of ith frame ($C_0{}^i C_1{}^i C_2{}^i C_3{}^i C_4{}^i C_5{}^i C_6{}^i C_7{}^i$)$_2$), and T: the reciprocal of the DC.

S: Scrambling code

For a better understanding of Equation (1), a description will be made of FIGS. 15A and 16 for the case where the present gating slot group is 1, n=16, CFN=10001100$_2$, and DC=⅓.

The 16-bit value '1101001010111000' of the scrambling code selected in the manner of FIG. 15A is stored in the memory 1601 of FIG. 16. Further, since CNF=10001100, a value '1000110010001100' is stored in the memory 1603 of FIG. 16. The multiplier 1604 is comprised of 16 XOR operators, and outputs an XOR operation value '0101111000110100'. The decimal converter 1605 converts the output value of the multiplier 1604 to a decimal value '11,386' (or '24,116'). For DC=3, the modulo operator 1607 performs a modulo-3 operation on the output value '11,386' (or '24,116') of the decimal converter 1605 and outputs a value 1 (or 2 in case of '24,116'). Therefore, out of 3 slots in the gating slot group #2, a second (or third) slot is transmitted for transmitting TFCI, TPC and pilot symbol which are control data on the DPDCH.

The descriptions of FIGS. 15B and 16 can be expressed by Equation (2) below.

$$s(i, j) = \qquad (2)$$
$$\begin{cases} (A_j \oplus C_i) \bmod (S_G - 1) + 1, & j = 0 \\ (A_j \oplus C_i) \bmod S_G, & j = 1, 2, \ldots, N_G - 2, \quad i = 0, 1, \ldots, 255 \\ S_G - 1, & j = N_G - 1 \end{cases}$$

where, $A_j$: a sequence obtained by applying j bit offset to the fixed sequence A, C: a sequence obtained by repeating current CFN, $S_G$: the number of slots constituting one gating slot group, and $N_G$: the number of gating slot groups constituting one frame.

A detailed description of Equation (2) will be made below.

Figure 15C:
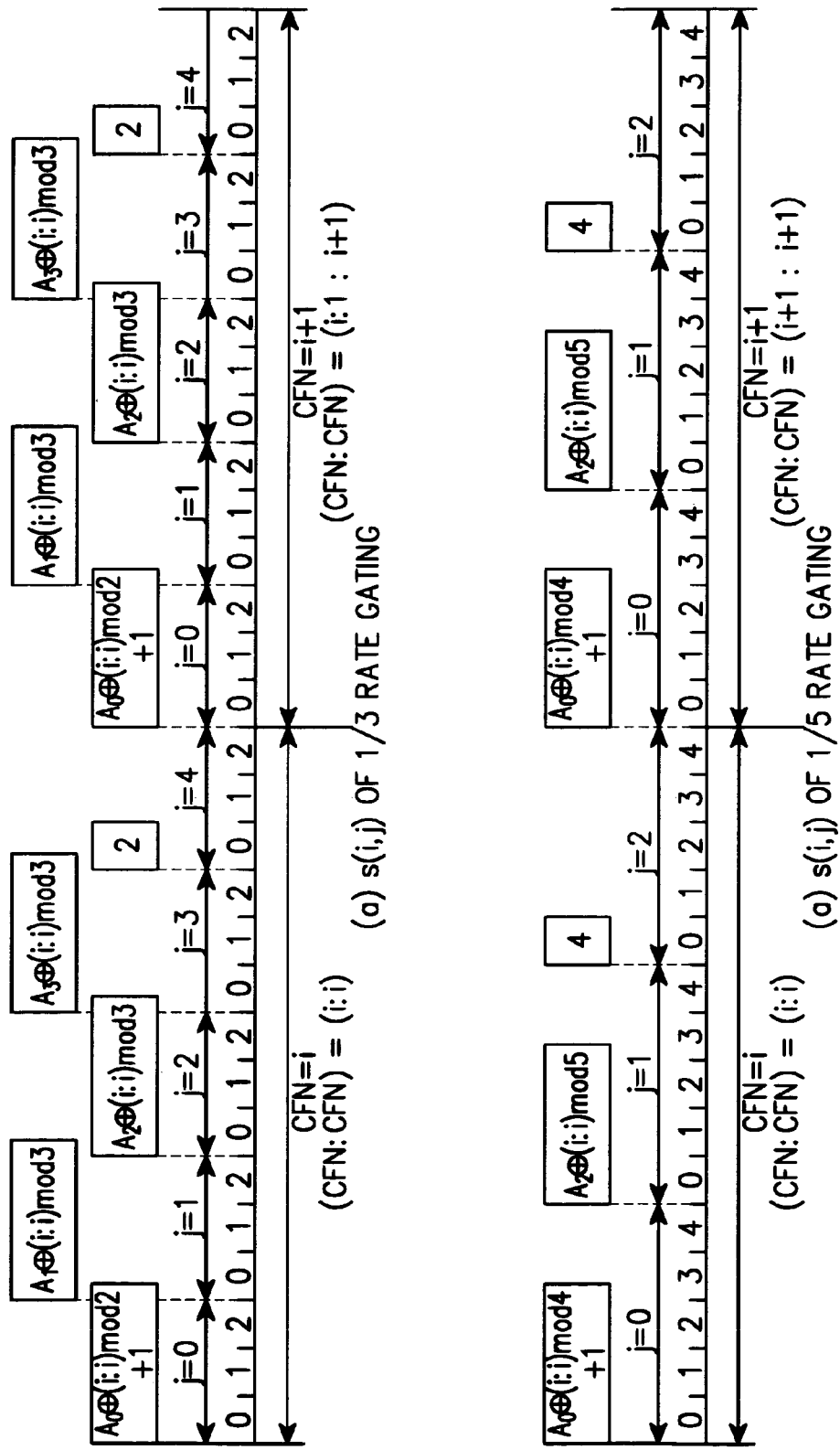
FIG. 15C is a diagram illustrating a generation rule according to an embodiment of the present invention.

In Equation (2), s(i,j) indicates a slot number, which should be transmitted, out of the slots constituting a jth gating slot group of an ith frame. Here, the slot number is not assigned in a frame unit, but assigned in a gating slot group unit. $A_j$ indicates the n bit sequence obtained by applying a j offset to the fixed sequence A as shown in FIG. 15B, where the amount of offset j is equal to each gating slot group number. $C_j$ indicates an n- bit sequence created by repeating the current CFN (8 bits). The CFN is a connection frame number. The base station and the mobile station repeatedly count the CFN (0 to 255) starting at the beginning of the connection. $S_G$ indicates the number of slots in one gating slot group. For DC=⅓, $S_G$ is 3 and for DC=⅕, $S_G$ is 5. $N_G$ indicates the number of gating slot groups in one frame. For DC=⅓, $N_G$ is 5, and for DC=⅕, $N_G$ is 3. For j=0 (i.e., in the first gating slot group of the frame) $A_0$ and current CFN($C_i$) are XORed and then '1' is added to a value obtained by performing a modulo ($S_G$–1) operation on the XORed value. As the result of this operation, the first slot of every frame is always gated off (i.e., not transmitted). Further, for j=$N_G$–1 (i.e., in the last gating slot group of the frame), only the last slot $S_G$–1 is always gated on (i.e., transmitted). For the other gating slot groups (0<j<$N_G$–1), $A_j$ and $C_i$ are XORed and then a modulo-$S_G$ operation is performed on the XORed value. The reason for processing the first and last gating slot groups differently from the other gating slot groups is to assist in channel estimation. FIG. 15C shows the generation rule. It is also possible to determine the gating position using Equation (3) below in which the same rule is applied to every.

$$s(i,j)=(A_j \oplus C_i) \bmod S_G, j=0, 1, 2, \ldots, N_G-1, i=0, 1, \ldots, 255 \qquad (3)$$

An operation of determining the gating position of the slots in the gating slot group using Equations (2) and (3) will be described with reference to FIGS. 16, 10A and 10B.

Figure 10A:
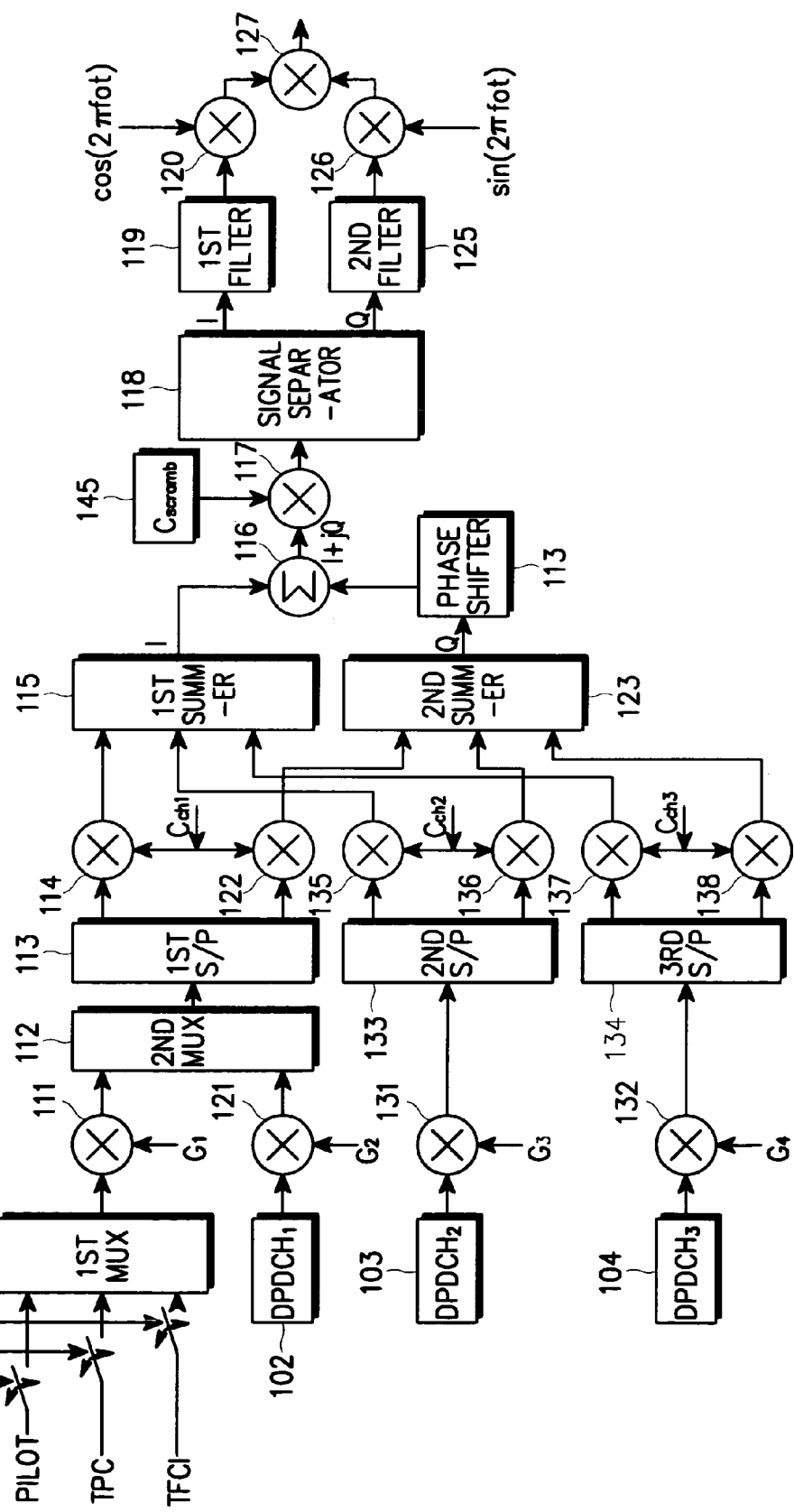
FIG. 10A is a diagram illustrating a structure of a base station transmitter according to another embodiment of the present invention.
Figure 10B:
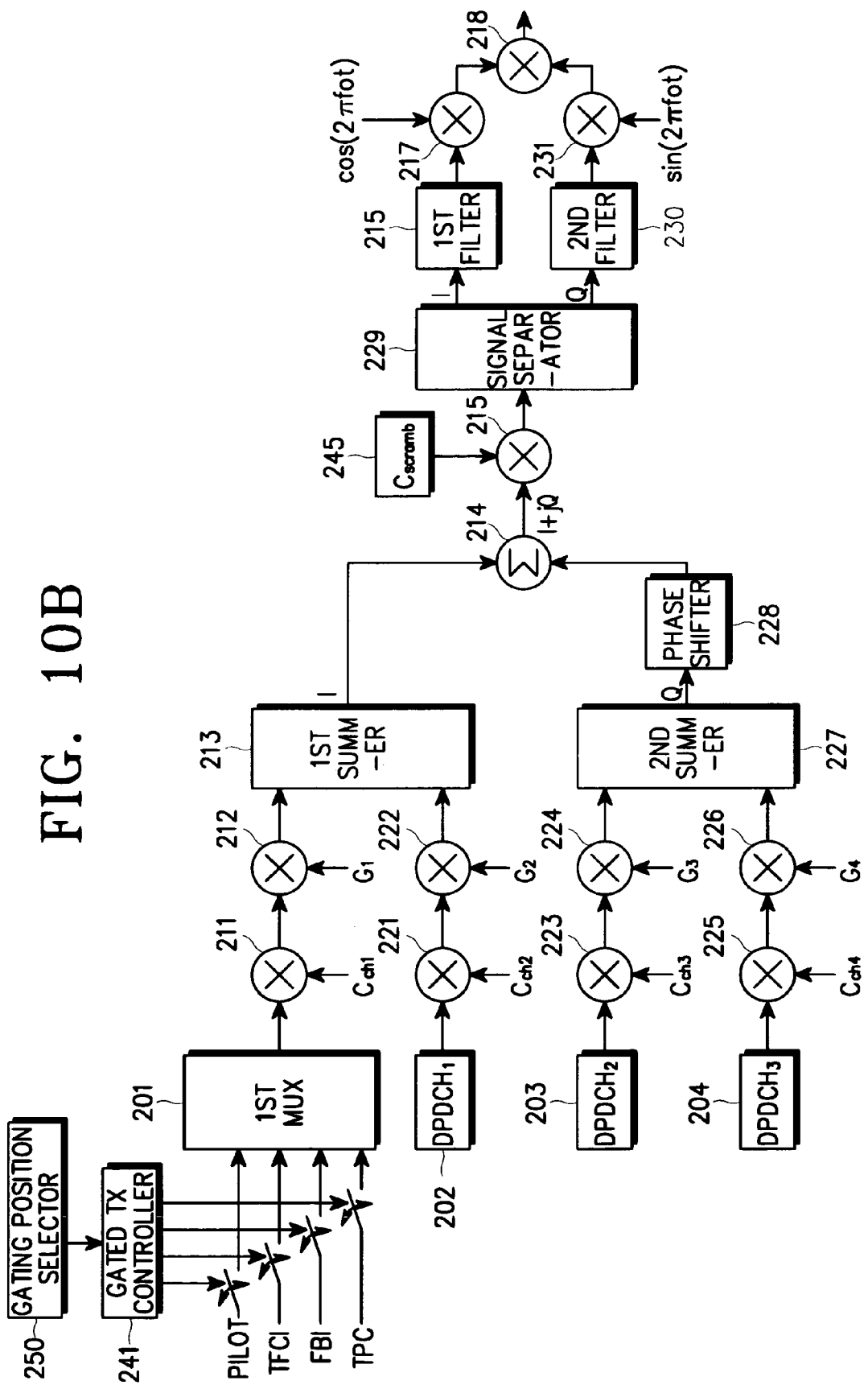
FIG. 10B is a diagram illustrating a structure of a mobile station transmitter according to another embodiment of the present invention.

The structure of FIG. 16 corresponds to the gating position selector 150 of FIG. 10A and the gating position selector 250 of FIG. 10B. An operation of the gating position selector will be described with reference to FIG. 16.

The memory 1601 stores the n bits selected in the manner described with reference to FIG. 15B, and 'n' is a multiple of 8, which is a positive number. Here, the sequence stored in the memory 1601 is a sequence $A_j$ obtained by applying j bit offset to the fixed sequence A. A memory 1603 stores the repeated CFN, of n-bit length, which is equally used in the use equipment and every base station in communication with the user equipment. A sequence stored in the memory 1603 is a sequence $C_i$ obtained by repeating the current CFN. The multiplier 1604 comprised of n XOR operators, performs an XOR operation on the sequence $A_j$ and the sequence $C_i$ stored in the memories 1601 and 1603 in a bit unit to generate the operation result of $A_j \oplus C_i$, and provides the operation result to the decimal converter 1605. The decimal converter 1605 converts the operation result of the multiplier 1604 to a decimal number, and provides the converted decimal value to the modulo operator 1607. The modulo operator 1607 outputs a value which depends on the number, $S_G$, of the slots constituting one gating slot group. That is, when $S_G$ is 3 (i.e., DC=⅓), the modulo operator 1607 outputs 0, 1 and 2, and when $S_G$ is 5 (i.e., DC=⅕), the modulo operator 1607 outputs 0, 1, 2, 3 and 4.

In addition, the modulo operator 1607 can perform the same modulo operation as shown in Equation (2) according to the gating slot group number in one frame. That is, if the present gating slot group has the first gating slot group number in the frame, the gating position is determined such that the first slot data in the first gating slot group should not be transmitted. Otherwise, if the present gating slot group has the last gating slot group number, the gating position is determined such that the last slot data in the last gating slot group should be always transmitted.

The determined gating position information of each gating slot group is provided to the gated transmission controller 141 of FIG. 10A or the gated transmission controller 241 of FIG. 10B. The gated transmission controller gates on the data on the DPCCH in the slot duration of the gating position determined by the gating position selector, and gates off the data on the DPCCH in the other slot duration.

In order for the base station and the mobile station to perform gated transmission, the mobile communication system has the following state transition methods, which are determined according to system setup. In one method, transition occurs by a set timer value or a transition command message from the base station. In another method, transition occurs sequentially while changing the gating rate. At this point, the gating rate DC can be determined in consideration of a capacity of the corresponding mobile station and the channel environments. Assume that one frame is comprised of 16 slots. Then, in the former transition method, a direct gating rate transition occurs from DC=1/1 to DC=½, from DC=1/1 to DC=¼, or from DC=1/1 to DC=⅛. In the latter transition method, a sequential gating rate transition occurs from DC=1/1 to DC=½, from DC=½ to DC=¼, and from DC=¼ to ⅛. The gated transmission method according to an embodiment of the present invention will be described for both the case where one frame is comprised of 16 slots and the case where one frame is comprised of 15 slots. When one frame is comprised of 16 slots, the gating rate can become ½, ¼ and ⅛, and when one frame is comprised of 15 slots, the gating rate can become ⅓ and ⅕.

Figure 7A:
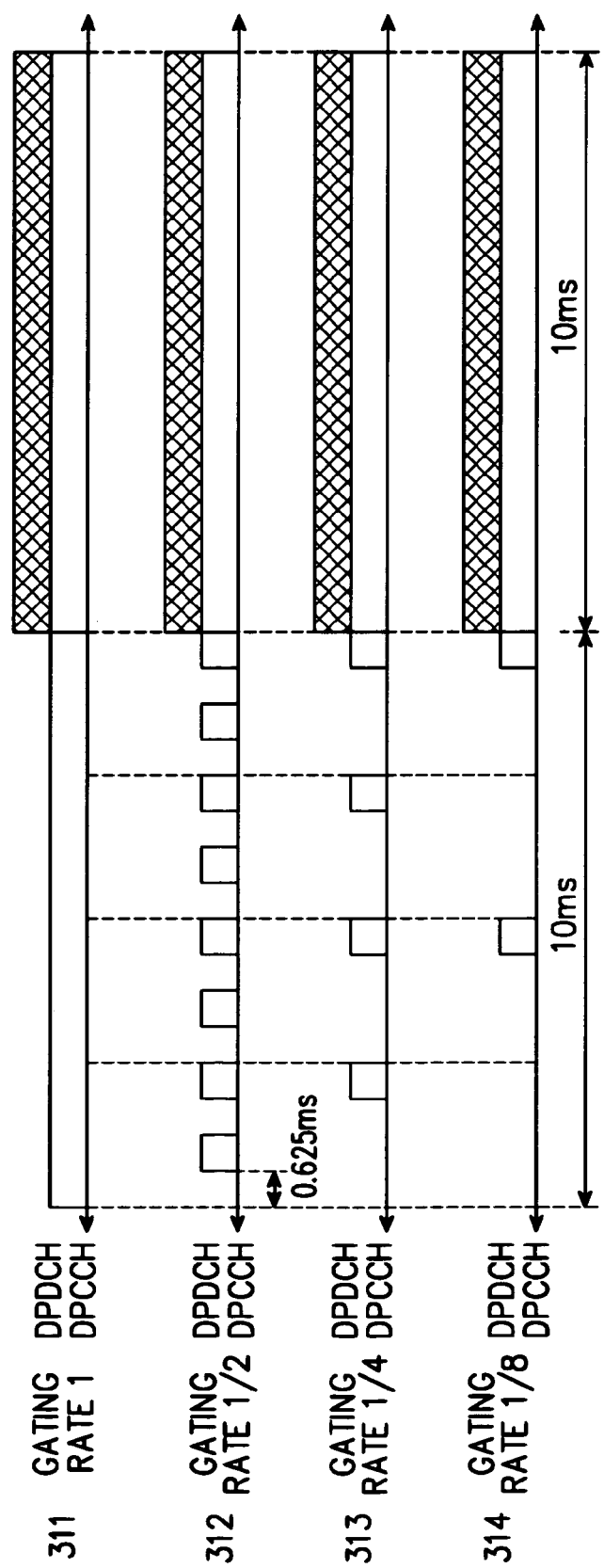
FIG. 7A is a diagram illustrating a method for transmitting a signal when an uplink DPDCH message is generated while gating an uplink DPCCH in the RBS mode according to an embodiment of the present invention.

FIGS. 7A and 7B show the uplink DPCCH for the case where a dedicated MAC (Medium Access Control) logical channel is generated and a corresponding transition message is transmitted over the uplink DPDCH when there is no DPDCH data for a predetermined period of time of FIGS. 6A and 6B.

Reference numeral 311 of FIG. 7A shows a case where an uplink DPDCH message is generated while the uplink DPCCH does not undergo gated transmission (i.e., while the uplink DPCCH is continuously transmitted (DC=1/1)). Reference numeral 312 shows a case where the uplink DPDCH message is generated while the uplink DPCCH undergoes DC=½ gated transmission. Reference numeral 313 shows a case where the uplink DPDCH message is generated while the uplink DPCCH undergoes DC=¼ gated transmission. Reference numeral 314 shows a case where the uplink DPDCH message is generated while the uplink DPCCH undergoes DC=⅛ gated transmission. Even for slots, which are not transmitted in the gated transmission pattern as shown by the reference numerals 312, 313 and 314, the slots in the corresponding duration undergo normal transmission when the uplink DPDCH is transmitted in the corresponding duration. In the slots for normal transmission, the TPC bits for downlink power control can be omitted and the pilot duration (or period) can be extended to a slot length before transmission. Beginning at the slots succeeding after transmitting the uplink DPDCH message by normal transmission of the slots, it is possible to transmit the uplink DPCCH without gating, or it is possible to continue the gated transmission at the original gating rate until a gating stop message is received from the base station. That is, when the uplink DPDCH message is transmitted during DC=½ gated transmission, it is possible to perform normal transmission on the slot of the above duration, thereafter perform DC=½ gated transmission again, and then stop gated transmission (DC=1) when transmitting user data after receiving a gating stop message from the base station.

As in the case of the uplink DPCCH, even for the slots which are not transmitted in the gated transmission pattern, the slots undergo normal transmission in the corresponding duration, when a downlink DPDCH message is generated during gated transmission for the downlink DPCCH. In the slots for normal transmission, the TPC bits for uplink power control can be omitted and the pilot duration can be extended to a slot length. Beginning at the slots succeeding after transmitting the downlink DPDCH message by normal transmission of the slots, it is possible to transmit the downlink DPCCH without gating, or it is possible to continue the gated transmission at the original gating rate until a gating stop request message is received from the mobile station. That is, when the downlink DPDCH message is transmitted during DC=½ gated transmission, it is possible to perform normal transmission on the slot of the above duration, thereafter perform DC=½ gated transmission again, and then stop gated transmission (DC=1) when transmitting the user data after receiving a gating stop request message from the mobile station.

Reference numeral 315 of FIG. 7B shows a case where an uplink DPDCH message is generated while the uplink DPCCH undergoes DC=½ gated transmission. Reference numeral 316 shows a case where the uplink DPDCH message is generated while the uplink DPCCH undergoes DC=¼ gated transmission. Reference numeral 317 shows a case where the uplink DPDCH message is generated while the uplink DPCCH undergoes DC=⅛ gated transmission. Even for the slots, which are not transmitted in the gated transmission pattern as shown by the reference numerals 315, 316 and 317, the slots in the corresponding duration undergo normal transmission when the uplink DPDCH is transmitted in the corresponding duration. In the slots for normal transmission, the TPC bits for downlink power control can be omitted and the pilot duration can be extended to a slot length before transmission. Beginning at the slots succeeding after transmitting the uplink DPDCH message by normal transmission of the slots, it is possible to transmit the uplink DPCCH without gating, or it is possible to continue the gated transmission at the original gating rate until a gating stop message is received from the base station. That is, when the uplink DPDCH message is transmitted during DC=½ gated transmission, it is possible to perform normal transmission on the slot of the above duration, thereafter perform DC=½ gated transmission again, and then stop gated transmission (DC=1) when transmitting user data after receiving a gating stop message from the base station.

It is also possible to simultaneously gate transmission of both the uplink DPCCH and the downlink DPCCH in the same gating pattern. Beginning at the slots succeeding after transmitting the downlink DPDCH message by normal transmission of the slots, generated while gating transmission of the downlink DPCCH, it is possible to transmit the downlink DPCCH without gating, or it is possible to gate transmission of the downlink DPCCH at the original gating rate until a gating stop message is received from the mobile station. That is, when the downlink DPDCH message is transmitted during DC=½ gated transmission, it is possible to perform normal transmission on the slot of the above duration, thereafter perform DC=½ gated transmission again, and then stop gated transmission (DC=1) when transmitting the user data after receiving a gating stop message from the mobile station.

FIG. 8A shows a method for transmitting downlink and uplink signals when transmission of a downlink DPDCH is discontinued. When transmission of the downlink DPDCH is discontinued as shown by reference numeral 801 in the RBA mode where the uplink DPDCH has no traffic data to transmit, the base station and the mobile station start gating if a set timer value expires and a gating start message is received. Although FIG. 8A shows an embodiment where the gating start message is generated by the base station, it is also possible for the mobile station to send a gating-request message to the base station when there is no downlink and uplink DPDCH. While transmitting the downlink DPCCH in FIG. 8A, it is also possible to transmit all the TFCI, TPC and pilot symbols without gating. Since the TPC bits include meaningless TPC values determined by measuring power strength of the pilot symbols of the gated slots within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous slot.

Alternatively, while transmitting the downlink DPCCH in FIG. 8A, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The slot, in which the TPC bits in the downlink DPCCH are gated, refers to the TPC bits generated by measuring the pilot symbols corresponding to the gated slot in the DPCCH transmitted from the mobile station.

Reference numeral 802 shows a situation where a message generated by the base station is transmitted to the mobile station over the downlink DPDCH. In this case, the pilot symbols corresponding to the gated slot in the DPCCH transmitted from the mobile station.

Reference numeral 804 shows a situation where a state transmission message generated by the base station is transmitted to the mobile station over the downlink DPDCH. In this case, the mobile station, which has been gating transmission of the uplink DPCCH, can stop gated transmission and perform normal transmission (DC=1) upon receipt of the state transition message. Alternatively, the mobile station, which has been gating transmission of the uplink DPCCH, can continue gated transmission even after receipt of the state transition message, and then stop gated transmission and perform normal transmission (DC=1) at a state transition point designated by the state transition message.

FIG. 8C shows a method for transmitting downlink and uplink signals when transmission of a downlink DPDCH is discontinued. When transmission of the downlink DPDCH is discontinued as shown by reference numeral 805 in the RBA mode where there exists no uplink DPDCH, the base station and the mobile station transition to the RBS mode if a set timer value expires or a downlink DPDCH message for state transition is generated. Although FIG. 8C shows an embodiment where the message for state transition to the RBA mode is generated by the base station, it is also possible for the mobile station to send a state transition request message to the base station when there is no downlink and uplink DPDCH. While transmitting the downlink DPCCH in FIG. 8C, it is also possible to transmit all the TFCI, TPC and pilot symbols without gating. Since the TPC bits include meaningless TPC values determined by measuring the power strength of the pilot symbols of the gated slots within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous slot.

Alternatively, while transmitting the downlink DPCCH in FIG. 8C, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The slot, in which the TPC bits in the downlink DPCCH are gated, refers to the TPC bits generated by measuring the pilot symbols corresponding to the gated slot in the DPCCH transmitted from the mobile station.

Reference numeral 806 shows a situation where a state transition message generated by the mobile station is transmitted to the base station over the uplink DPDCH.

In this case, the mobile station, which has been gating transmission of the uplink DPCCH, can stop gated transmission and then perform normal transmission (DC=1) after transmission of the state transition message over the uplink DPDCH. Alternatively, the mobile station, which has been gating transmission of the uplink DPCCH, can continue gated transmission even after transmission of the state transition message, and then stop gated transmission and perform normal transmission (DC=1) at the state transition point.

FIG. 8D shows a method for transmitting downlink and uplink signals when transmission of an uplink DPDCH is discontinued. When transmission of the uplink DPDCH is discontinued as shown by reference numeral 807 in the RBA mode where there exists no downlink DPDCH, the base station and the mobile station make a state 25 transition at a time point appointed between them when a set timer value expires or after exchanging a state transition message. Although FIG. 8D shows an embodiment where the state transition message is generated through the downlink DPDCH, the state transition message can also be generated in the uplink DPDCH of the mobile station. While transmitting the downlink DPCCH in FIG. 8D, it is also possible to transmit all the TFCI, TPC and pilot symbols without gating. Since the TPC bits include meaningless TPC values determine by measuring power strength of the pilot symbols of the gated slots within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous slot.

Alternatively, while transmitting the downlink DPCCH in FIG. 8D, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The slot, in which the TPC bits in the downlink DPCCH are gated, refers to the TPC bits generated by measuring the pilot symbols corresponding to the gated slot in the DPCCH transmitted from the mobile station.

Reference numeral 808 shows a situation where a state transition message generated by the mobile station is transmitted to the base station over the uplink DPDCH. In this case, the mobile station, which has been gating transmission of the uplink DPCCH, can stop gated transmission and then perform normal transmission (DC=1) after transmission of the state transition message over the uplink DPDCH. Alternatively, the mobile station, which has been gating transmission of the uplink DPCCH, can continue gated transmission even after transmission of the state transition message, and then stop gated transmission and perform normal transmission (DC=1) at the state transition point.

FIG. 9A shows a method for transmitting downlink and uplink signals when transmission of a downlink DPDCH is discontinued. When transmission of the downlink DPDCH is discontinued, the base station and the mobile station make a state transition at a time point appointed between them if a set timer value expires or after exchanging a state transition message. FIG. 9A shows a case where the downlink DPCCH is gated in the same gating pattern as that of the uplink DPCCH. Although FIG. 9A shows an embodiment where the state transition message is transmitted through the downlink DPDCH, the state transition message can also be transmitted through the uplink DPDCH of the mobile station.

Figure 9B:
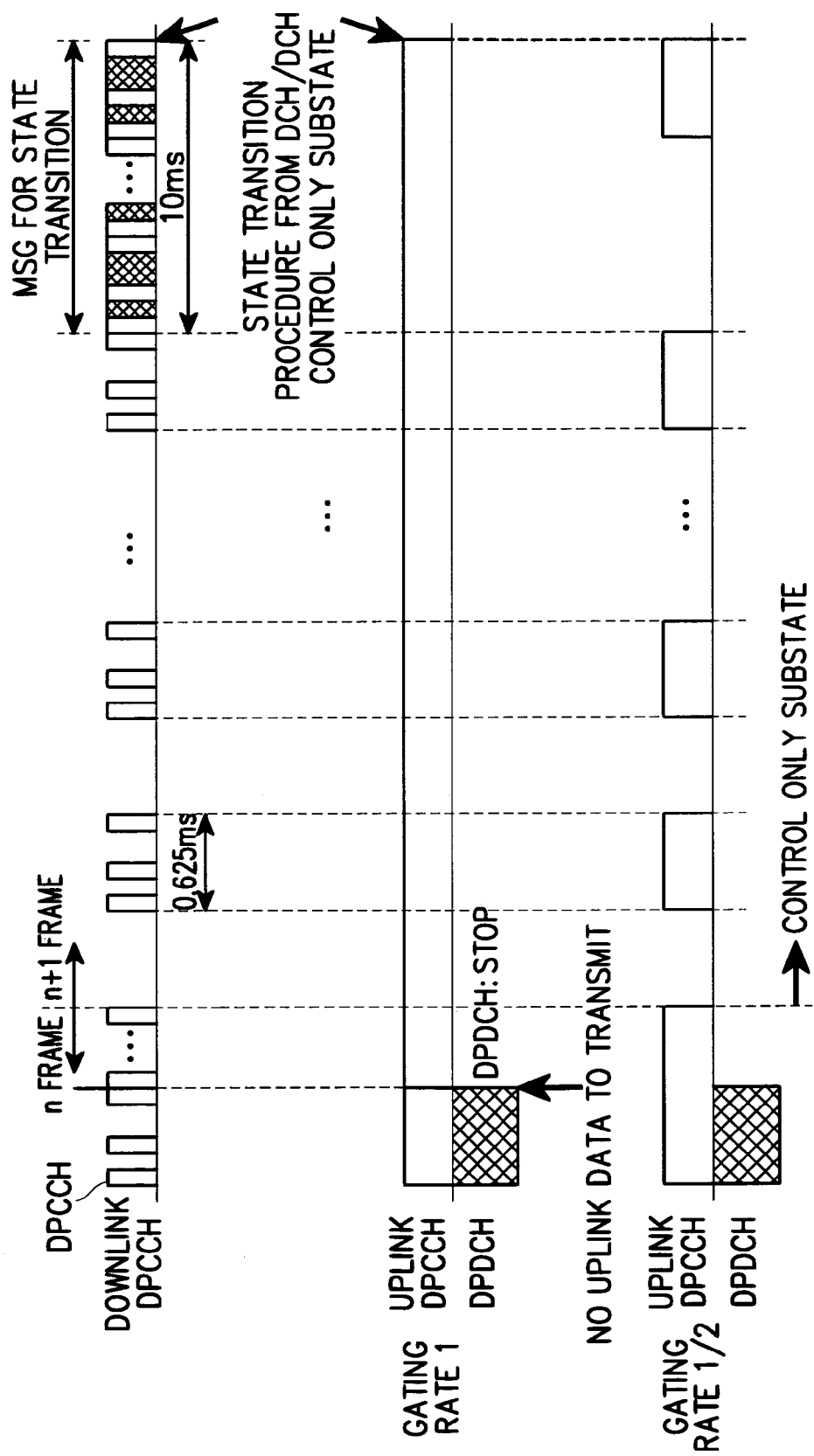
FIG. 9B is a diagram illustrating a method for transmitting downlink and uplink signals when transmission of an uplink DPDCH is discontinued (gated transmission for downlink DPCCH) according to an embodiment of the present invention.

FIG. 9B shows a method for transmitting downlink and uplink signals when transmission of an uplink DPDCH is discontinued. When transmission of the uplink DPDCH is discontinued, the base station and the mobile station make a state transition at a time point appointed between them if a set timer value expires or after exchanging a state transition message.

FIG. 9B shows a case where a gating pattern for the downlink DPCCH is gated in the same gating pattern as that of the uplink DPCCH. Although FIG. 9B shows an embodiment where the state transition message is transmitted through the downlink DPDCH, the state transition message can also be transmitted through the uplink DPDCH of the mobile station.

In the foregoing drawings and descriptions, the downlink and uplink frames have the same frame starting point. However, in the UTRA (UMTS (Universal Mobile Telecommunications System) Terrestrial Radio Access) system, the starting point of the uplink frame is artificially delayed by 250 μsec as compared with the starting point of the downlink frame. This is to make power control time delay become one slot (=0.625 ms) in consideration of the propagation delay of the transmission signal when the cell radius is below 30 km. Therefore, with due consideration of the artificial time delay between the downlink and uplink frame start time, the methods for gating transmission of the DPCCH mobile station, which has been gating transmission of the uplink DPCCH, can stop gated transmission and perform normal transmission (DC=1) after receiving the message. Alternatively, the mobile station, which has been gating transmission of the uplink DPCCH, can continue gated transmission even after receiving the message, and then perform normal transmission (DC=1) upon receipt of a gating stop message.

Figure 8B:
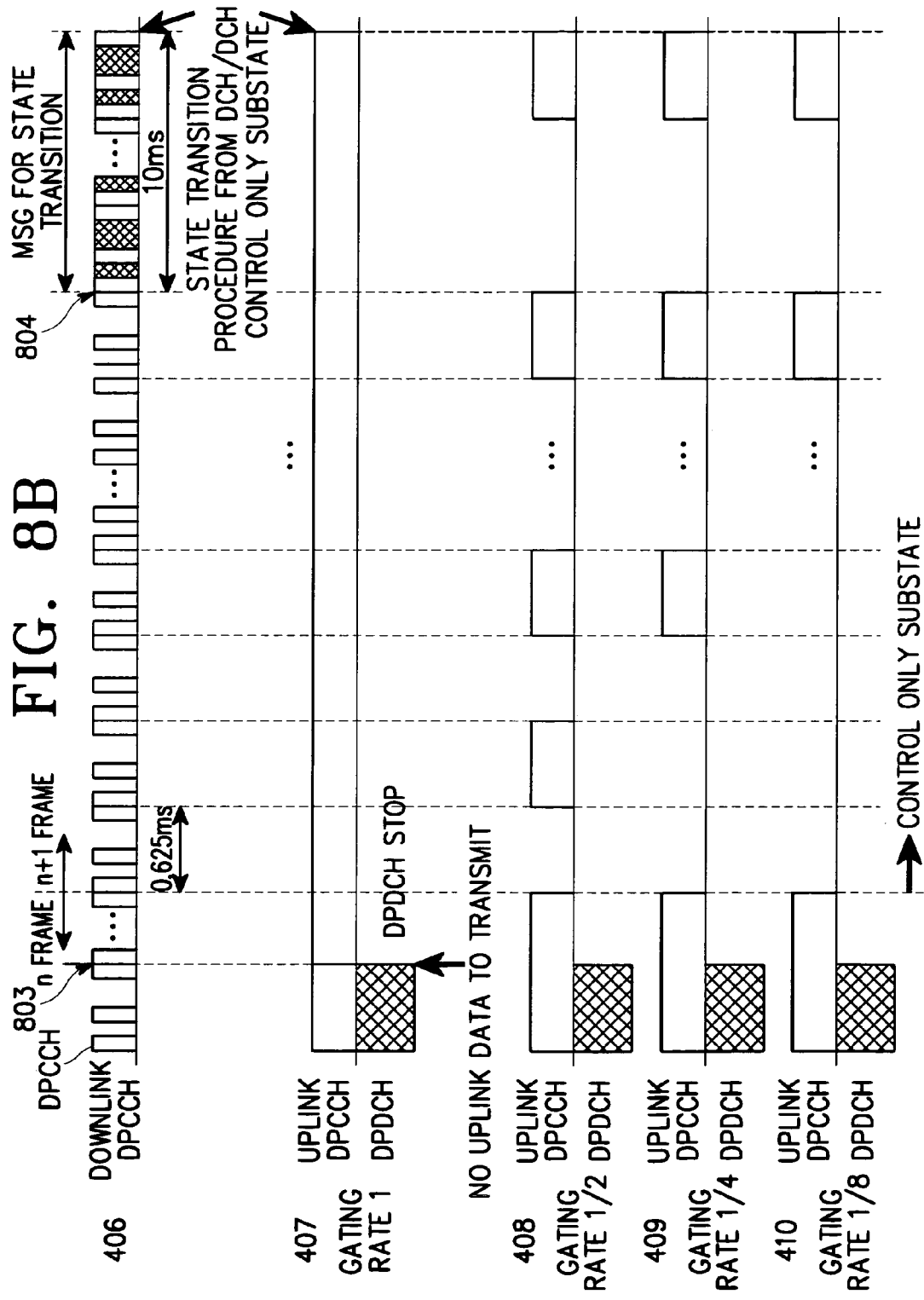
FIG. 8B is a diagram illustrating a method for transmitting downlink and uplink signals when transmission of an uplink DPDCH is discontinued according to an embodiment of the present invention.

FIG. 8B shows a method for transmitting downlink and uplink signals when transmission of an uplink DPDCH is discontinued. When transmission of the downlink DPDCH is discontinued as shown by reference numeral 803 in the RBA mode where there exists no downlink DPDCH, the base station and the mobile station make a state transition at a time point appointed (or scheduled) between them when a set timer value expires or after exchanging a state transition message. Although FIG. 8B shows an embodiment where the state transition message is generated through the downlink DPDCH, the state transition message can be generated even in the uplink DPDCH of the mobile station. While transmitting the downlink DPCCH of FIG. 8B, it is possible to transmit all the TFCI, TPC and pilot symbols without gating. Since the TPC bits include meaningless TPC values determined by measuring power strength of the pilot symbols of the gated slots within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous slot.

Alternatively, while transmitting the downlink DPCCH in FIG. 8B, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The slot, in which the TPC bits in the downlink DPCCH are gated, refers to the TPC bits generated by measuring the signal are shown by FIGS. 11A to 11E. FIGS. 10A and 10B show structures of the base station transmitter and the mobile station transmitter, respectively, which enable such gated transmission.

FIG. 10A shows a structure of the base station transmitter according to another embodiment of the present invention. The base station transmitter is different from FIG. 5A in that the pilot, TFCI and TPC bits constituting the downlink DPCCH can be separately gated in different gating patterns by the gated transmission controller 141. That is, the gated transmission controller 141 performs gated transmission on the pilot, TFCI and TPC bits for the downlink DPCCH at a slot (or time slot) scheduled with the mobile station in the RBS mode where the traffic data is not transmitted over the downlink and uplink DPDCHs. By using the gated transmission controller 141, it is also possible to assemble a pilot of an (n−1)th slot and TFCI and TPC bits of a nth slot in a gated transmission unit. When the base station transmits signaling data using the gated transmission controller 141 during gated transmission in the RBS mode, it is possible to avoid performing gated transmission on the pilot and TFCI in the duration where the signaling data is transmitted.

Alternatively, the gated transmission controller 141 can perform gated transmission on one slot (or one entire slot) including the pilot symbols, TFCI and TPC bits for the downlink DPCCH at a slot (or time slot) scheduled with the mobile station in the RBS mode where the traffic data is not transmitted over the downlink and uplink DPDCHs.

Although the downlink gating pattern is identical to the uplink gating pattern, there can exist an offset between them for efficient power control. The offset is given as a system parameter.

The gated transmission controller 141 can select the gating position of the slots either randomly or regularly according to the output of the gating position selector 250. That is, the gating position selector 250 can regularly determine the gating position of the slots. For example, for DC=⅓, $3^{rd}$, $6^{th}$, $9^{th}$, . . . slots are transmitted (or gated on). Further, the gating position selector 250 can randomly select the gating position of the slots in the method described with reference to FIGS. 15A, 15B and 16. In this case, the positions of the slots to be gated are determined by the random pattern.

FIG. 10B shows a structure of the mobile station transmitter according to another embodiment of the present invention. The mobile station transmitter is different from FIG. 5B in that the pilot, TFCI, FBI and TPC bits constituting the uplink DPCCH can be separately gated in the different patterns by the gated transmission controller 241. The gated transmission controller 241 gates transmission of the pilot, TFCI, FBI and TPC bits for the uplink DPCCH at a power control group (or time slot) scheduled with the mobile station in the RBS mode where the traffic data is not transmitted over the downlink and uplink DPDCHs. When the base station transmits signaling data using the gated transmission controller 241 during gated transmission in the RBS mode, it is possible to avoid performing gated transmission on the pilot and TFCI in the duration where the signaling data is transmitted.

Alternatively, the gated transmission controller 241 can perform gated transmission on one slot including the pilot symbols, TFCI, FBI and TPC bits for the uplink DPCCH at a slot scheduled with the mobile station in the RBS mode where the traffic data is not transmitted over the downlink and uplink DPDCHs.

Although the downlink gating pattern is identical to the uplink gating pattern, there can exist an offset between them for efficient power control. The offset is given as a system parameter.

The gated transmission controller 141 can select the gating position of the slots either randomly or regularly according to the output of the gating position selector 250. That is, the gating position selector 250 can regularly determine the gating position of the slots. For example, for DC=⅓, $3^{rd}$, $6^{th}$, $9^{th}$, . . . slots are transmitted (or gated on). Further, the gating position selector 250 can randomly select the gating position of the slots in the method described with reference to FIGS. 15A, 15B and 16. In this case, the positions of the slots to be gated are determined by the random pattern.

FIGS. 11A to 11D and FIGS. 12A to 12E show signal transmission diagrams for gated transmission performed by the base station and the mobile station transmitters of FIGS. 10A and 10B. FIGS. 11A to 11D show how to perform gated transmission when the frame length is 10 msec and each frame includes 16 slots, i.e., each slot has a length of 0.625 msec. FIGS. 12A to 12E show how to perform gated transmission when the frame length is 10 msec and each frame includes 15 slots, i.e., each slot has a length of 0.667 msec.

Figure 11A:
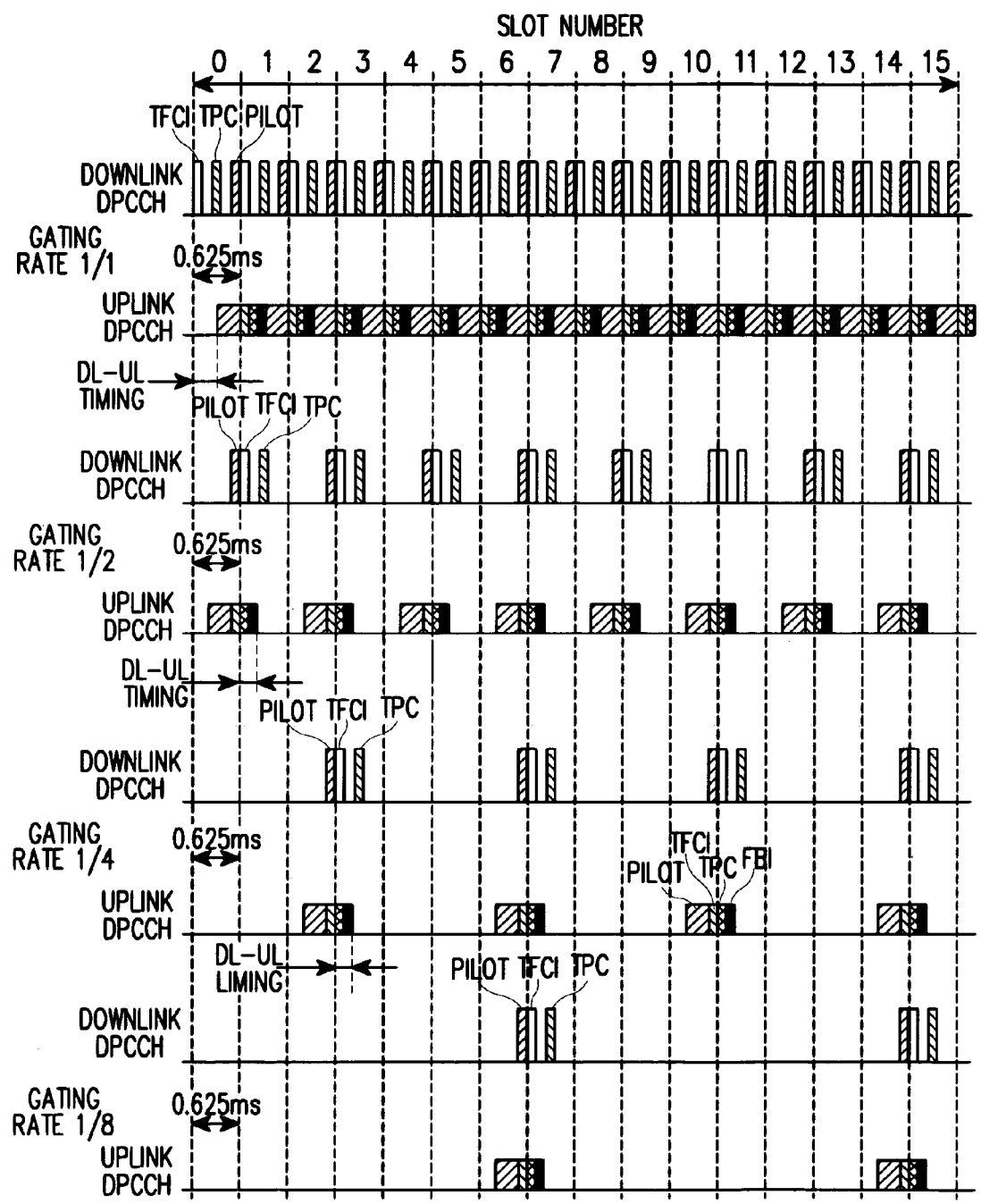
FIG. 11A is a diagram illustrating gated transmission for downlink and uplink DPCCHs according to a first embodiment of the present invention.

FIG. 11A shows gated transmission for the downlink and uplink DPCCHs according to a first embodiment of the present invention. As shown in FIG. 11A, a gated transmission unit for the downlink DPCCH may not be a slot unit. That is, in two adjacent slots, a pilot symbol of an nth slot and TFCI and TPC bits of an (n+1)th slot are set as a gated transmission unit for the downlink DPCCH. For example, when the gating rate is ½, a pilot symbol of slot number 0 and TFCI and TPC bits of slot number 1 are set as a gated transmission unit for the downlink DPCCH. When the gating rate is ¼, a pilot symbol of slot number 2 and TFCI and TPC bits of slot number 3 are set as a gated transmission unit for the downlink DPCCH. When the gating rate is ⅛, a pilot symbol of slot number 6 and TFCI and TPC bits of slot number 7 are set as a gated transmission unit for the downlink DPCCH. Here, the gated transmission unit for the downlink DPCCH is set to be different from the actual slot unit, since an nth pilot symbol may be required in the receiver to demodulate the (n+1)th TPC according to a demodulation method for the TPC signal.

When a signaling message is generated during such gated transmission, the signaling message is transmitted over the downlink or uplink DPDCH. Therefore, performance of the frame starting point is very important. In the invention, as shown in FIG. 11A, the TPC for the downlink DPCCH and the TPC for the uplink DPCCH are located at slot number 15 (i.e., the $16^{th}$ slot, which is the last slot of the nth frame), so that the first slot of the (n+1)th frame is power controlled using the TPC bits existing in the last slot of an nth frame. That is, the TPC for power controlling the first slot of the next frame is located at the last slot of the present frame.

Meanwhile, in the UTRA system stated above, an offset between the downlink and uplink frame start points is fixed to 250 μsec. However, for gated transmission of the downlink and uplink DPCCHs, the offset value can be changed to an arbitrary value while the base station and the mobile station exchange a parameter for DPCCH gated transmission in the call setup process. The offset value is set to a proper value in consideration of propagation delay of the base station and the mobile station in the call setup process. That is, when the cell radius is over 30 Km, the offset value can be set to a value larger than the conventional offset value of 250 μsec for DPCCH gated transmission, and this value can be determined through experiments.

Figure 11B:
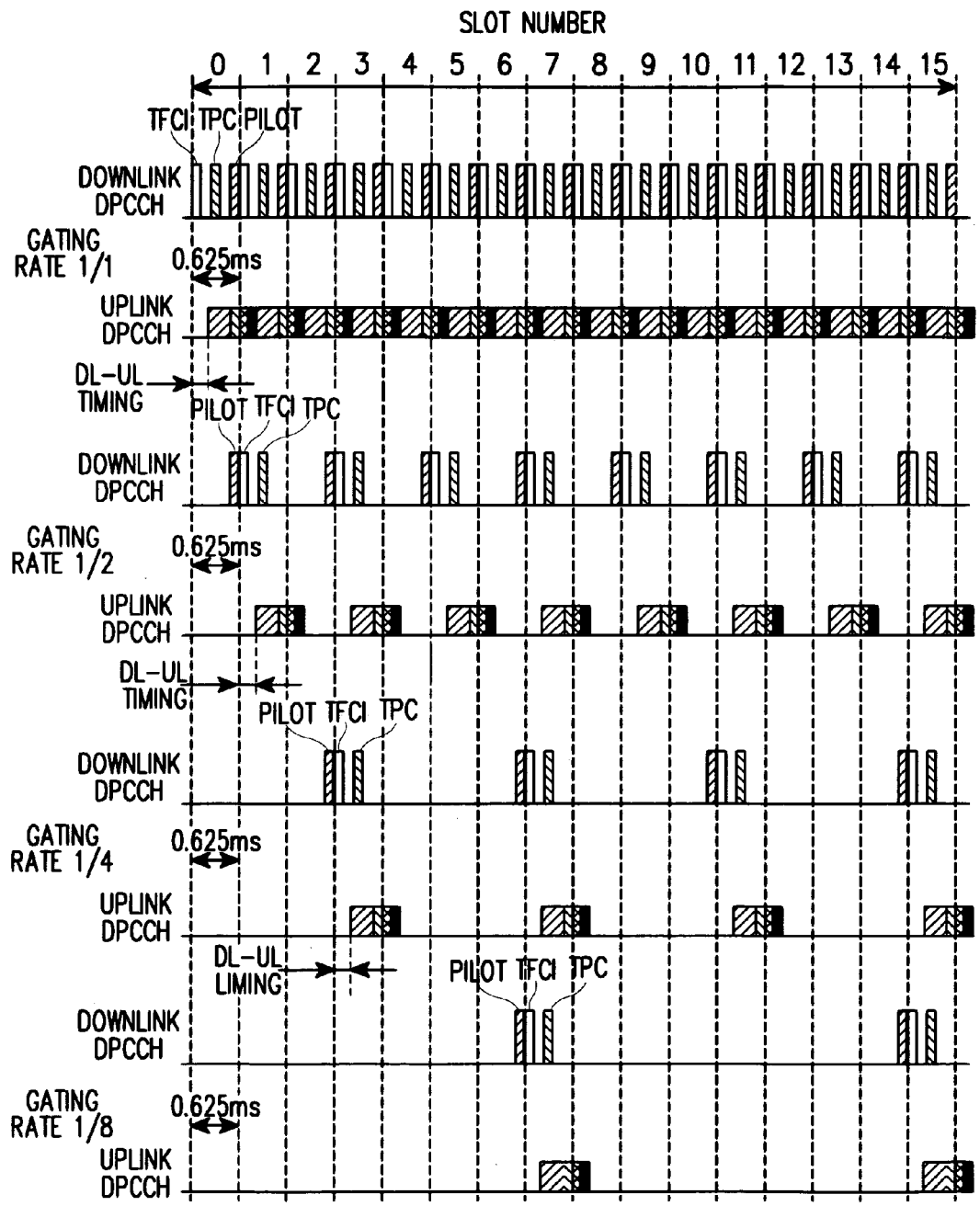
FIG. 11B is a diagram illustrating gated transmission for downlink and uplink DPCCHs according to a second embodiment of the present invention.

FIG. 11B shows gated transmission for the downlink and uplink DPCCHs according to a second embodiment of the present invention. FIG. 11B shows a case where transmission of the downlink DPCCH goes ahead of transmission of the uplink DPCCH during gated transmission, for the gating rates of ½, ¼ and ⅛. This difference (i.e., offset) is designated by "DL-UL timing" for the gating rates of ½, ¼ and ⅛.

Referring to FIG. 11B, in two adjacent slots, a pilot symbol of an nth slot and TFCI and TPC of the (n+1)th slot are set as a gated transmission unit for the downlink DPCCH. For example, for the gating rate ½, a pilot symbol of slot number 0 and TFCI and TPC of slot number 1 are set as a gated transmission unit for the downlink DPCCH. For the gating rate ¼, a pilot symbol of slot number 2 and TFCI and TPC of slot number 3 are set as a gated transmission unit for the downlink DPCCH. For the gating rate ⅛, a pilot symbol of slot number 6 and TFCI and TPC of slot number 7 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at slot number 15 (i.e., the 16$^{th}$ slot).

Figure 11C:
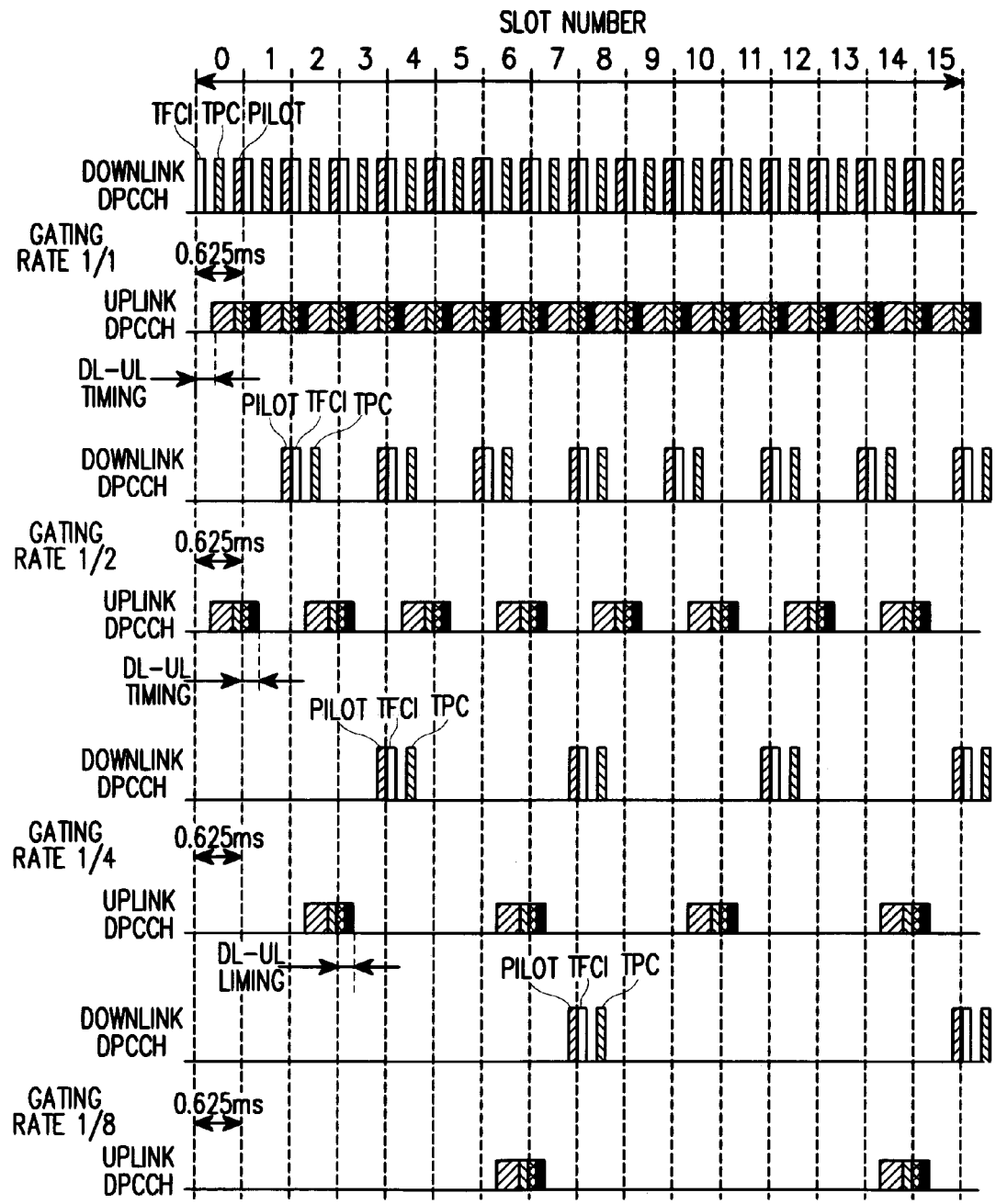
FIG. 11C is a diagram illustrating gated transmission for downlink and uplink DPCCHs according to a third embodiment of the present invention.

FIG. 11C shows gated transmission for the downlink and uplink DPCCHs according to a third embodiment of the present invention. FIG. 11C shows a case where transmission of the uplink DPCCH goes ahead of transmission of the downlink DPCCH during gated transmission, for the gating rates of ½, ¼ and ⅛.

Referring to FIG. 11 C, in two adjacent slots, a pilot symbol of a predetermined nth slot and TFCI and TPC of the (n+1)th slot are set as a gated transmission unit for the downlink DPCCH. For example, for the gating rate ½, a pilot symbol of slot number 1 and TFCI and TPC of slot number 2 are set as a gated transmission unit for the downlink DPCCH. For the gating rate ¼, a pilot symbol of slot number 2 and TFCI and TPC of slot number 3 are set as a gated transmission unit for the downlink DPCCH. For the gating rate ⅛, a pilot symbol of slot number 6 and TFCI and TPC of slot number 7 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at slot number 15 (i.e., the 16$^{th}$ slot).

Figure 11D:
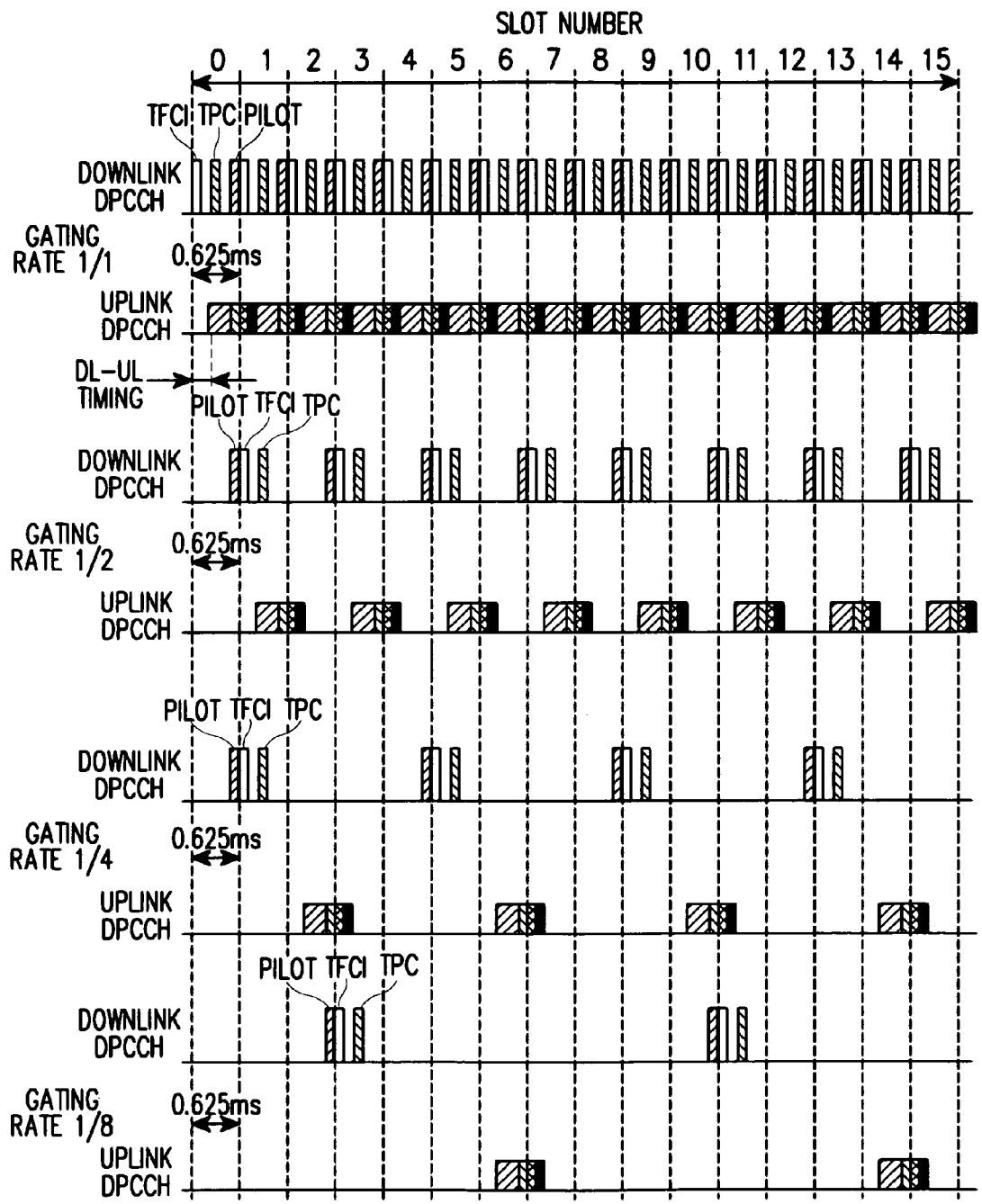
FIG. 11D is a diagram illustrating gated transmission for downlink and uplink DPCCHs according to a fourth embodiment of the present invention.

FIG. 11D shows gated transmission for the downlink and uplink DPCCHs according to a fourth embodiment of the present invention. FIG. 11D shows a case where for the gating rates of ½, ¼ and ⅛, transmission of the downlink DPCCH goes ahead of transmission of the uplink DPCCH during gated transmission, and the downlink and uplink gating patterns are set to the same period.

Referring to FIG. 11D, in two adjacent slots, a pilot symbol of the predetermined nth slot and TFCI and TPC of the (n+1)th slot are set as a gated transmission unit for the downlink DPCCH. For example, for the gating rate ½, a pilot symbol of slot number 0 and TFCI and TPC of slot number 1 are set as a gated transmission unit for the downlink DPCCH. For the gating rate ¼, a pilot symbol of slot number 0 and TFCI and TPC of slot number 1 are set as a gated transmission unit for the downlink DPCCH. For the gating rate ⅛, a pilot symbol of slot number 2 and TFCI and TPC of slot number 3 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at slot number 15 (i.e., the 16$^{th}$ slot).

Figure 12B:
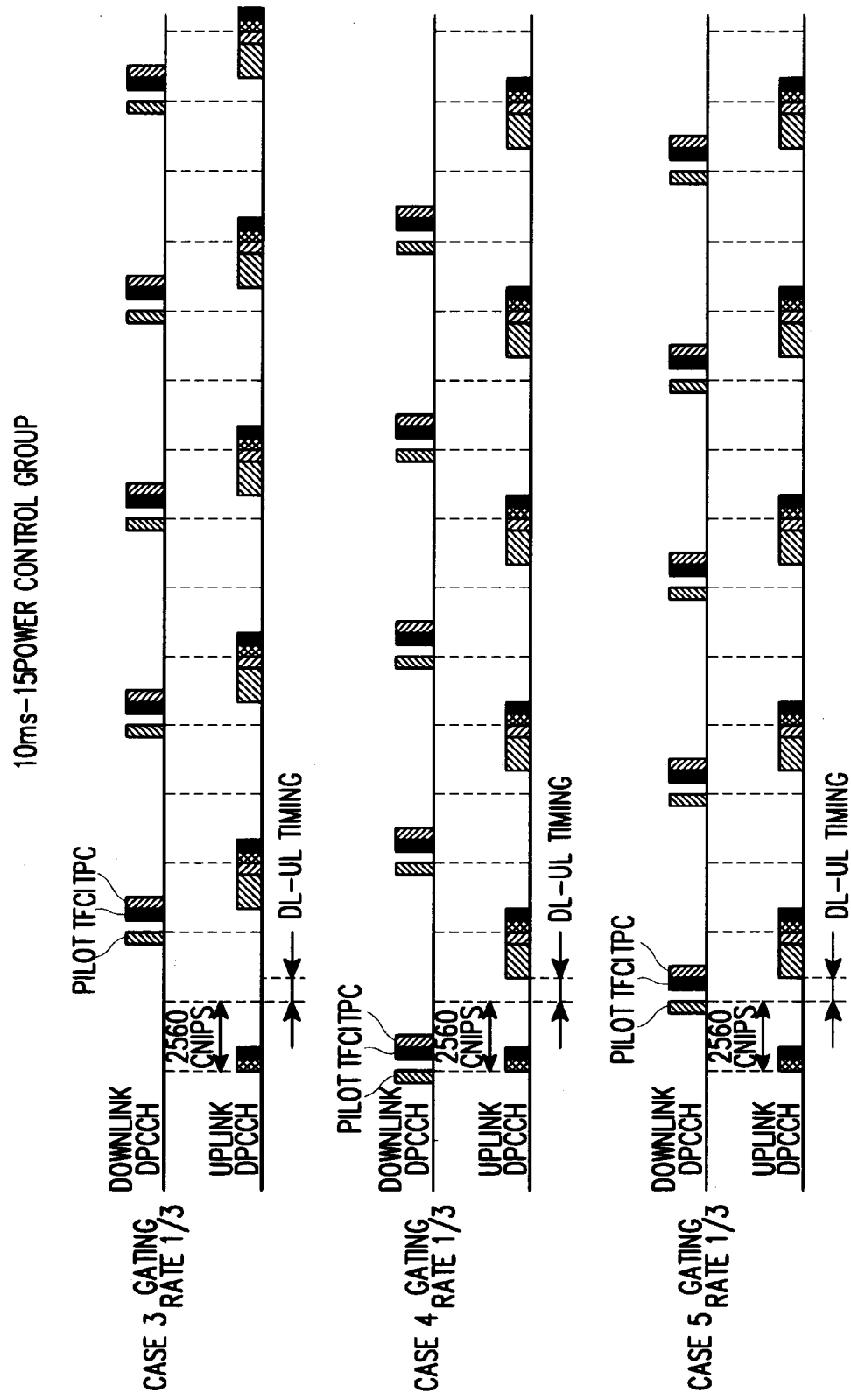

FIGS. 12A and 12B show gated transmission for the downlink and uplink DPCCHs according to a fifth embodiment of the present invention. FIGS. 12A and 12B show a case where a gating rate for gated transmission of the downlink and uplink DPCCHs is ⅓, i.e., gated on transmission is performed at the periods corresponding to ⅓ of the whole slots. That is, gated transmission is performed at the periods corresponding to 5 slots out of the whole 15 slots. At this point, a gated transmission unit for the downlink DPCCH is set to be different from a slot unit. That is, in two adjacent slots, a pilot symbol of the predetermined nth slot and TFCI and TPC of the (n+1)th slot are set as a gated transmission unit for the downlink DPCCH. Accordingly, transmission is performed in the order of the pilot symbol of the nth slot and TPC and TFCI symbols of the (n+1)th slot.

In FIG. 12A, <Case 1> shows a case where the uplink DPCCH and the downlink DPCCH are simultaneously transmitted at the start of gated transmission, and the downlink and uplink gating patterns are set to the same period. With regard to two adjacent slots, a pilot symbol of slot number 1 and TFCI and TPC of slot number 2 are set as a gated transmission unit for the downlink DPCCH; a pilot symbol of slot number 4 and TFCI and TPC of slot number 5 are set as a gated transmission unit for the downlink DPCCH; a pilot symbol of slot number 7 and TFCI and TPC of slot number 8 are set as a gated transmission unit for the downlink DPCCH; a pilot symbol of slot number 10 and TFCI and TPC of slot number 11 are set as a gated transmission unit for the downlink DPCCH; and a pilot symbol of slot number 13 and TFCI and TPC of slot number 14 are set as a gated transmission unit for the downlink DPCCH.

<Case 2> shows a case where transmission of the uplink DPCCH goes ahead of transmission of the downlink DPCCH at the start of gated transmission. At this point, with regard to two adjacent slots, a pilot symbol of slot number 0 and TFCI and TPC of slot number 1 are set as a gated transmission unit for the downlink DPCCH; a pilot symbol of slot number 3 and TFCI and TPC of slot number 4 are set as a gated transmission unit for the downlink DPCCH; a pilot symbol of slot number 6 and TFCI and TPC of slot number 7 are set as a gated transmission unit for the downlink DPCCH; a pilot symbol of slot number 9 and TFCI and TPC of slot number 10 are set as a gated transmission unit for the downlink DPCCH; and a pilot symbol of slot number 12 and TFCI and TPC of slot number 13 are set as a gated transmission unit for the downlink DPCCH.

In FIG. 12B, <Case 3> shows a case where transmission of the uplink DPCCH goes ahead of transmission of the downlink DPCCH at the start of gated transmission. At this point, with regard to two adjacent slots, a pilot symbol of slot number 1 and TFCI and TPC of slot number 2 are set as a gated transmission unit for the downlink DPCCH; a pilot symbol of slot number 4 and TFCI and TPC of slot number 5 are set as a gated transmission unit for the downlink DPCCH; a pilot symbol of slot number 7 and TFCI and TPC of slot number 8 are set as a gated transmission unit for the downlink DPCCH; a pilot symbol of slot number 10 and TFCI and TPC of slot number 11 are set as a gated transmission unit for the downlink DPCCH; and a pilot symbol of slot number 13 and TFCI and TPC of slot number 14 are set as a gated transmission unit for the downlink DPCCH.

<Case 4> shows a case where transmission of the uplink DPCCH goes ahead of transmission of the downlink DPCCH at the start of gated transmission. At this point, with regard to two adjacent slots, a pilot symbol of slot number 14 and TFCI and TPC of slot number 0 are set as a gated transmission unit for the downlink DPCCH; a pilot symbol of slot number 2 and TFCI and TPC of slot number 3 are set as a gated transmission unit for the downlink DPCCH; a pilot symbol of slot number 5 and TFCI and TPC of slot number 6 are set as a gated transmission unit for the downlink DPCCH; a pilot symbol of slot number 8 and TFCI and TPC of slot number 9 are set as a gated transmission unit for the downlink DPCCH; and a pilot symbol of slot number 11 and TFCI and TPC of slot number 12 are set as a gated transmission unit for the downlink DPCCH.

<Case 5> shows a case where transmission of the uplink DPCCH goes ahead of transmission of the downlink DPCCH at the start of gated transmission. At this point, with regard to two adjacent slots, a pilot symbol of slot number 0 and TFCI and TPC of slot number 1 are set as a gated transmission unit for the downlink DPCCH; a pilot symbol of slot number 3 and TFCI and TPC of slot number 4 are set as a gated transmission unit for the downlink DPCCH; a pilot symbol of slot number 6 and TFCI and TPC of slot number 7 are set as a gated transmission unit for the downlink DPCCH; a pilot symbol of slot number 9 and TFCI and TPC of slot number 10 are set as a gated transmission unit for the downlink DPCCH; and a pilot symbol of slot number 12 and TFCI and TPC of a slot number 13 are set as a gated transmission unit for the downlink DPCCH.

Figure 12C:
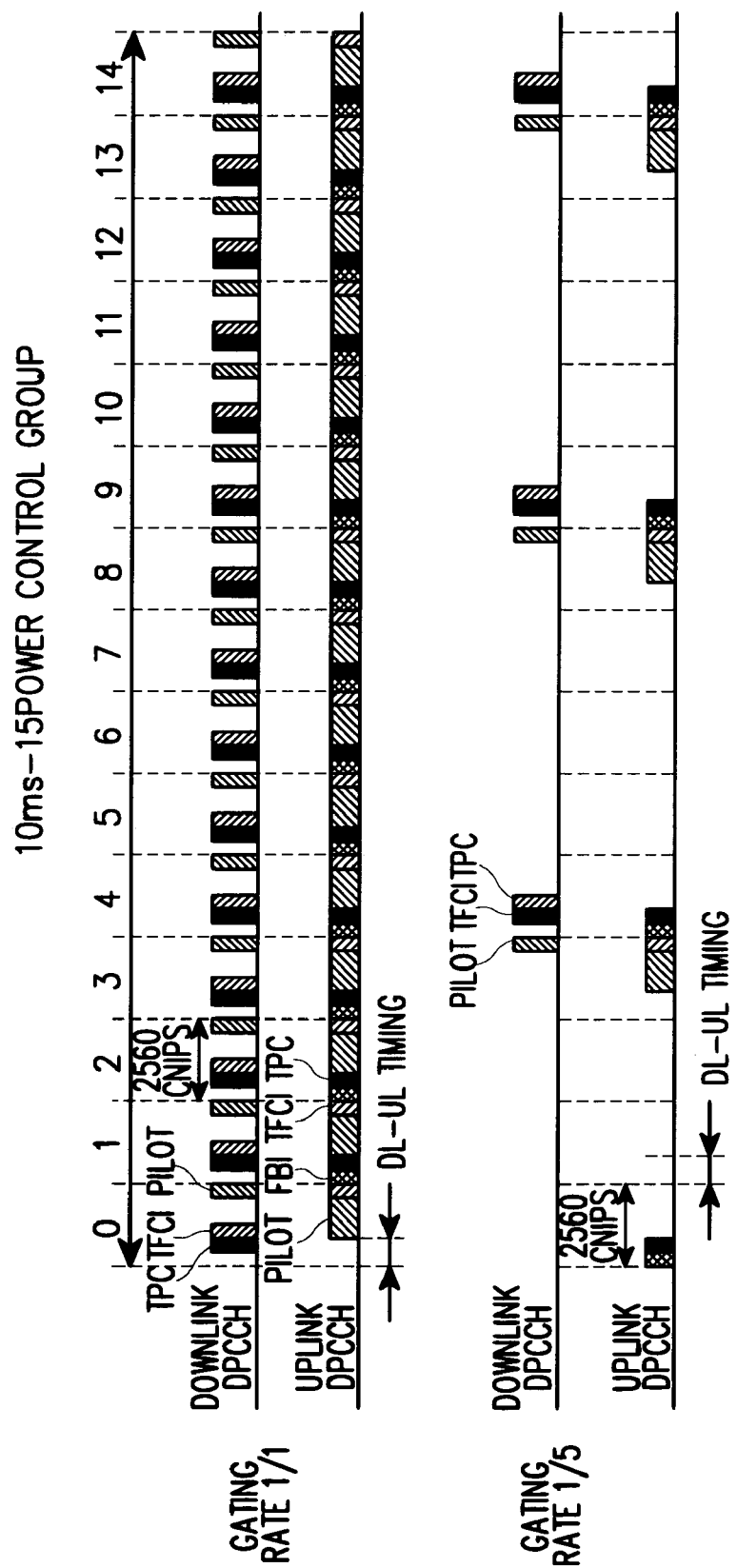
FIG. 12C is a diagram illustrating gated transmission for downlink and uplink DPCCHs according to a sixth embodiment of the present invention.

FIG. 12C shows gated transmission for the downlink and uplink DPCCHs according to a sixth embodiment of the present invention. FIG. 12C shows a case where the gating rate for gated transmission of the downlink and uplink DPCCHs is ⅕, i.e., gated on transmission is performed so that ⅕ of the slots are transmitted in comparison to all the slots in standard transmission. That is, gated transmission is performed so that 3 slots out of the standard 15 slots are transmitted. At this point, a gated transmission unit for the downlink DPCCH is set to be different from a slot unit. That is, with regard to two adjacent slots, a pilot symbol of the predetermined nth slot and TFCI and TPC of the (n+1)th slot are set as a gated transmission unit for the downlink DPCCH. Accordingly, the pilot symbol, TPC symbol and TFCI symbol are transmitted in 5 slots, and the symbols are transmitted in the order of the pilot symbol of the nth slot and the TPC and TFCI symbols of the (n+1)th slot. Here, the TPC symbol and the TFCI symbol are continuously transmitted.

Referring to FIG. 12C, with regard to two adjacent slots, a pilot symbol of slot number 3 and TFCI and TPC of slot number 4 are set as a gated transmission unit for the downlink DPCCH; a pilot symbol of slot number 8 and TFCI and TPC of slot number 9 are set as a gated transmission unit for the downlink DPCCH; and a pilot symbol of slot number 13 and TFCI and TPC of slot number 14 are set as a gated transmission unit for the downlink DPCCH.

Figure 12D:
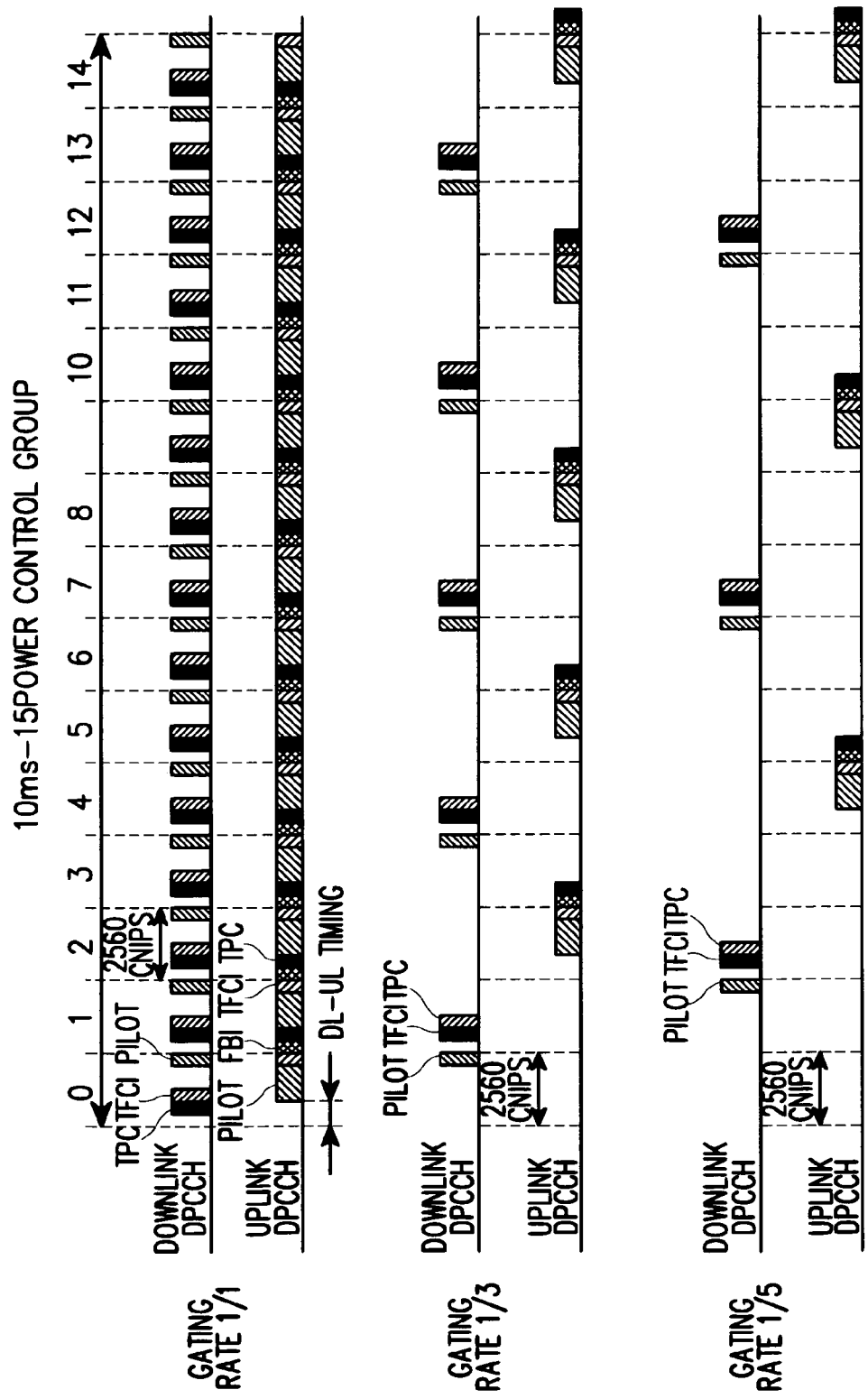
FIG. 12D s a diagram illustrating gated transmission for downlink and uplink DPCCHs according to a seventh embodiment of the present invention.

FIG. 12D shows gated transmission for the downlink and uplink DPCCHs according to a seventh embodiment of the present invention. Referring to FIG. 12D, the gating pattern is set such that the last slot of the uplink DPCCH should not be gated in the RBS mode. Such a gating pattern has high channel estimation performance, since the base station can perform channel estimation using the pilot symbols in the last slot of the frame. In addition, it is possible to increase the time required when the base station processes the FBI bits transmitted from the mobile station.

Figure 12E:
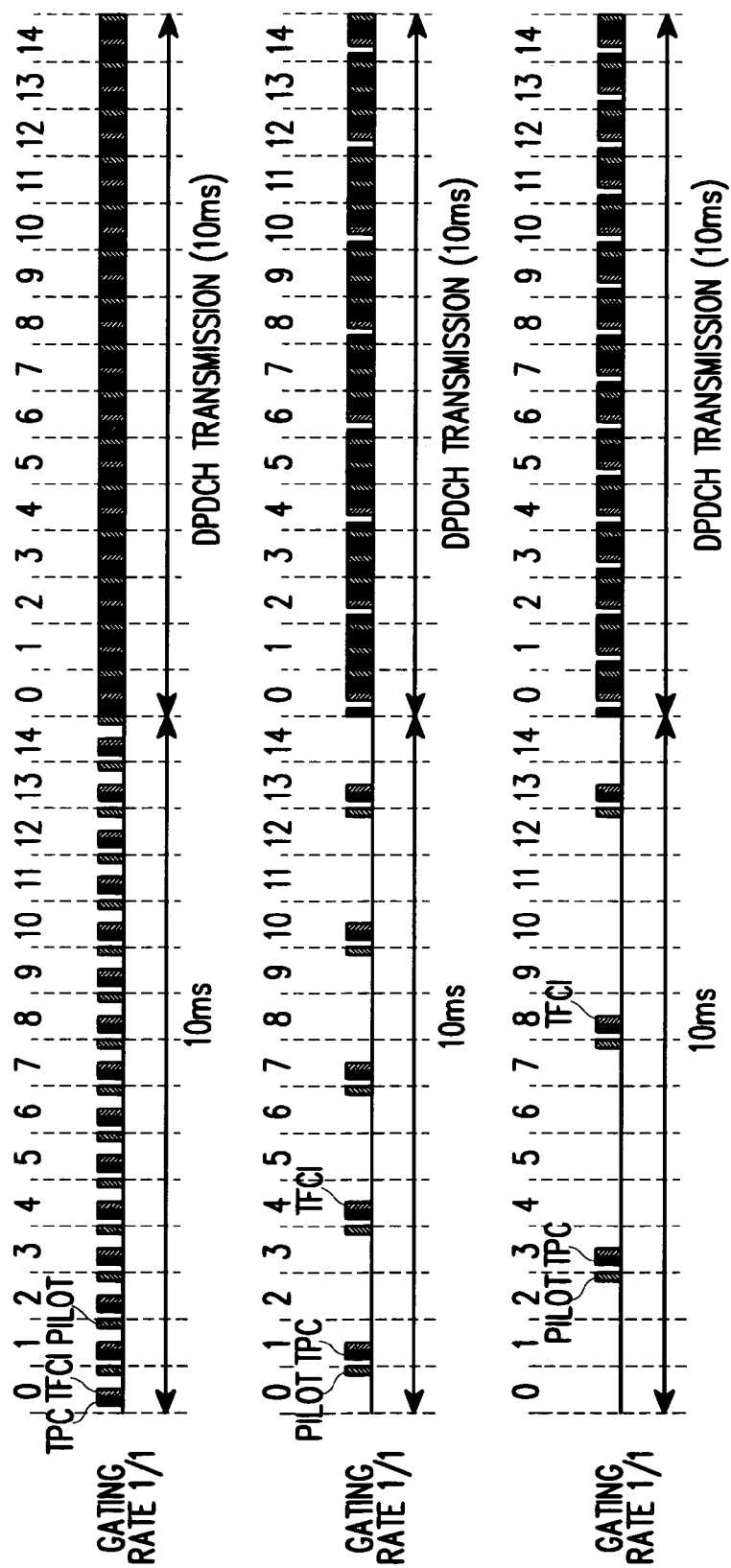
FIG. 12E is a diagram illustrating gated transmission for downlink and uplink DPCCHs according to an eighth embodiment of the present invention.

FIG. 12E shows gated transmission for the downlink and uplink DPCCHs according to an eighth embodiment of the present invention. Shown is a gating pattern for transmitting a downlink message during gated transmission in the RBS mode.

Referring to FIG. 12E, for the frame period where the downlink message is transmitted (i.e., downlink DPDCH transmission period), gated transmission is discontinued for the pilot and TFCI, and only the TPC continues to undergo gated transmission according to the gating pattern. As illustrated in FIG. 12E, for the frame period where the uplink message is transmitted (i.e., uplink DPDCH transmission period), it is also possible to stop gating the pilot and TFCI, and continuously gate the FBI and TPC according to the gating pattern.

When the mobile communication system performs the gated transmission function according to the present invention, it is necessary to be able to control transmission power of the DPCCH data even in the gated transmission state. Herein, a description will be made of operation in which the mobile station and the base station generate and transmit a TPC bit by measuring a signal received from the other party during gated transmission, and control transmission power of the data using the received TPC bit.

Gating of the DPCCH data is started and ended at the time indicated by the upper layer. In the gated transmission mode, the base station and the mobile station have the different operation according to whether there exists the DPDCH in the DPCH to be transmitted. When the DPDCH is not included in the DPCH, the gated transmission controller of the transmission side gates on data of the selected slot in the corresponding gating slot group and gates off data of the other slots by controlling the DPCCH data. Here, the method for determining the gating position of the slots in the gating slot group unit can be performed according to a predetermined gating pattern, or the gating position of the slots can also be determined in the irregular pattern using the SFN or CFN, as described above. Otherwise, when the DPDCH data is existed in the DPCH, the transmitter transmits (or gates on) every time slot. However, the receiving side recognizes only the slot in the selected gating position out of the slots of the received frame as a valid slot in term of power control. Such gated transmission can be applied either only to the downlink between the base station and the mobile station, or both to the uplink and the downlink. Power control is differently performed for the case where the gated transmission is applied only to the downlink and for the case where the gated transmission is applied both to the uplink and the downlink.

The uplink power control includes one method in which the base station generates a TPC (Transmit Power Control) bit by measuring a communication quality of the uplink, and another method in which the mobile station controls its transmission power according to the TPC bit transmitted from the base station over the downlink. The downlink power control includes one method in which the mobile station generates a TPC bit by measuring a communication quality of the downlink, and another method in which the base station controls its transmission power according to the TPC bit transmitted from the mobile station over the uplink. In describing the power control method during gated transmission, the time point when the TPC bit is generated and transmitted and the time point when the transmission power is controlled using the received TPC bit will be described separately from the viewpoint of the base station and the mobile station.

First, a description will be made of a power control operation for the case where the gated transmission operation is performed both on the uplink and the downlink.

Figure 17A:
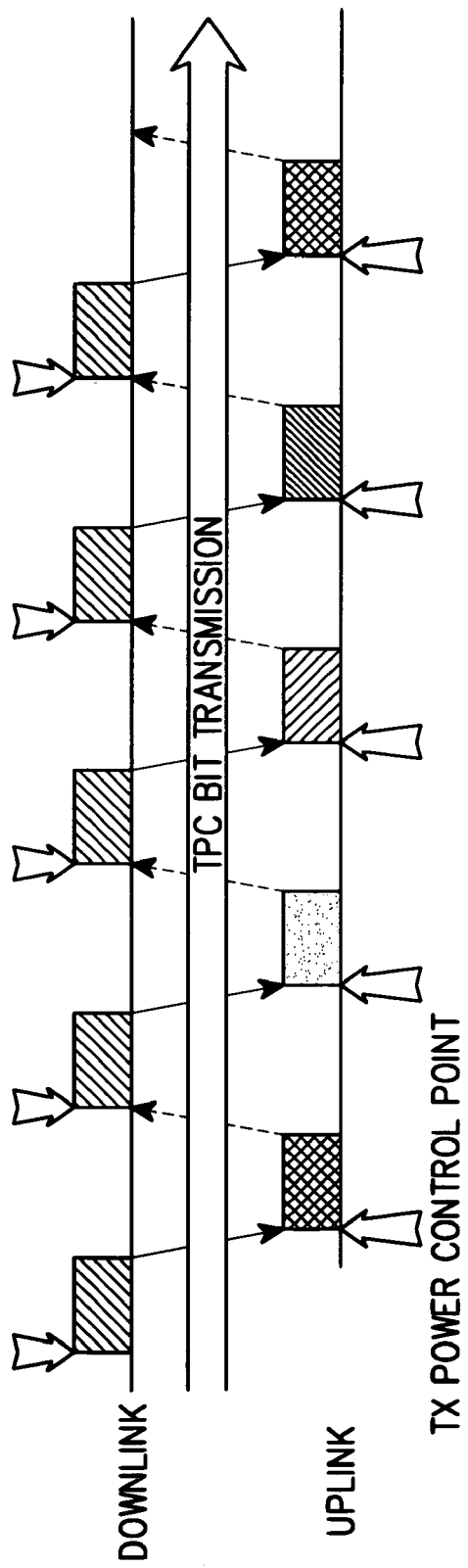
FIG. 17A is a diagram illustrating a power control time relationship when ⅓ rate gating is applied to both the downlink and the uplink according to an embodiment of the present invention.

When the gated transmission operation is performed on the uplink and the downlink, since the slots which can be transmitted by the base station and the mobile station exist in an irregular pattern, power control should be performed considering the irregular pattern. FIGS. 17A and 17B show the power control time relationship when the gated transmission is performed on both the uplink and the downlink.

Uplink Transmission Power Control of Mobile Station

The mobile station extracts TPC bits from the valid slot last received from the base station, i.e., from the gated-on slot of the downlink, and controls transmission power of its DPCCH data according to the value of the TPC bits. Here, since the valid slot of the downlink may be different from the valid slot of the uplink according to the type of the irregular gating pattern, the mobile station stores the received valid TPC bits and then transmits a transmittable slot, if any, according to the stored TPC bits.

TPC bit Generation and Transmission for Downlink Power Control

The mobile station generates a TPC bit by measuring the communication quality of the downlink during the valid (or gated-on) slot of the downlink. The generated TPC bit is stored before transmission, until the valid uplink slot is transmitted.

Downlink Transmission Power Control of Base Station

The base station extracts TPC bits from the valid slot last received from the mobile station, i.e., from the gated-on slot of the uplink, and controls its transmission power according to the value of the TPC bits. Here, since the valid slot of the uplink may be different from the valid slot of the downlink according to the type of the irregular gating pattern, the mobile station stores the received valid TPC bits and then transmits a transmittable slot, if any, according to the stored TPC bits.

TPC Bit Generation and Transmission for Uplink Power Control

The base station generates a TPC bit by measuring the communication quality of the uplink during the valid slot of the uplink. The generated TPC bit is stored before transmission, until the valid downlink slot is transmitted.

Next, a description will be made of a power control operation for the case where the gated transmission is applied only to the downlink in the mobile communication system having the gated transmission function.

Figure 18A:
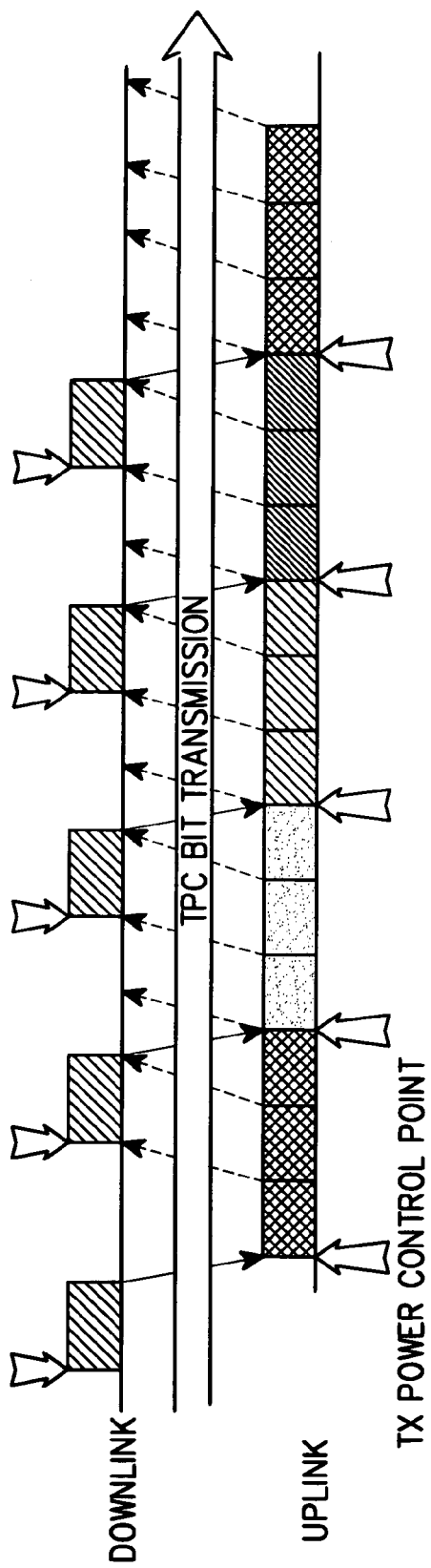
FIG. 18A is a diagram illustrating a power control time relationship when ⅓ rate gating is applied to only the downlink according to an embodiment of the present invention.
Figure 18B:
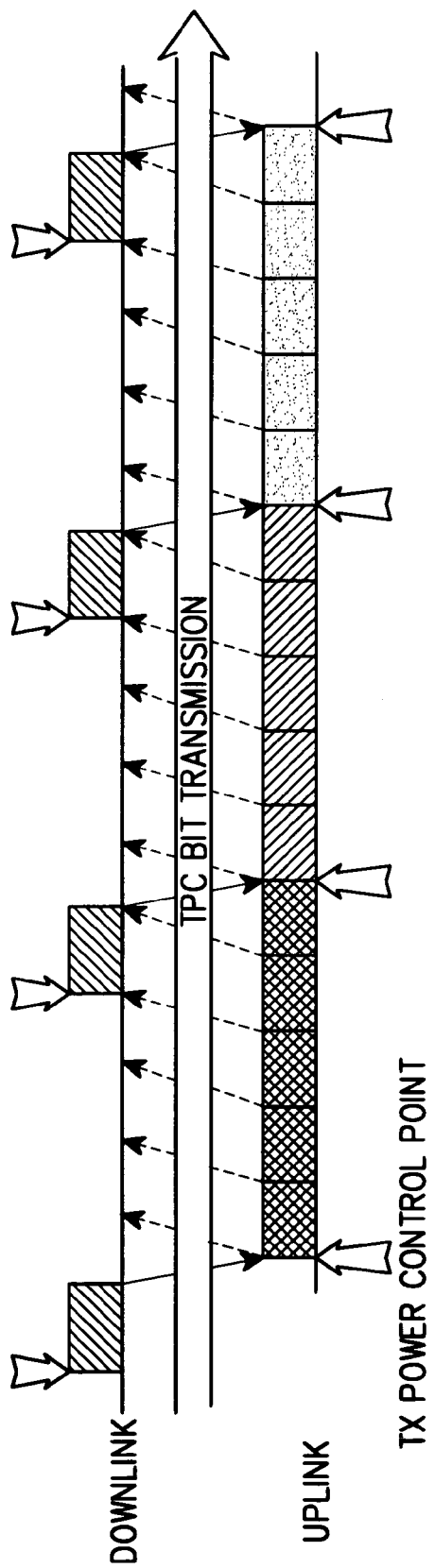
FIG. 18B is a diagram illustrating a power control time relationship when ⅕ rate gating is applied to only the downlink according to an embodiment of the present invention.

In the mobile communication system, when the gated transmission is applied only to the downlink, the mobile station continuously transmits the DPCCH data, whereas the base station transmits only the slot data in the gating position selected in the gating slot group unit. Therefore, the base station should perform a power control method being different from that for the case where the base station and the mobile station both perform the gated transmission, since the transmittable slots exist in the irregular pattern. FIGS. 18A and 18B show the power control time relationship for the case where the gated transmission is applied only to the downlink.

Uplink Transmission Power Control of Mobile Station

The mobile station extracts TPC bits from the valid slot last received from the base station, i.e., from the slot in the gating position of the downlink selected in the gating slot group unit, and controls its transmission power according to the value of the TPC bits. Here, since the valid slot of the downlink may be different from the valid slot of the uplink according to the type of the irregular gating pattern, the mobile station stores the received valid TPC bits and then transmits a transmittable slot, if any, according to the stored TPC bits.

TPC Bit Generation and Transmission for Downlink Power Control The mobile station generates a TPC bit by measuring the communication quality of the downlink during the valid slot of the downlink. The mobile station immediately transmits the generated TPC bit to the base station, and repeatedly transmits the TPC bit until a new TPC bit is generated. The reason for repeatedly transmitting the TPC bit is because the base station receives at least one TPC bit until the slot where the base station can transmit the downlink, and it is possible to decrease a TPC error rate by repeated transmission.

Downlink Transmission Power Control of Base Station

The base station extracts TPC bits received from the mobile station and controls its transmission power according to the value of the TPC bits. Here, the base station can extract the TPC bits using at least one TPC bit repeatedly transmitted by the mobile station.

As described above, in the embodiment of the present invention, it is possible to control transmission power the base station and the mobile station not only for the case where the uplink DPCCH signal is gated and the downlink DPCCH signal is not gated or the downlink DPCCH signal is gated and the uplink DPCCH signal is not gated, but also for the case where both the uplink and downlink DPCCH data is gated.

As described above, the invention can increase system capacity by minimizing the time required in the sync reacquisition process of the base station, decreasing interference due to discontinuous transmission of the uplink DPCCH, increasing the mobile station battery life time, and decreasing interference due to transmission of the uplink TPC bits.

While the invention has been shown and described with reference to a certain preferred embodiments thereof, it will be understood by those skilled in the art that various changes in form and details may be made therein without departing from the spirit and scope of the invention as defined by the appended claims.

The invention claimed is:

1. A method for transmitting control data on a downlink channel in a base station for a mobile communication system, comprising the steps of:
    determining whether the base station has downlink and uplink traffic channel data;
    driving, if there is no traffic data for a predetermined time period, a random position selector to determine a random gating slot position using one of a scrambling code and a fixed sequence related to a corresponding gating slot group;
    gating on control data at the determined gating slot position; and
    gating off control data in other slot positions.

2. The method as claimed in claim 1, wherein the channel data comprises a series of frames, each frame includes a plurality of slots, slots in each frame are divided into a plurality of gating slot groups, and each gating slot group has a determined gating slot position.

3. The method as claimed in claim 2, wherein the frame is comprised of 15 slots, the slot group is comprised of 5 slots, and the determined slot position is a randomized slot position out of the slots in the slot group.

4. The method as claimed in claim 2, wherein the frame is comprised of 15 slots, and each gating slot group is comprised of 3 slots.

5. The method as claimed in claim 2, wherein the random position selector determines the gating slot position by:
calculating a value x by multiplying a system frame number (SFN) of a immediately before the transmission by a specific integer;
selecting N bits, said N bits being selected starting from a position which is at an x-chip distance from a start point of a scrambling code of a previous gating slot group; and
determining a gating slot position of the each gating slot group by performing a modulo operation on the selected n bits, said modulo operation being by a number of slots in the gating slot group.

6. The method as claimed in claim 2, wherein the random position selector determines the gating slot position using the following equation:

$$N(G, C^i) = \left\{ \sum_{l=0}^{15} \left( S_l \left( G_{prev} \times 2560 \times \frac{1}{T} + G_{prev} + l \right) \oplus C^i_{(k \bmod 8)} \right) \times 2^{15-l} \right\} \bmod T$$

where, G is a gating slot group number;
$G_{prev}$ is a previous gating slot group number;
S is a scrambling code;
$C^i$ is a Connection Frame Number (CFN) of an ith frame $(=(C_0{}^i C_1{}^i C_2{}^i C_3{}^i C_4{}^i C_5{}^i C_6{}^i C_7{}^i)_2)$; and
T is a reciprocal of the gating rate.

7. The method as claimed in claim 2, wherein the random position selector determines the gating slot position using the following equation except for the first gating slot group and last gating slot group:

$s(i, j) = (A_j \oplus C_i) \bmod S_G$, j=0, 1, 2, ..., $N_G$−1, i=0, 1, ..., 255 where, $A_j$ is a sequence obtained by applying j bit offset to a fixed sequence;
$C_i$ is a sequence obtained by repeating a Connection Frame Number (CFN);
$S_G$ is a number of slots in one gating slot group; and
$N_G$ is a number of gating slot groups in one frame.

8. The method as claimed in claim 7, wherein the random position selector determines the gating slot position of the first gating slot group except for the first slot.

9. The method as claimed in claim 8, wherein the random position selector determines the gating slot position of the last gating slot group as the last slot.

10. The method as claimed in claim 2, wherein the gating on control data includes a pilot symbol and a TPC (Transmit Power Control) bit.

11. The method as claimed in claim 2, wherein the gating on control data includes a TPC (Transmit Power Control) bit located in the determined gating slot position and a pilot symbol located in a slot previous to the determined gating slot position.

12. The method as claimed in claim 1, wherein the base station transmits, if there is no data on the downlink and uplink traffic channel for the predetermined time period, gating information includes a gating start time and a gating rate.

13. A method for transmitting control data on an uplink channel in a mobile station for a mobile communication system, comprising the steps of:
determining whether the mobile station has uplink traffic channel data to transmit to a base station;
transmitting, if there is no data to be transmitted over the uplink data channel for a predetermined time period, a request for gating uplink control data to the base station;
driving, when the mobile station receives gating information including gating start time and gating rate from the base station, a random position selector to determine a random gating slot position using one of a scrambling code and a fixed sequence related to a corresponding gating slot group;
gating on control data in the determined slot position; and
gating off control data in other slot positions.

14. A method for gating data using a plurality of slots in an ith frame in a stream of frames, wherein each frame includes a plurality of slots and the slots in each frame are divided into a plurality of gating slot groups, each gating slot group including a plurality of slots, the method comprising the step of:
transmitting data in a slot position determined by Equations (1)–(3) below, $$s(i, j) = \begin{cases} (A_j \oplus C_i) \bmod (S_G - 1) + 1, & j = 0 & (1) \\ (A_j \oplus C_i) \bmod S_G, & j = 1, 2, \ldots, N_G - 2, \ i = 0, 1, \ldots, 255 & (2) \\ S_G - 1, & j = N_G - 1 & (3) \end{cases}$$

where j is a number of a gating slot group in the ith frame;
where $C_i$ is a sequence obtained by repeating a ith connection frame number(CFN); and
where $A_j$ is a sequence associated with a jth gating slot group, said sequence obtained by applying j bit offset to a given sequence;
where $S_G$ is a number of slots in one gating slot group; and
where $N_G$ is a number of gating slot groups in one frame.

15. A method for gating data using a plurality of slots in an ith frame in a stream of frames, wherein each frame includes a plurality of slots and the slots in each frame are divided into a plurality of gating slot groups, each gating slot group including a plurality of slots, the method comprising the steps of:
determining a gating slot position of gating slot groups using the gating slot position formula below:

$s(i, j) = (A_j \oplus C_i) \bmod S_G$, j=0, 1, 2, ..., $N_G$−1 where s(i,j) is a slot position within a jth gating slot group in a ith frame;
where j is a number of a gating slot group in an ith frame;
where $C_i$ is a sequence obtained by repeating the ith frame number (CFN); and
where $A_j$ is a sequence associated with a jth gating slot group, said sequence obtained by applying j bit offset to a given sequence;

gating on a Transmit Power Control (TPC) bit at the determined gating slot position; and gating off the TPC bit at other slots.

16. The method as claimed in claim 15, wherein the gating on step comprises the steps of:

gating on the TPC bit at the determined gating slot position; and $$s(i, j) = \begin{cases} (A_j \oplus C_i) \bmod (S_G - 1) + 1, & j = 0 & (1) \\ (A_j \oplus C_i) \bmod S_G, & j = 1, 2, \ldots, N_G - 2, \ i = 0, 1, \ldots, 255 & (2) \\ S_G - 1, & j = N_G - 1 & (3) \end{cases}$$

gating on a pilot symbol at a slot located before the determined gating slot position.

17. The method as claimed in claim 15, wherein the gating slot position determination step further comprises the step of:

determining a gating slot position in a first gating slot group of an ith frame by using a formula below:

$s(i, j)=(A_j \oplus C_i) mod S_G$, j=0 i=0, 1, . . . ,255

18. The method as claimed in claim 15, wherein the gating slot position determination step further comprises the step of:

determining a gating slot position in a last gating slot group of an ith frame as a last slot.

19. A method for transmitting gated transmission of an uplink dedicated physical control channel(DPCCH) slot signal which is formed by a series of frames, each frame including a plurality of slots, for a mobile communication system, comprising the steps of:

receiving a gating information indicating gating start time and gating rate from a base station;

transmitting the DPCCH slot signal to form a random pattern for a predetermined duration.

20. A method as claimed in claim 19, wherein the random pattern is generated by determining gating on a slot position using the following equation;

$$s(i, j) = \begin{cases} (A_j \oplus C_i) \bmod (S_G - 1) + 1, & j = 0 & (1) \\ (A_j \oplus C_i) \bmod S_G, & j = 1, 2, \ldots, N_G - 2, \ i = 0, 1, \ldots, 255 & (2) \\ S_G - 1, & j = N_G - 1 & (3) \end{cases}$$

where, where j is a number of a gating slot group in the ith frame;

where $C_i$ is a sequence obtained by repeating the ith frame number; and where $A_j$ is a sequence obtained by applying j bit offset to a given sequence;

where $S_G$ is a number of slots in one gating slot group; and where $N_G$ is a number of gating slot groups in one frame.

21. A base station transmitter in a mobile communication system, in which traffic channel data and dedicated physical control channel (DPCCH) data each are comprised of a series of frames, and each frame includes a plurality of slots, comprising:

a gating position selector for determining a gating slot position using one of a scrambling code and a fixed sequence related to a corresponding gating slot group, when there is no data to transmit on the traffic channel for a predetermined time period, and for dividing the slots in each frame into a plurality of gating slot groups, each of said gating slot groups having a random gating slot position; and a gated transmission controller for controlling a DPCCH slot corresponding to the selected gating slot position.

22. The base station transmitter as claimed in claim 21, wherein the gating position selector determines the gating slot position by using formulas (1)–(3) below:

where j is a number of a gating slot group in the ith frame;

where $C_i$ is a sequence obtained by repeating the ith frame number (CFN=i); and where $A_j$ is a sequence associated with ajth gating slot group, said sequence obtained by applying j bit offset to a given sequence;

where $S_G$ is a number of slots in one gating slot group; and where $N_G$ is a number of gating slot groups in one frame.

23. The base station transmitter as claimed in claim 21, wherein the gating position selector determines the gating slot position by using the following formula:

$s(i, j)=(A_j \oplus C_i) mod S_G$, j=0, 1, 2, . . . , $N_G$−1, i=0, 1, . . . , 255 where s(i,j) is a slot position within a jth gating slot group in a ith frame;

where j is a number of a gating slot group in the ith frame;

where $C_i$ is a sequence obtained by repeating the ith frame number; and where $A_j$ is a sequence associated with a jth gating slot group in the ith frame, said sequence obtained by applying j bit offset to a given sequence.

24. The base station transmitter as claimed in claim 21, wherein the gating position selector determines the gating slot position by using the following formula:

$s(i, j)=(A_j \oplus C_i) mod (S_G-1)$ , j=0 i=0, 1, . . . , 255 where s(i,j) is a slot position within a jth gating slot group in a ith frame;

where j is a number of a gating slot group in the ith frame;

where $C_i$ is a sequence obtained by repeating the ith frame number; and where $A_j$ is a sequence associated with the jth gating slot group, said sequence obtained by applying j bit offset to a given sequence.

25. The base station transmitter as claimed in claim 21, wherein the gating position selector determines the gating slot position by using the following formula:

$s(i, j)=S_G-1$, j=$N_G$−1, i=0, 1, . . . , 255 where s(i,j) is a slot position within a jth gating slot group in a ith frame;

where j is a number of a gating slot group in the ith frame;

where $C_i$ is a sequence obtained by repeating the ith frame number; and where $A_j$ is a sequence associated with a jth gating slot group, said sequence obtained by applying j bit offset to a given sequence.

26. The base station transmitter as claimed in claim 22, wherein the gated transmission controller gates on a pilot symbol at a slot located before a determined gating slot, and gates on at least one Transmit Power Control (TPC) bit and at least one Transport Format Combination Indicator (TFCI) bit at the determined gating slot.

27. A mobile station transmitter in a mobile communication system, in which traffic channel data and dedicated physical control channel (DPCCH) data each includes a series of frames, and each frame includes a plurality of slots, comprising:

a gating slot position selector for determining a gating slot position using one of a scrambling code and a fixed sequence related to a corresponding gating slot group, when the mobile station receives gating information includes gating start time and gating rate from a base station, and dividing the slots in each frame into a plurality of gating slot groups, each of said gating slot groups having the gating slot position;

a gated transmission controller for gating on at the determined gating slot position and gating off the other slot signal in a gating slot group.

28. An apparatus for gating data of a plurality of slots in an ith frame in a series of frames, wherein each frame includes a plurality of slots and the slots in each frame are divided into a plurality of gating slot groups, each gating slot group including a plurality of slots, the apparatus comprising:

a first memory for storing a sequence $C_I$, said sequence obtained by repeating the ith frame number;

a second memory for storing a sequence $A_j$ associated with a jth gating slot group, said sequence $A_j$ obtained by a given sequence;

a multiplier for performing an exclusive-or operation on the sequences $C_i$ and $A_j$;

a modulo operator for performing a modulo operation on an output of the multiplier, said modulo operation being by a number of slots in a gating slot group, where the result is a gating slot position in the jth gating slot group; and a gated transmission controller for gating on the data in the determined gating slot position and gating off the other slot data in the gating slot group.

29. The apparatus as claimed in claim 28, wherein the gated transmission controller transmits Transmit Power Control (TPC) bit at the determined gating slot position, and a pilot symbols of a slot located before the determined gating slot position.

30. The apparatus as claimed in claim 28, wherein the modulo operator determines the gating slot position of the first gating slot group as one of the slot in the first gating slot group except for the first slot.

31. The apparatus as claimed in claim 28, wherein the modulo operator determines the gating position of the last gating slot group as a last slot.

\* \* \* \* \*